US012098592B2

(12) United States Patent
Colson

(10) Patent No.: US 12,098,592 B2
(45) Date of Patent: Sep. 24, 2024

(54) ROLL-UP COVERINGS FOR ARCHITECTURAL OPENINGS AND RELATED METHODS, SYSTEMS AND DEVICES

(71) Applicant: HUNTER DOUGLAS INC., Pearl River, NY (US)

(72) Inventor: Wendell B. Colson, Weston, MA (US)

(73) Assignee: HUNTER DOUGLAS INC., New York, NY (US)

( * ) Notice: Subject to any disclaimer, the term of this patent is extended or adjusted under 35 U.S.C. 154(b) by 0 days.

(21) Appl. No.: 18/223,820

(22) Filed: Jul. 19, 2023

(65) Prior Publication Data

US 2023/0366267 A1 Nov. 16, 2023

Related U.S. Application Data

(63) Continuation of application No. 17/468,079, filed on Sep. 7, 2021, which is a continuation of application (Continued)

(51) Int. Cl.

*E06B 9/264* (2006.01)
*E06B 9/262* (2006.01)

(Continued)

(52) U.S. Cl.

CPC .............. *E06B 9/264* (2013.01); *E06B 9/262* (2013.01); *E06B 9/303* (2013.01); *E06B 9/34* (2013.01);

(Continued)

(58) Field of Classification Search

CPC . E06B 9/26; E06B 9/264; E06B 9/262; E06B 9/303; E06B 9/34; E06B 9/382;

(Continued)

(56) References Cited

U.S. PATENT DOCUMENTS 1,769,561 A * 7/1930 Wood ........................ E06B 9/40 160/237
1,789,655 A 1/1931 Iwata (Continued)

FOREIGN PATENT DOCUMENTS

AU 2000053079 5/2000
CN 1263413 C 7/2006

(Continued)

OTHER PUBLICATIONS

Search Report and Written Opinion dated Oct. 29, 2019 received from the Intellectual Property Office of Singapore in related Application No. 10201608256W.

(Continued)

*Primary Examiner* — Johnnie A. Shablack
(74) *Attorney, Agent, or Firm* — Scully, Scott, Murphy & Presser, P.C.

(57) ABSTRACT

A covering for an architectural opening that includes a plurality of flexible slat materials overlapped and joined along longitudinal edges resulting in a continuous roll-up covering material. The covering includes a first fabric material including an inner surface, an outer surface, a top end, and a bottom end, the bottom end of the first fabric material being folded over to define a first folded piece of fabric; a second fabric material including an inner surface, an outer surface, a top end and a bottom end; and a stiffener positioned between the first folded piece of fabric and the second fabric material along the top end of the second fabric material, an inner surface of the stiffener being adhered to the outer surface of the second fabric and an outer surface of the stiffener being adhered to the first folded piece of fabric.

26 Claims, 32 Drawing Sheets

Related U.S. Application Data

No. 15/510,181, filed as application No. PCT/US2015/049444 on Sep. 10, 2015, now Pat. No. 11,156,031.

(60) Provisional application No. 62/048,516, filed on Sep. 10, 2014.

(51) Int. Cl.

| | |
|---|---|
| ***E06B 9/303*** | (2006.01) |
| ***E06B 9/34*** | (2006.01) |
| ***E06B 9/382*** | (2006.01) |
| ***E06B 9/40*** | (2006.01) |
| *E06B 9/384* | (2006.01) |

(52) U.S. Cl.
CPC ................ *E06B 9/382* (2013.01); *E06B 9/40* (2013.01); *E06B 9/384* (2013.01)

(58) Field of Classification Search
CPC . E06B 9/384; E06B 9/40; E06B 9/386; E06B 2009/2423; E06B 2009/2435; E06B 2009/1516; E06B 2009/1538; E06B 2009/2622; E06B 2009/2625; E06B 2009/2627
USPC .................................................. 160/133, 264
See application file for complete search history.

(56) References Cited

U.S. PATENT DOCUMENTS 1,851,782 A 3/1932 Sugiura
1,937,342 A * 11/1933 Higbie .................... E06B 9/262 160/84.05
1,957,272 A 5/1934 Kuyper
2,012,887 A 8/1935 Major
2,056,823 A 10/1936 Brown
2,061,548 A 11/1936 Cameron
2,110,145 A 3/1938 Loehr
2,119,583 A * 6/1938 Kingsbury ................ E06B 9/40 160/387
2,140,049 A 12/1938 Grauel
2,209,234 A 7/1940 Nardulli
2,267,869 A 12/1941 Loehr
2,296,010 A 9/1942 Balthasar
2,374,591 A 4/1945 Dunn
2,723,715 A 11/1955 Kauffmann et al.
2,812,021 A 11/1957 Bechtler
2,840,156 A 6/1958 Griesser
2,987,120 A 6/1961 Griesser
3,292,685 A * 12/1966 Clark ........................ E06B 9/58 160/264
3,324,929 A 6/1967 Griesser
3,384,519 A 5/1968 Froget
3,407,863 A 10/1968 Griesser
3,429,355 A 2/1969 Griesser
3,646,986 A 3/1972 Anderle
3,750,740 A * 8/1973 Newman ................. E06B 9/262 160/264
4,824,505 A * 4/1989 Kraeutler ................ B29C 65/02 112/475.08
5,123,473 A * 6/1992 Henkenjohann .......... E06B 9/15 160/264
5,184,659 A * 2/1993 Alcocer .................. E06B 9/262 160/DIG. 7
5,313,999 A 5/1994 Colson et al.
5,320,154 A 6/1994 Colson et al.
5,339,882 A * 8/1994 Judkins ................... E06B 9/262 160/84.05
5,355,928 A * 10/1994 Robertson ............... E06B 9/262 160/348
5,394,922 A 3/1995 Colson
5,476,130 A 12/1995 Cheng
5,485,874 A 1/1996 Whitmore
5,490,553 A * 2/1996 Colson .................... E06B 9/386 160/84.06
5,558,925 A * 9/1996 Fritzman ................. E06B 9/266 156/107
5,718,799 A 2/1998 Colson
6,001,199 A 12/1999 Colson
6,047,760 A 4/2000 Judkins
6,105,657 A 8/2000 Zorbas
6,112,797 A 9/2000 Colson et al.
6,196,291 B1 * 3/2001 Rupel ..................... E06B 9/262 160/84.05
6,237,667 B1 5/2001 Fraczek et al.
6,302,982 B1 * 10/2001 Corey ................. B29C 66/8242 156/193
D456,196 S 4/2002 Colson
6,440,247 B2 * 8/2002 Rupel ..................... E06B 9/262 156/197
6,575,222 B2 * 6/2003 Corey ................. B29C 66/8242 160/84.05
6,673,176 B2 * 1/2004 Rupel ..................... E06B 9/262 156/227
6,688,369 B2 2/2004 Colson
6,688,370 B1 2/2004 Nien
6,745,811 B1 6/2004 Nien
6,767,615 B1 * 7/2004 Judkins ................... E06B 9/262 428/116
7,055,572 B2 6/2006 Nien et al.
7,059,378 B2 6/2006 Colson
7,111,659 B2 9/2006 Harper et al.
7,128,121 B2 10/2006 Nien
7,222,656 B2 5/2007 Nien
7,261,137 B2 8/2007 Dekker
7,455,079 B2 11/2008 Sitarz et al.
7,624,784 B2 12/2009 Anthony
8,171,640 B2 * 5/2012 Colson .................. B29C 66/437 29/897
8,496,768 B2 * 7/2013 Holt .......................... E06B 9/34 160/133
8,950,462 B2 2/2015 Cha
9,322,210 B2 4/2016 Lukosiunas et al.
9,359,813 B2 * 6/2016 Colson .................... E06B 9/303
9,366,080 B2 6/2016 Colson
9,458,663 B2 10/2016 Colson
9,506,287 B2 * 11/2016 Giest ....................... E06B 9/262
9,512,672 B2 * 12/2016 Colson .................... E06B 9/262
9,540,874 B2 * 1/2017 Colson ................... A47H 23/04
9,567,175 B2 * 2/2017 Cheslock ............... B65H 35/04
9,657,515 B2 * 5/2017 Rupel ..................... E06B 9/262
9,714,539 B2 7/2017 Bohlen
9,945,177 B2 4/2018 Drew et al.
10,017,034 B2 * 7/2018 Van Boxtel ............ B60J 1/2041
10,465,442 B2 * 11/2019 Colson .................... E06B 9/382
10,648,229 B2 * 5/2020 Colson ................... B65H 37/06
10,774,584 B2 * 9/2020 Siebenaller ............... E06B 9/24
11,118,396 B2 9/2021 Colson et al.
11,156,031 B2 10/2021 Colson
11,242,711 B2 * 2/2022 Lynch ..................... B32B 27/36
2003/0221800 A1 12/2003 Jones
2004/0103994 A1 6/2004 Nien
2006/0032160 A1 2/2006 Gazaway et al.
2006/0096716 A1 * 5/2006 Yu ........................... E06B 9/262 160/84.04
2007/0017645 A1 1/2007 Pon et al.
2007/0163730 A1 7/2007 Liang
2009/0008045 A1 * 1/2009 Serneels ................ B60J 7/0015 296/1.07
2010/0018657 A1 1/2010 Hoffmann et al.
2011/0067821 A1 3/2011 Byeon et al.
2011/0120661 A1 5/2011 Kim
2013/0180668 A1 * 7/2013 Judkins ................... E06B 9/262 29/419.1
2014/0014280 A1 1/2014 Bohlen
2014/0053989 A1 * 2/2014 Colson ...................... E06B 9/34 160/264
2014/0138037 A1 5/2014 Colson et al.
2014/0262071 A1 9/2014 Colson

(56) References Cited

U.S. PATENT DOCUMENTS

| | | | | |
|---|---|---|---|---|
| 2016/0145938 | A1* | 5/2016 | Colson | B29C 51/14 160/133 |
| 2016/0376836 | A1* | 12/2016 | Cheng | E06B 9/262 160/89 |
| 2018/0119487 | A1* | 5/2018 | Colson | E06B 9/34 |

FOREIGN PATENT DOCUMENTS

| | | | | |
|---|---|---|---|---|
| CN | 101384790 | A | 3/2009 | |
| CN | 20121358798 | | 4/2016 | |
| DE | 202010014229 | U1 * | 3/2011 | E06B 9/40 |
| EP | 0189091 | | 7/1986 | |
| EP | 0549216 | A1 | 6/1993 | |
| EP | 1 462 603 | A1 | 9/2004 | |
| EP | 1 479 867 | A2 | 11/2004 | |
| EP | 2 216 433 | A2 | 8/2010 | |
| EP | 2 325 357 | A2 | 5/2011 | |
| EP | 2 592 213 | A2 | 5/2013 | |
| EP | 2 716 856 | A2 | 4/2014 | |
| GB | 2230039 | A | 10/1990 | |
| JP | H-0673970 | A | 3/1994 | |
| JP | H-06173549 | A | 6/1994 | |
| JP | H7-023194 | U | 4/1995 | |
| JP | S3007235 | | 2/2000 | |
| JP | 2009-203781 | A | 9/2009 | |
| JP | 201257343 | A | 3/2012 | |
| KR | 100988591 | B1 | 10/2010 | |
| WO | 2001/002688 | A1 | 1/2001 | |

OTHER PUBLICATIONS

Notification of Reasons for Rejection dated Oct. 15, 2019 received from the Japanese Patent Office in related Application JP 2017-513532, 9 pages.

Athena Shade, "Custom Window Shades, Roller Shades, Cloth Blinds, Remote Blinds", retrieved from Internet URL: http://www.stockblinds.com/products/window-shades.html, 2 pgs., Jan. 21, 2015.

Dakota Blinds and Shades—Blinds Blog 2, Your Hometown Covering Experts!; 22 pgs., retrieved from Internet URL: http://ndsdblinds.com/blinds_blog_2, Nov. 25, 2014.

Sunmate, Light Filtering Soft Collection, VR2 Series, 4 pgs., date unknown.

International Search Report and Written Opinion from PCT/US2014/023756, 11 pgs., dated Jul. 30, 2014.

Search Report from related Chinese Patent Application No. 2017100545083 dated Mar. 27, 2018, 2 pgs.

Office Action issued Feb. 27, 2018 in related Japanese Patent Application No. 2016-502233.

Office Action dated Nov. 13, 2023 received in the parent U.S. Patent Application, namely U.S. Appl. No. 17/468,079, 27 pages.

* cited by examiner

ROLL-UP COVERINGS FOR ARCHITECTURAL OPENINGS AND RELATED METHODS, SYSTEMS AND DEVICES

CROSS-REFERENCE TO RELATED APPLICATIONS

This patent application is a continuation application of U.S. patent application Ser. No. 17/468,079 filed Sep. 7, 2021, which is a continuation application of U.S. patent application Ser. No. 15/510,181 filed Mar. 9, 2017, now U.S. Pat. No. 11,156,031 and claims priority to International Patent Application PCT/US15/49444 filed Sep. 10, 2015 and claims priority to U.S. Provisional Patent Application Ser. No. 62/048,516 filed Sep. 10, 2014. This patent application is related to International Patent Application No. PCT/US2014/026756, filed Mar. 13, 2014 and is a continuation-in-part of U.S. patent application Ser. No. 14/210,257, filed Mar. 13, 2014, now U.S. Pat. No. 9,359,813, each of which claims the benefit of priority to U.S. Provisional Patent Application Ser. No. 61/801,058, filed Mar. 15, 2013. Each of the aforementioned patent applications is incorporated by reference herein in its entirety for any purpose whatsoever.

COPYRIGHT NOTICE

A portion of the disclosure of this patent document contains material that is subject to copyright protection, particularly the Figures appended hereto. The copyright owner has no objection to the reproduction by anyone of the patent document or patent disclosure as it appears in the Patent and Trademark Office, patent file or records, but otherwise reserves all copyrights whatsoever.

BACKGROUND

Field of the Disclosure

The present disclosure relates primarily to coverings for architectural openings. Particularly, the present disclosure is directed to embodiments of a roll-up window covering and related methods and systems.

Description of Related Art

Retractable coverings for architectural openings have assumed numerous forms over a long period of time. Originally, coverings for architectural openings such as windows, doors, archways or the like consisted principally of fabric draped across the architectural openings. Such early forms of coverings evolved into retractable roller shades, curtains, draperies, and the like Wherein the covering could be extended across the architectural opening or retracted to a top or side of the opening.

An early but still popular form of covering for architectural openings is the Venetian blind wherein a plurality of vertically extending cord ladders support parallel horizontally extending slats in a manner such that the slats can be pivoted about their longitudinal axes between open and closed positions and the entire blind can be moved between an extended position wherein it extends across the architectural opening and a retracted position where the slats are accumulated in a vertical stack adjacent to the top of the architectural opening.

Vertical blinds are also available which are very similar to Venetian blinds except the slats or vanes extend vertically and are suspended from their upper ends for pivotal movement about their longitudinal vertical axes. The entire blind can be extended across the opening or retracted adjacent to one or more sides of the opening in a horizontal stack.

However, the current state of the art of Venetian blinds and similar products continue to suffer from a variety of deficiencies. Embodiments of the present disclosure provide solutions for these as well as other problems.

SUMMARY OF THE DISCLOSURE

The purpose and advantages of the present disclosure will be set forth in, and be apparent from, the description that follows, as well as will be learned by practice of embodiments made in accordance with the disclosure. Additional advantages of the invention will be realized and attained by the methods and systems particularly pointed out in the written description and claims hereof, as well as from the appended drawings.

To achieve these and other advantages and in accordance with the purposes of the disclosure, as embodied and broadly described, in accordance with some implementations, the disclosure provides a covering for an architectural opening, which may preferably be a roll-up covering. The roll-up covering may include a roller having a first end and a second end and defining a width between the first end and the second end, but it should be understood that the roller is not an essential part of the roll-up covering. The roller preferably defines a central rotational axis. The roll-up covering includes a first outer elongate tape that in turn has a first end, a second end, and defines a length between the first end and the second end. The first outer elongate tape further defines a lateral width, a thickness and a first central longitudinal axis between the first end and second end of the first outer elongate tape, such as along a geometric center of the first outer elongate tape. The first end of the first outer elongate tape can be attached to the roller such that the first central longitudinal axis of the first outer elongate tape is oriented generally orthogonally with respect to the central rotational axis of the roller. The elongate tapes have inner faces along the lengths of the tapes that are oriented and face towards each other, and have outer faces on the opposite surface or side from the inner face of each elongate tape such that the outer faces are oriented and face away from each other.

The roll-up covering further includes a first inner elongate tape disposed proximate to the outer elongate tape. The first inner elongate tape has a first end, a second end, and defines a length between the first end and the second end. The first inner elongate tape further defines a lateral width, a thickness and a second central longitudinal axis between the first end and second end of the first inner elongate tape. The first inner elongate tape may define a plurality of collapsible hinge segments disposed along the length of the first inner elongate tape, however, these hinge segments are not essential to the roll-up covering. The collapsible hinge segments are configured to collapse in order to decrease the effective length of the first inner elongate tape when the first inner elongate tape is rolled up around the roller. The collapsible hinge segments are further configured to expand in order to increase the effective length of the first inner elongate tape when the roll-up covering is unrolled from the roller. The first end of the first inner elongate tape can be attached to the roller such that the second central longitudinal axis can be oriented generally orthogonally with respect to the central rotational axis.

The roll-up covering further includes a plurality of slats disposed between and coupled to the first outer elongate tape and the first inner elongate tape. Preferably the slats each have a first end and a second end, and have a longitudinal length between the first end and the second end. The slats each preferably further include an inner longitudinal edge and an outer longitudinal edge, which are parallel to the length of the slat and define a depth (also referred to herein as width of the slat) between the inner longitudinal edge and the outer longitudinal edge. Each slat also preferably has a thickness orthogonal to the length and, orthogonal to the depth of the slat. The slats can be oriented transversely with respect to the first and central longitudinal axes of the first inner and first outer elongate tapes, such that the length of each slat preferably is parallel with and in the same direction as the width of each elongate tape. The plurality of slats, first outer elongate tape and first inner elongate tape define a subassembly that is configured to be rolled up around the roller, wherein the first inner elongate tape is located radially inwardly with respect to the first outer elongate tape when the subassembly is rolled up around the roller. The slats may also have an upper face defined by an inner longitudinal edge, an outer longitudinal edge, a first end, and a second end, along with a lower face defined by an inner longitudinal edge, an outer longitudinal edge, a first end, and a second end. The upper face and the lower face of the slats being opposite each other and oriented so that they face away from each other, the upper face facing the roller, and the lower face facing away from the roller.

The roll-up covering without the roller and the hinge segments includes a first outer elongate tape having a first end, a second end, and defining a length between the first end and the second end, the first outer elongate tape further defining a lateral width, a thickness and a first central longitudinal axis between the first end and second end of the first outer elongate tape. The roll-up covering without the roller further includes a first inner elongate tape disposed proximate to the outer elongate tape, the first inner elongate tape having a first end, a second end, and, defining a length between the first end and the second end, the first inner elongate tape further defining a lateral width, a thickness and a second central longitudinal axis between the first end and second end of the first inner elongate tape, and a plurality of slats disposed between and coupled to the first outer elongate tape and the first inner elongate tape, the slats being oriented transversely with respect to the first and second central longitudinal axes when the roll-up covering is in an expanded configuration. The plurality of slats, first outer elongate tape and first inner elongate tape define a subassembly that is configured to be rolled up, and the first inner elongate tape is located radially inwardly with respect to the first outer elongate tape when the subassembly is rolled up.

The roll-up covering may additionally include a roller having a first end and a second end, a width between the first end and the second end, a diameter, a central rotational axis, and a radius of curvature.

The first inner elongate tape may define a plurality of collapsible hinge segments disposed, along the length of the first inner elongate tape, the collapsible hinge segments being configured to collapse in order to decrease the effective length of the first inner elongate tape when the first inner elongate tape is rolled up, the collapsible hinge segments being further configured to expand so that the first inner elongate tape attains its length when the roll-up covering is unrolled. The hinge segments can be preformed into the first inner elongate tape.

From this exemplary embodiment, it should be understood that when referring to the roller and the hinge segments in the disclosure, these features should be considered as optional.

In accordance with a further aspect, the plurality of slats may define a length that is parallel to the lateral width of the first outer elongate tape and first inner elongate tape, the length of the slats being greater than the largest lateral width of one of the first outer elongate tape and first inner elongate tape.

The lateral width of the inner and/or outer elongate tapes can be substantially perpendicular to said length, and the thickness can be substantially perpendicular to said length and lateral width.

In accordance with a further aspect, the subassembly can be configured to reside in a collapsed configuration wherein the slats are closed when the subassembly is initially unrolled from the roller, optionally from the roller. The plurality of slats are preferably oriented parallel to the first inner elongate tape and the outer elongate tape when the subassembly is in the collapsed configuration, wherein the slats are closed or substantially closed when the subassembly is initially unrolled, optionally from the roller. The sub assembly can be deployed from the collapsed configuration into an expanded configuration wherein the slats are opened by further rotation or further rotation of the roller. The slats can be coupled to said first outer elongate tape and said first inner elongate tape, such that an upper and a lower face of the slats are transverse to said central longitudinal axis of said elongate tapes when said subassembly is in an expanded configuration and said upper and lower faces of the slats are substantially parallel to said central longitudinal axis of said elongate tapes when said subassembly is in a closed configuration.

In many implementations, the first outer elongate tape and the first inner elongate tape can be substantially parallel along their length when the subassembly is in the collapsed configuration and the expanded configuration. Moreover, the first outer elongate tape and the first inner elongate tape can be substantially parallel along their lengths while the subassembly is deployed from the collapsed configuration into the expanded configuration. Alternatively, the tapes are not always parallel during deployment.

In accordance with a further aspect, a plurality of the slats, and if desired, all of the slats can have an elongate, flexible generally planar body that has an inner edge attached to the first inner elongate tape, an outer edge attached to the first outer elongate tape, and side edges at the ends of the slats joining and extending between the inner edge and outer edge of the slats. The inner and outer edges can define a slat length, and side edges joining the inner edge and outer edge can define a slat depth. The slats can have a length in a direction transverse to said first central longitudinal axis and the second central longitudinal axis, thereby corresponding to the width of the finished covering and the slat lengths can be longer than the lateral widths of the greater one of the first outer elongate tape and the first inner elongate tape. In some implementations, at least one of an inner edge region along the inner edge of at least one slat and an outer edge region along the outer edge of the at least one slat can be stiffer than a region between the inner edge and outer edge of the at least one slat. Such flexibility can be useful in providing a versatile geometry for the roll-up covering. In some implementations, at least one of the inner edge region and the outer edge region can include at least one elongate stiffener for increasing the stiffness of the at least one slat, the at least one elongate stiffener defining a length and a central lateral axis along its length. Thus, the inner edge, outer edge, or both edges can be provided with one or more such stiffeners disposed along the length of at least one of the slats.

In accordance with further aspects, the at least one elongate stiffener can be substantially planar (e.g., flat, crowned, creased, and the like) and lie in substantially the same plane as one of the first central longitudinal axis of the first outer elongate tape and the second central longitudinal axis of the first inner elongate tape. The at least one stiffener can further define a width perpendicular to the length, and a thickness perpendicular to the width and the length. The at least one elongate stiffener can have a curved cross section in a plane perpendicular to the central lateral axis (e.g. be "crowned") such that a first curved planar face of the at least one elongate stiffener can be convex and a second, opposite curved planar face of the at least one elongate stiffener can be concave. The concave face of the at least one stiffener preferably faces the roller when the subassembly is rolled up around the roller. The concave face of the at least one stiffener can have a radius of curvature that substantially matches a radius of curvature of the roller. The at least one stiffener has a thickness that is preferably substantially smaller than its width.

In accordance with a further aspect, the at least one slat can includes a first stiffener proximate to the inner edge region of the at least one slat and a second stiffener proximate to an outer edge region of the at least one slat, each of the first and second stiffeners having a concave face. The concave faces of the first stiffener and the second stiffener can both face in the same direction. Moreover, the concave faces of the first stiffener and the second stiffener can have a radius of curvature that substantially matches a radius of curvature of the roller to facilitate rolling up of the subassembly. The at least one slat for example can be formed from a flexible fabric material. The at least one stiffener can be formed, for example, from at least one of a rigid plastic material, a metallic material, such as aluminum, titanium, brass or steel, or the like.

In some implementations, the illustrative examples of flexible fabric material of the at least one slat can be disposed between and attached to an outwardly facing face of the first inner tape and an inwardly-facing concave face of the first stiffener along the inner edge of the at least one slat. Alternatively, the first stiffener can be disposed in a sleeve defined along an interior portion of the slat. The flexible fabric material of the at least one slat can be disposed between and attached to an inwardly facing face of the first outer tape and an outwardly-facing convex face of the second stiffener along the outer edge of the at least one slat, among other possible configurations. The flexible fabric material of the at least one slat can be attached to an inwardly facing face of the first outer tape along a two dimensional contact or bonding area that extends parallel to the first central longitudinal axis and transversely with respect to the first central longitudinal axis. For example, the contact or bonding area can be generally rectangularly-shaped, triangularly shaped, "X"-shaped, "L"-shaped, as desired. The flexible fabric material of the at least one slat can be attached to an inwardly facing face of the outer tape by one or more of (i) an adhesive, (ii) at least one fastener, (iii) stitching, (iv) three dimensional weaving and (v) ultrasonic welding. Other flexible or non-flexible materials than the flexible fabric as exemplified here may be used.

In accordance with a further aspect, at least one of the slats can include at least one transverse stiffener attached to the at least one slat in a region of the slat disposed between the first outer elongate tape and first inner elongate tape. Any desired number of slats can be provided with this feature in order to help maintain uniform spacing between the tapes when the subassembly is deployed. In one embodiment, one or more such transverse stiffeners are provided in, on or under a top slat in the subassembly to resist an inwardly compressive force arising from a combination of the weight of the subassembly acting in concert with an angulation of the inner and outer tapes proximate the roller. In one embodiment, the at least one transverse stiffener can be disposed between the first stiffener and the second stiffener to provide a slat with a particularly stable shape during deployment. When the at least one transverse stiffener is disposed on an upper slat in the subassembly, the at least one transverse stiffener is thus adapted to maintain the upper slat in a generally open condition, and causes the first outer elongate tape to be separated from the first inner elongate tape. If desired, the at least one transverse stiffener can be disposed across the slat between the first outer elongate tape and the first inner elongate tape to act as a strut to separate the tapes. Moreover the at least one transverse stiffener can be crowned for enhanced sectional modulus and column strength. Preferably, the at least one transverse stiffener can buckle or otherwise collapse and roll up around the roller when the subassembly is retracted around the roller.

In accordance with one embodiment, first and second magnetic connectors can be disposed opposing one another to control the opening of the covering for the architectural opening. For example, the first magnetic connector can be disposed and movable on an outer face of the first inner elongate tape and the second magnetic connector can be disposed and movable on an outer face of the first outer elongate tape, wherein the first and second magnetic connectors hold the first inner elongate tape and first outer elongate tape together to maintain at least a portion of the window covering in a closed condition. In some implementations, the first and second magnetic connectors have sufficient magnetic forces attracting each other such that moving one of the first and second magnetic connectors can cause coordinated movement of the other of the first and second magnetic connectors. In accordance with an exemplary embodiment of the present disclosure, the coordinated upward movement of the first and second magnetic connectors can cause the side edges of the plurality of slats to collapse against the first inner elongate tape and first outer elongate tape, and the downward movement of the first and second magnetic connectors can cause the side edges of the plurality of slats to separate from the first inner elongate tape and first outer elongate tape. In the illustrated embodiment, the first connector can be movable along the second central longitudinal axis, and second connector can be movable along the first central longitudinal axis. In another embodiment, the pair of magnetic connectors can be removable from the first outer elongate tape and the first inner elongate tape. It will be appreciated that a variety of other connectors can be used in place of or in addition to the first and second magnetic connectors, such as clips and the like to selectively hold the inner and outer elongate tapes together. In accordance a further embodiment, each pair of opposing elongate tapes, such as the third and fourth, and fifth and sixth, elongate tapes (or only some of the pairs of tapes, as desired) can be provided with pairs of magnetic connectors as described above.

In accordance with still a further aspect, the first inner elongate tape and first outer elongate tape can be aligned to roll on top of each other when the subassembly is retracted around the roller. Alternatively, the first inner elongate tape and first outer elongate tape can be laterally displaced from each other along the length of the slats such that they do not roll on top of each other when the subassembly is retracted around the roller. In accordance with a further example, the first inner elongate tape and first outer elongate tape can have different lateral widths.

In accordance with one embodiment, the first inner elongate tape and first outer elongate tape can be attached proximate to a center of the roller between the first end and the second end. If desired, the ends of the slats of this embodiment can be freely floating by virtue of using one or more stiffeners along the length of each slat.

In accordance with another embodiment of the present disclosure, a door can be provided on the body of the roller, wherein the door has a width defined by the first and second end of the roller (or other suitable width), a radial curvature that substantially matches that of the roller, an inner end, an outer end, a thickness, and a length that is defined between the inner and outer end. It can be further provided that the radial curvature of the door forms a concave inner face and a convex outer face for the door.

In a further embodiment, the door can be attached to the roller via a hinge at the inner end, wherein the hinge can be a concavely curved inner end of the door on the concave inner face hooked into a receiving cavity of the roller for the width of the roller.

In accordance with another embodiment, the door can be operable to be opened by detaching or separating from the roller on the outer end and attaching to the roller at the inner end via the hinge across the width of the door. The door can be further operable to be closed by collapsing and rolling the outer end of the door toward and around the roller.

In a further embodiment of the present disclosure, a raised ridge can be integrally provided on the concave inner face of the door along the width of the door whereby the ridge and the outer end of the door form a track across the width of the door and the ridge can have a concave raised edge along the width of the door. In accordance with one embodiment, the track can accommodate at least one elongate stiffener attached to a flexible slat of the covering. For example, the stiffener can be covered by a flexible portion of the slat such that the stiffener covered with the flexible portion of the slat can be disposed in the track across the width of the track. The slat can be attached to an inwardly facing face of the first inner elongate tape by, for example, adhesive, fastener(s), stitching, three-dimensional weaving, ultrasonic welding and the like. In accordance with another embodiment of the present disclosure, a receiving track can be integrally provided on the body of the roller wherein the receiving track has a width defined by the first and second end of the roller, a radial curvature that substantially matches the curvature of the roller, a first end, a second end, a thickness, and a length defined between the first and second end of the receiving track. In a further embodiment, the receiving track can accommodate at least one elongate stiffener whereby the stiffener is covered by a flexible slat portion such that the stiffener covered with the slat portion can be disposed in the receiving track for the width of the receiving track and the slat portion of the at least one stiffener is attached to an inwardly facing face of the first outer elongate tape by, for example, adhesive, fastener, stitching, three-dimensional weaving, ultrasonic welding and the like.

In accordance with another embodiment, when the door on the roller is in an open position it maintains the upper slat of the roll-up covering in a generally open condition such that the first outer elongate tape can be separated from the first inner elongate tape. Such an embodiment can thus be used without a transverse stiffener, as described elsewhere herein. In accordance with another embodiment, the first inner elongate tape and first outer elongate tape can be attached proximate to a first end of the slats, and the roll-up covering can further include a second outer elongate tape having a first end, a second end, and defining a length between the first end and the second end. The second outer elongate tape can further define a lateral width, a thickness and a third central longitudinal axis between the first end and second end of the second outer elongate tape. The first end of the second outer elongate tape can optionally be attached to a roller such that the third central longitudinal axis of the second outer elongate tape can be oriented generally orthogonally with respect to the central rotational axis of the roller, and be displaced laterally along the roller from the first outer elongate tape, such as at the second end of the roller, or another location. The roll-up covering can still further include a second inner elongate tape disposed proximate to the second outer elongate tape. The second inner elongate tape can have a first end, a second end, and define a length between the first end and the second end. The second inner elongate tape can further define a lateral width, a thickness and a fourth central longitudinal axis between the first end and second end of the second inner elongate tape. The second inner elongate tape can further define a plurality of collapsible hinge segments disposed along the length of the second inner elongate tape. The collapsible hinge segments are preferably configured to collapse in order to decrease the effective length of the second inner elongate tape when the second inner elongate tape is rolled up, optionally around the roller. The collapsible hinge segments are preferably further configured to expand in order to increase the effective length of the second inner elongate tape when the roll-up covering is unrolled, optionally from the roller. The first end of the second inner elongate tape can optionally be attached to the roller such that the second central longitudinal axis can be oriented generally orthogonally with respect to the central rotational axis. In a particular embodiment, the second inner elongate tape and second outer elongate tape are attached proximate to a second end of the slats. One of the first inner elongate tape and first outer elongate tapes can be spaced apart from respectively the second inner elongate tape and/or second outer elongate tape, for example by a distance of at least 6 inches, and preferably by a distance greater than eight inches.

In accordance with still another embodiment the roll-up covering can further include a third outer elongate tape having a first end, a second end, and defining a length between the first end and the second end. The third outer elongate tape can further define a lateral width, a thickness and a fifth central longitudinal axis between the first end and second end of the third outer elongate tape. The first end of the third outer elongate tape can optionally be attached to a roller such that the fifth central longitudinal axis of the third outer elongate tape can be oriented generally orthogonally with respect to the central rotational axis of the roller. The roll-up window covering can still further include a third inner elongate tape disposed proximate to the third outer elongate tape. The third inner elongate tape has a first end, a second end, and defines a length between the first end and the second end. The third inner elongate tape can further define a lateral width, a thickness and a sixth central longitudinal axis between the first end and second end of the third inner elongate tape. The third inner elongate tape can further define a plurality of collapsible hinge segments disposed along the length of the third inner elongate tape. The hinge segments can be configured to collapse in order to decrease the effective length of the third inner elongate tape when the third inner elongate tape is rolled up, optionally around the roller. The hinge segments can further be configured to expand in order to increase the effective length of the third inner elongate tape when the roll-up covering is unrolled, optionally from the roller. The first end of the third inner elongate tape can be attached to the optional roller such that the sixth central longitudinal axis can be oriented generally orthogonally with respect to the central rotational axis. If desired, the third inner elongate tape and third outer elongate tape can be attached to the roller proximate a center of the roller, between the first and second sets of tapes.

In accordance with still further aspects of the disclosure, the roll-up covering can further include a weight proximate to the second ends of the first, second, and/or third inner elongate tapes. The weight is preferably configured to maintain tension on the first inner elongate tape.

In accordance with still further aspects, each of the aforementioned. Plurality of collapsible hinge segments can be disposed proximate to a slat in the subassembly. In some implementations, each hinge segment can be defined by a plurality of spaced apart transverse crease lines defined in the first inner elongate tape. In some implementations, the hinge segment(s) can fold downward onto an exterior face of the first inner elongate tape when the subassembly is rolled onto the roller. In some embodiments, a lower crease line defining the hinge segment can be disposed proximate to an inner or outer edge of one of the slats. If desired, the lower crease line can be disposed immediately above a region where the first inner elongate tape is attached to the inner edge of the slat.

In some embodiments, the tapes can be made from a flexible material. If desired, the crease lines can be crush formed into the flexible material. For example, the flexible material can be selected from the group including films and textiles. If desired, the textile can be selected from the group consisting of knits, wovens and non-wovens. The flexible material used for the tapes preferably have a thickness between about 1-30 mils, 1.5-25 mils, 2-25 mils, 3-20 mils, 4-18 mils, 6-16 mils, 8-14 mils, and about 10-12 mils.

In some embodiments, the tapes and slats can be made from a woven material such as a Roc-Lon® blackout drapery liner material, manufactured by Rockland. Industries, Inc. (1601 Edison Hwy Baltimore, MD 21213, (410) 522-2505). In some implementations, the stiffeners can be polymeric or aluminum crowned blind slats that are about 0.008 inches thick and 16 mm wide. Preferably, such materials are provided free from any waxes or other materials or treatments that inhibit adhesion with an adhesive. In further implementations, the surface of an aluminum crowned blind slat can be provided that is surface treatment, such as via anodization, oxidation, plasma treatment, and the like. In alternative embodiments, the width of the stiffeners can vary from about 3/16 of an inch to about 5/8 inch or up to about one inch. A larger stiffener width can be appropriate, particularly for slats of larger depth (e.g., 4, 4.5, 5, 5.5 or 6 inches).

A purpose of the invention is that both the length and the width of the roll-up covering are readily customizable because the length is readily controllable by selecting the desired number of slats, and the width is readily controllable by selecting the desired slat length (the slat is cut from a continuous roll of slat material) to match the desired roll-up covering width. The roll-up covering length is further customizable because the slat spacing need not be determined by ladders or any other pre-existing elements of the roll-up covering. Instead, the slats may be placed at any desired points along the tapes (or other support elements) to achieve the desired roll-up covering length and slat spacing.

In accordance with further aspects of the disclosure, slats, which may be subsequent slats, can be separated by a substantially uniform distance along the first outer elongate tape and the first inner elongate tape. If desired, such a distance can be a standard distance (e.g., 60 nm, 72 mm), or the spacing can be customized to any desired length, as subsequent slats can be overlapped to any desired extent, such as about 5%, 10%, 15%, 20%, 25%, 30%, 35%, 40%, 45%, 50% or any increment therebetween of 1%. Thus, a custom roll-up covering may be provided wherein the spacing between adjacent slats is determined by dividing a total intended custom length (also referred to herein as height) of the subassembly by a number of desired slats. The custom height is directly related to the dimensions of the architectural opening or feature the subassembly or covering is intended to be installed in or on. Thus, it is possible to provide a custom subassembly of custom height with a custom, uniform distance between the slats. As a result, when in an open configuration, the bottom-most slat or bottom-most feature (for example, a weighted bar, a slat, a bottom rail, or bottom weight) of the subassembly is separated from the next slat by the same distance separating other adjacent slats, and the subassembly is of a height that can fully extend without interference in or on the architectural opening. Any roll-up covering disclosed herein can also be made to a custom width for any width opening, and the placement of the elongate tapes along the length of the slats can similarly be a custom spacing.

In another embodiment, subsequent slats can be separated by a non-uniform distance along at least one of the first outer elongate tape and the first inner elongate tape. Preferably, this is accomplished by having the segment of the outer elongate tapes between adjacent slats being shorter or longer than the inner elongate tapes between those slats, as desired. If desired, the spacing between subsequent slats can be selected to cause the slats to open at different rates, for example, such that light will be permitted to pass through a first portion of the roll-up covering before passing through a second portion of the roll-up covering. It should be appreciated that this selection of spacing between subsequent slats can also be applied to other types of blinds, such as a conventional Venetian blind. If desired, at least one of the outer elongate tapes and/or at least one of the inner elongate tapes is longer than another of the outer elongate tapes and the inner elongate tapes between subsequent slats after at least one pair of adjacent slats. If desired, at least one of the outer elongate tapes and/or at least one of the inner elongate tapes is longer than the other of at least one of the outer elongate tapes and at least one of the inner elongate tapes between a pair of adjacent slats a different distance than between subsequent slats after said pair of a slats.

In further accordance with the disclosure, a ladder tape is provided. Such a ladder tape can be configured to be biased to close, and to roll up onto itself. For example, such a ladder tape can include a first elongate tape having a first end, a second end, and defining a length between the first end and the second end, the first elongate tape further defining a lateral width, a thickness and a first central longitudinal axis between the first end and second end of the first outer elongate tape, the first end of the first elongate tape being configured to be attached to a roller. The ladder tape can further include a second elongate tape disposed parallel to the first elongate tape. The elongate tapes have inner faces along the lengths of the tapes that are oriented and face towards each other, and have outer faces on the surface of each tape opposite from the inner faces such that the outer faces are oriented and face away from each other. The second elongate tape has a first end, a second end, and, defines a length between the first end, and the second, end. The second elongate tape further defines a lateral width, a thickness and a second central longitudinal axis between the first end and second end of the second elongate tape. The second elongate tape further defines a plurality of collapsible hinge segments disposed along the length of the second elongate tape. The collapsible hinge segments can be configured to collapse in order to decrease the effective length of the second elongate tape when the second elongate tape is rolled up around a roller radially inwardly of the first elongate tape. The collapsible hinge segments can further be configured to expand in order to increase the effective length of the second elongate tape when the inner and outer tapes are unrolled from the roller. The ladder tape can further include a plurality of connectors disposed between and coupled to the first elongate tape and the second elongate tape along the length of the tapes, the tapes and connectors cooperating to form a ladder tape suitable for receiving (e.g., rigid) slats in the saddle area of the tapes to make a blind. If desired, at least one of the connectors can include a flexible fabric body having a first end, a second end, a first planar face and a second planar face. The first planar face can be attached to an inwardly facing face of the first elongate tape at the first end, and the second planar face can be attached to an inwardly facing face of the second elongate tape at the second end. The ladder tape can be biased to fold into a planar configuration. If desired, the connectors can assume a “Z” or “S” shape when the ladder tape is deployed.

The disclosure further provides a roll-up covering material for a covering for an architectural opening, configured to be rolled up, optionally around a roller of a roll-up covering for an architectural opening. The material includes a first outer elongate tape having a first end, a second end, and defining a length between the first end and the second end, the first outer elongate tape further defining a lateral width, a thickness and a first central longitudinal axis between the first end and second end of the first outer elongate tape. The material further includes a first inner elongate tape disposed proximate to the outer elongate tape, the first inner elongate tape having a first end, a second end, and defining a length between the first end and the second end, the first inner elongate tape further defining a lateral width, a thickness and a second central longitudinal axis between the first end and second end of the first inner elongate tape. The material further includes a plurality of flexible slats disposed between and attached, to the first outer elongate tape and the first inner elongate tape, the slats being oriented transversely with respect to the first and central longitudinal axes, at least one of the slats in the plurality of slats can be a transversely stiffened slat including stiffened longitudinal edges (also referred to herein as inner and outer edges) connected by a flexible body portion, wherein the transversely stiffened slat is attached to the first outer elongate tape and first inner elongate tape at the location of the stiffened longitudinal edges of the transversely stiffened slat, wherein the plurality of slats, first outer elongate tape and first inner elongate tape define a roll-up covering material that is configured to be rolled up, optionally around a roller.

The disclosure still further provides a roll-up covering for an architectural opening, including a roller having a first end and a second end and defining a width between the first end and the second end, the roller defining a central rotational axis, and the aforementioned roll-up covering material. The first end of the first outer elongate tape is preferably attached to the roller such that the first central longitudinal axis of the first outer elongate tape is oriented generally orthogonally with respect to the central rotational axis of the roller. Further, the first inner elongate tape is preferably located radially inwardly with respect to the first outer elongate tape when the subassembly is rolled up around the roller, and further wherein the first inner elongate tape is configured to collapse upon itself as the roll-up covering is rolled around the roller, the first inner elongate tape can be configured to collapse upon itself as an edge of one of the plurality of slats approaches the roller while the roll-up covering is rolled around the roller. The disclosure further provides a roll of the aforementioned roll-up covering material for making roll-up coverings.

In some embodiments of the roll-up covering and/or roll-up covering material, the first inner elongate tape can be longer than the first outer elongate tape between adjacent slats. For example, the first inner elongate tape can be between about 0.5% and about 25% longer than the first outer elongate tape between at least one pair of adjacent slats in the roll-up covering material, in any desired increment therebetween of about 0.5%. In some implementations, the roll-up covering and/or roll-up covering material can include a plurality of inner elongate tapes and a plurality of outer elongate tapes. For example, the roll-up covering material and/or roll-up covering can include a Plurality of inner elongate tapes along a first face of the slats and a plurality of outer elongate tapes along a second face of the slats. In any implementation, if desired, the roll-up covering and/or roll-up covering material can be provided. In a form wherein the at least two of the tapes are of different widths. For example, at least one of the inner and/or outer elongate tapes is of a different width than another elongate tape. Moreover, placement of the tapes along the length of the slats can be varied in different embodiments. For example, the plurality of inner elongate tapes can lay over the plurality of outer elongate tapes such that they partially or completely overlap when the roll-up covering and/or roll-up covering material is collapsed on a flat surface. In other embodiments, at least one of the inner elongate may not lay over any of the plurality of outer elongate tapes when the roll-up covering and/or roll-up covering material is collapsed on a flat surface. In various embodiments, at least one of the inner and/or outer elongate tapes can be disposed along a first and/or second edge of the plurality of slats. In some embodiments, different slats within the roll-up covering material and/or roll-up coverings herein can be made from different materials to achieve different functional and design effects.

The disclosure also provides a flexible slat material for forming a roll-up covering for an architectural opening. The slat material includes an elongate flexible planar body having a first end and a second end joined by a plurality of longitudinal edges, wherein at least one of the longitudinal edges is a stiffened edge that is stiffened along the length of the slat material along a first direction orthogonal to the stiffened edge, and further wherein the stiffened edge is substantially less stiff along a second direction orthogonal to the stiffened edge. Thus, the stiffened edge can be predisposed to resist a larger bending force along one direction orthogonal to the longitudinal edge of the flexible slat material than a second direction orthogonal to the longitudinal edge of the flexible slat material.

The slat material can typically include two opposed longitudinal edges, wherein each of the longitudinal edges is stiffened. The stiffened edge(s) can include a stiffened planar region along the stiffened edge. If desired, the stiffened edge(s) can include a generally planar stiffener attached to the elongate flexible planar body. In some implementations, the stiffened edge(s) can include a stiffener attached to the elongate flexible planar body substantially along its entire length, or between ten and one hundred percent of its length in increments of one percent. In some implementations, the stiffened edge(s) can be continuously attached to the elongate flexible planar body substantially along its entire length, or between ten and one hundred percent of its length in increments of one percent. In other implementations, the stiffened edge(s) can be continuously attached to the elongate flexible planar body along its entire length. In some implementations, the stiffened edge(s) can be intermittently attached to the elongate flexible planar body substantially along its entire length, or between ten and one hundred percent of its length in increments of one percent. In still other implementations, the stiffened edge(s) can be intermittently attached to the elongate flexible planar body along its entire length.

In some implementations, the generally planar stiffener(s) can include a crown along its length. For example, the slat material can include a generally planar stiffener having a crown along its length attached to the elongate flexible planar body proximate each of two opposing longitudinal edges of the elongate flexible planar body. If so configured, the crowns of each of the generally planar stiffeners can be oriented in the same or opposite directions when the elongate flexible planar body is laid flat on a flat surface. Depending on preference, the generally planar stiffener(s) can be visible, or covered by fabric, such as by the fabric of the elongate flexible planar body. The disclosure further provides a roll of flexible slat material including the flexible slat material described herein, wherein the roll is formed by winding the flexible slat material about a core such that the plurality of longitudinal edges form side edges of the roll. The disclosure further provides a slat formed from the flexible slat material described herein.

The disclosure still further provides a roll-up covering and/or roll-up covering material for an architectural opening including a plurality of slats made from the flexible slat materials disclosed herein, overlapped and joined along longitudinal edges of the slats, resulting in a continuous roll-up covering material. Such a design creates a continuous sheet-like roll-up architectural covering (e.g., without tapes) that permits construction of a roll-up covering of a custom width due to the continuous roll-up covering material being able to be cut to any desired (custom) length corresponding to the width of the covering when the slats are assembled into a covering, although it will be appreciated that any embodiment of a roll-up covering herein can be provided in a custom width. In some embodiments, the plurality of slats can be joined to each other along their longitudinal edges at a plurality of discrete locations. This can be advantageous as it can prevent the material of the stiffeners from yielding unnecessarily. If desired, the roll-up covering material can be rolled up into a roll, wherein the longitudinal edges of the flexible slat material are parallel to a central axis defined by the roll. This can facilitate making roll-up coverings of any desired custom length.

The disclosure further provides a roll-up covering including the immediately preceding roll-up covering material, wherein the plurality of slats form an elongate planar body defining a first edge along one of the plurality of slats, wherein the roll-up covering further includes a roller attached to the elongate planar body proximate the first edge of the elongate planar body. If desired, at least one pair of adjacent slats can include elongate flexible planar bodies formed from different materials, such as opaque and translucent materials, materials of different colors, and/or materials of different patterns. If desired, the roll-up covering material can be provided with registration markings and printed with discrete segments of an image or design, wherein the design is formed when the roll-up covering material is assembled by attaching subsequent slat segments. If desired, at least one pair of adjacent slats can be of different widths. For example, two, three or more of the slats making up the roll-up covering and/or covering material can be of different widths.

The disclosure still further provides a method of forming a flexible slat material for forming a roll-up covering for an architectural opening. The slat material includes an elongate flexible planar body having a first end and a second end joined by a plurality of longitudinal edges, wherein at least one of the longitudinal edges is a stiffened edge that is stiffened along the length of the slat material along a first direction orthogonal to the stiffened edge. The method includes attaching an elongate stiffener along a face of the elongate flexible planar body.

If desired, in some embodiments, the stiffened edge(s) can include a generally planar elongate stiffener attached along the elongate flexible planar body desired, in some embodiments, the stiffened edge(s) can include a stiffener attached to the elongate flexible planar body substantially along its entire length, or between ten and one hundred percent of its length in increments of one percent. If desired, the stiffener(s) can be continuously attached to the elongate flexible planar body substantially along its entire length, or between ten and one hundred percent of its length in increments of one percent. If desired, the stiffener(s) can be continuously attached to the elongate flexible planar body along its entire length. If desired, the stiffener(s) can be intermittently attached to the elongate flexible planar body substantially along its entire length, or between ten and one hundred percent of its length in increments of one percent. If desired, the stiffener(s) can be intermittently attached to the elongate flexible planar body along its entire length. If desired, the generally planar stiffener(s) can include a crown along its length.

If desired, the method can further include attaching a generally planar stiffener having a crown along its length to the elongate flexible planar body proximate each of two opposing longitudinal edges of the elongate flexible planar body. The crowns of each of the generally planar stiffeners can be oriented in the same or opposite directions when the elongate flexible planar body is laid flat on a flat surface. If desired, the generally planar stiffeners can be visible, or can be covered by fabric, such as the fabric of the elongate flexible planar body. The generally planar stiffeners can include plastic and/or metallic material, such as aluminum. The aluminum material can be surface treated to promote adhesion with an adhesive material. For example, the aluminum material can be treated with a plasma or can be anodized or oxidized.

In another embodiment, a method of forming a flexible slat material for forming a roll-up covering for an architectural opening is provided, the slat material including an elongate flexible planar body having a first end and a second end joined by a plurality of longitudinal edges, wherein at least one of the longitudinal edges is a stiffened edge that is stiffened along the length of the slat material along a first direction orthogonal to the stiffened edge. The method includes impregnating the elongate flexible planar body with a stiffening material along the at least one stiffened edge to create the stiffened edge. In various embodiments, the stiffened edge of the slats/slat material is substantially less stiff along a second direction orthogonal to the stiffened edge.

The disclosure still further provides a method of forming a roll-up covering material configured to be rolled up, optionally around a roller of a roll-up covering for an architectural opening. The method includes providing a first elongate tape baying a first end, a second end, and defining a length between the first end and the second end, the first outer elongate tape further defining a lateral width, a thickness and a first central longitudinal axis between the first end and second end of the first outer elongate tape. The method further includes attaching at least one flexible slat to the first elongate tape, the at least one flexible slat being oriented transversely with respect to the first central longitudinal axis, the at least one flexible slat being a transversely stiffened slat including stiffened longitudinal edges connected by a flexible body portion, wherein the transversely stiffened slat is attached to the first elongate tape proximate a first stiffened longitudinal edges of the transversely stiffened slat. The method preferably further includes providing a second elongate tape distinct from the first elongate tape. The method still further includes attaching the second elongate tape to a second edge of the transversely stiffened slat. The second elongate tape has a first end, a second end, and defines a length between the first end and the second end. The second elongate tape further defines a lateral width, a thickness and a second central longitudinal axis between the first end and second end of the second elongate tape. The at least one flexible slat, first elongate tape and second elongate tape can define a roll-up covering material that is configured, to be rolled up around a roller.

A method of forming a roll-up covering for an architectural opening is similarly provided that includes providing a roller having a first end and a second end and defining a width between the first end and the second end, the roller defining a central rotational axis, and attaching the previously discussed roll-up covering material to the roller. In so doing, the first end of the first elongate tape can be attached to the roller such that the first central longitudinal axis of the first outer elongate tape is oriented generally orthogonally with respect to the central rotational axis of the roller. Moreover, the second elongate tape can be located radially inwardly with respect to the first outer elongate tape when the subassembly is rolled up around the roller. The second elongate tape can be configured to collapse upon itself as the roll-up covering is rolled around the roller. If desired, the second elongate tape can be between about 0.5% and about 25% longer than the first elongate tape between at least one pair of adjacent slats in the roll-up covering material, in any desired increment therebetween of about 0.5%.

In some embodiments, the roll-up covering and/or roll-up covering material can include a plurality of first elongate tapes and a plurality of second elongate tapes. The plurality of first elongate tapes can be attached to a portion of a first face of the at least one flexible Slat, and the plurality of second elongate tapes can be attached to a portion of a second face of the at least one flexible slat. If desired, at least two of the tapes can be of different widths. For example, at least two of the plurality of first and/or second elongate tapes can be of different widths.

It is to be understood that both the foregoing general description and the following detailed description are exemplary and are intended to provide further explanation of the embodiments disclosed herein.

DETAILED DESCRIPTION

Reference will now be made in detail to the present preferred embodiments of the disclosure, examples of which are illustrated in the accompanying figures.

The embodiments of roll-up coverings herein can be used for covering any desired architectural opening such as windows, sliding doors, French doors and the like. Ladder tapes as presented herein can be used with any desirable slat configuration to achieve a desired aesthetic appearance for a window covering. Roll-up coverings as set forth herein represent a significant improvement over existing technology. To Applicant's knowledge, no window coverings have existed before that provide all of the advantages, benefits, simplicity and aesthetic appeal of the disclosed embodiments.

Figure 1B:
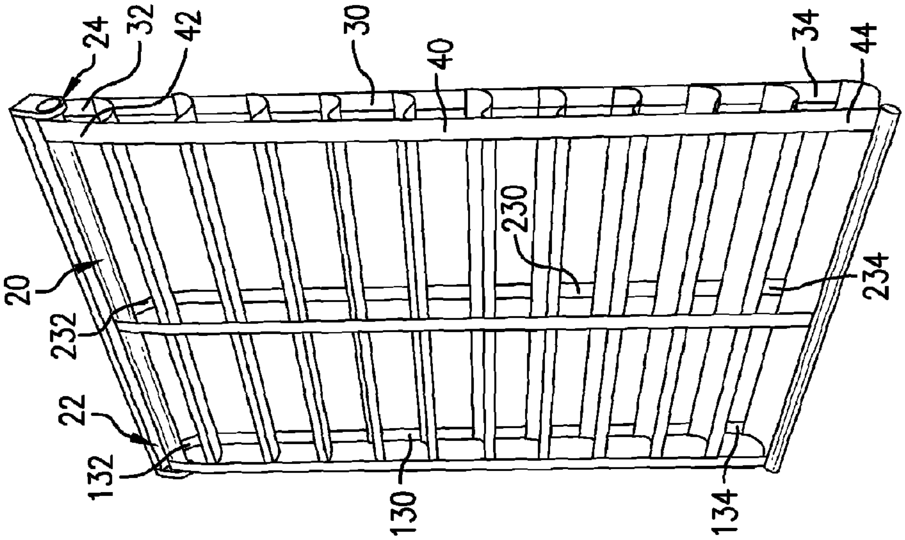
FIG. 1B depicts the roll-up covering of FIG. 1A having the deployed subassembly in an open condition illustrating the slats.
Figure 1A:
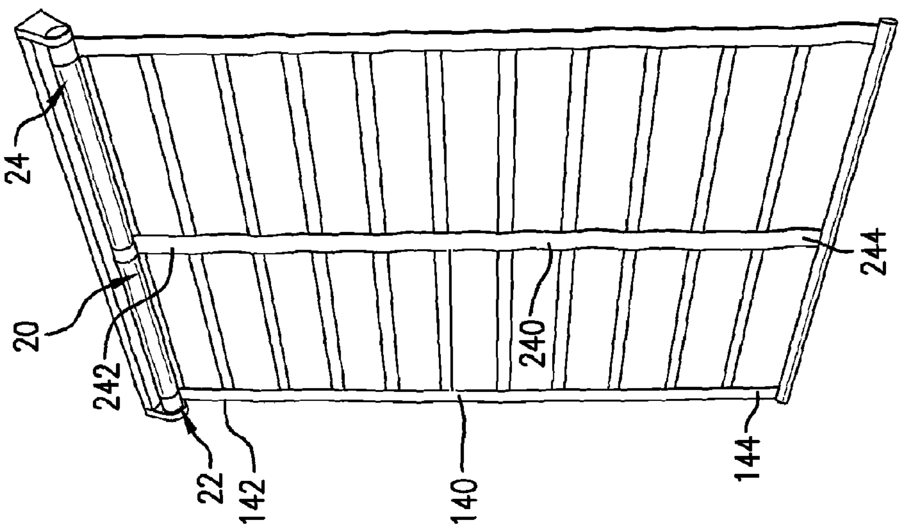
FIG. 1A depicts a first embodiment of a roll-up covering made in accordance with the disclosure having a deployed subassembly in a closed condition.
Figure 2:
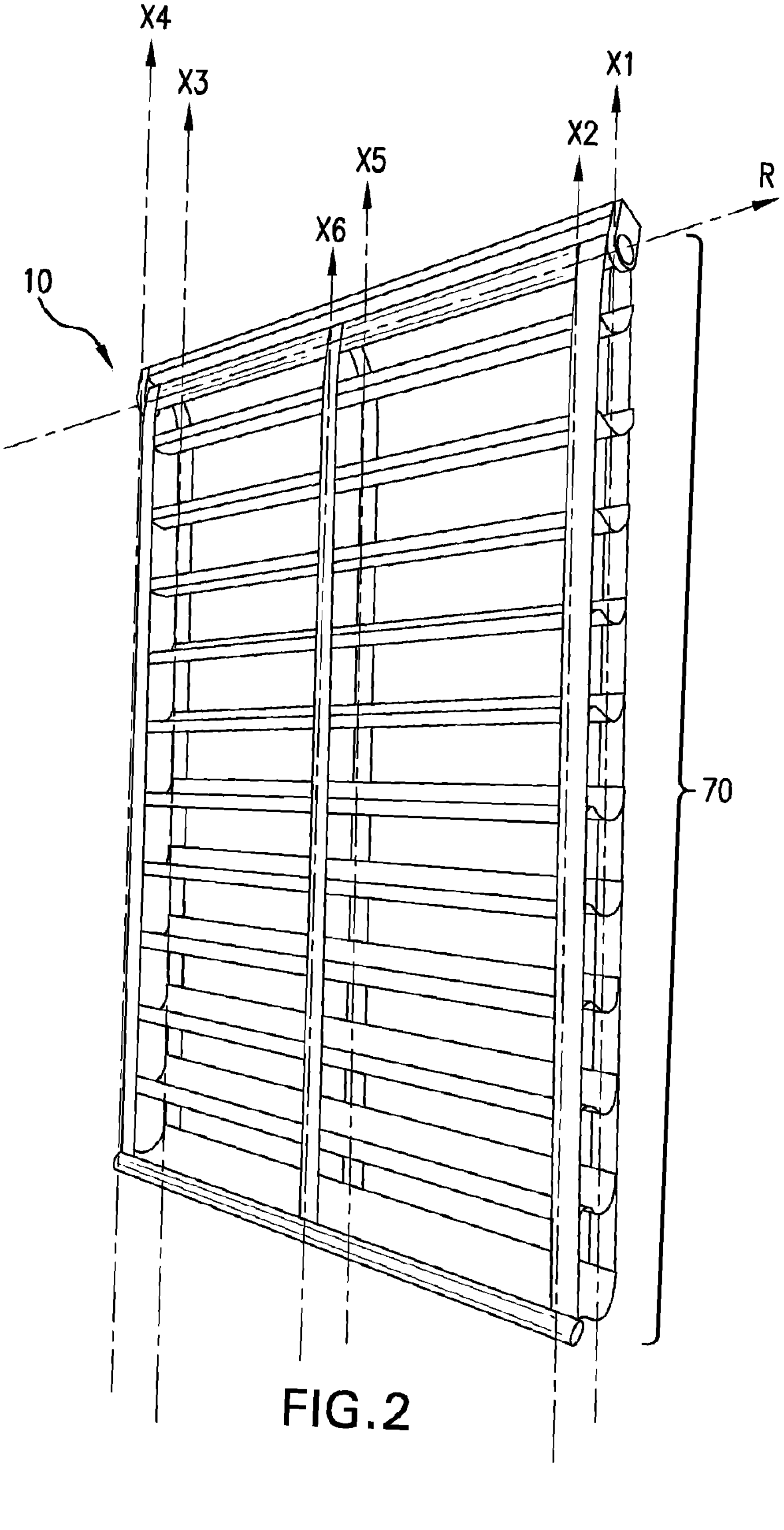
FIG. 2 depicts the embodiment of FIG. 1 illustrating a descriptive axial coordinate system.

For purpose of illustration and not limitation, a first embodiment of the device made in accordance with the present invention is illustrated in FIGS. 1A-1B and 2, a roll-up covering 10 for an architectural opening is illustrated. The roll-up covering 10 may include a roller 20 having a first end 22, a second end 24 and defining a width between the first end and, the second, ends. The roller preferably defines a central rotational axis "R". A pull chain 26 is provided that wraps around a portion of roller 20 in order to cause the roller to unroll the roll-up covering to unroll, open, close, and roll back up.

The roll-up covering 10 includes a first outer elongate tape 30 that in turn has a first end. 32, a second end 34, and defines a length between the first end and the second end. The first outer elongate tape 30 further defines a lateral width, a thickness and a first central longitudinal axis "X1." between the first end 32 and second end 34 of the first outer elongate tape 30, such as along a geometric, center of the first outer elongate tape 30. The first end 32 of the first outer elongate tape 30 can be attached to the roller such that the first central longitudinal axis of the first outer elongate tape is oriented generally orthogonally with respect to the central rotational axis "R" of the roller 20.

The roll-up covering 10 further includes a first inner elongate tape 40 disposed proximate to the outer elongate tape 30. The first inner elongate tape 40 has a first end 42, a second end 44, and defines a length between the first end 42 and the second end 44. The first inner elongate tape 40 further defines a lateral width, a thickness and a second central longitudinal axis "X2" between the first end. 42 and second end 44 of the first inner elongate tape 40. The first inner elongate tape 40 further defines a plurality of collapsible hinge segments 50 (FIG. 3) disposed along the length of the first inner elongate tape 40. As illustrated in FIGS. 8A-8D, the collapsible hinge segments 50 are configured to collapse in order to decrease the length of the first inner elongate tape 40 to a shortened "effective length" when the first inner elongate tape is rolled up around the roller. The collapsible hinge segments 50 are further configured to expand in order to return the effective length of the first inner elongate tape 40 to its full length when the roll-up covering 10 is unrolled from the roller 20. The first end 42 of the first inner elongate tape 40 can be attached to the roller 20 such that the second central longitudinal axis X2 can be oriented generally orthogonally with respect to the central rotational axis R. These innovations permit the first outer tape 30 and the first inner tape 40 to have the same, or substantially the same geometric length when the tapes are deployed, and at the same time effectively have different lengths, such that the first inner tape has a shorter effective length when the subassembly is rolled up, thus permitting the roll-up covering to roll up neatly and reliably.

As further illustrated in the Figures, the roll-up covering further includes a plurality of slats 60 disposed between and coupled to the first outer elongate tape 30 and the first inner elongate tape 40. The slats 60 can be oriented transversely with respect to the first and central longitudinal axes (X1, X2). The plurality of slats 60, first outer elongate tape 30 and first inner elongate tape 40 define a subassembly 70 that is configured, to be rolled up, such as around the roller 20, wherein the first inner elongate tape 40 is located radially inwardly with respect to the first outer elongate tape 30 when the subassembly is rolled up around the roller. Locating tape 40 radially inwardly from tape 30 results in tape 40 needing to have a shorter effective length than tape 30 when rolled up. The collapsible hinge segments 50 facilitate this. Each collapsible hinge segment includes a displaceable body portion 52 that is bounded by a lower hinge 54 and an upper hinge 56. As illustrated in the figures, when the subassembly 70 is rolled around the roller, the inner tape 40 buckles outwardly from the second central longitudinal axis X2, and forces the body portion 52 to be displaced and bent over the lower hinge 51 such that the inner tape effectively folds upon itself at each hinge point in order to shorten its effective length when rolled up, and permit the subassembly to roll up neatly around the roller. For purposes of clarification, not limitation, it will be appreciated that the width of the subassembly corresponds to the length of the slats, and generally corresponds to the substantially horizontal width of the architectural opening to be covered by the subassembly.

In accordance with a further aspect, the subassembly 70 can be configured to reside in a collapsed configuration (FIG. 1A) wherein the slats 60 are closed when the subassembly 70 is initially unrolled from the roller. The slats 60 are preferably oriented parallel to the first inner elongate tape 40 and the outer elongate tape 30 when the subassembly 70 is in the collapsed configuration. In this manner, the slats 60 are closed or substantially closed when the subassembly 70 is initially unrolled from the roller 20. The subassembly 70 can be deployed from the collapsed configuration (FIG. 1A) into an expanded configuration (FIG. 1B) wherein the slats are opened by further rotation of the roller.

Figure 5F:
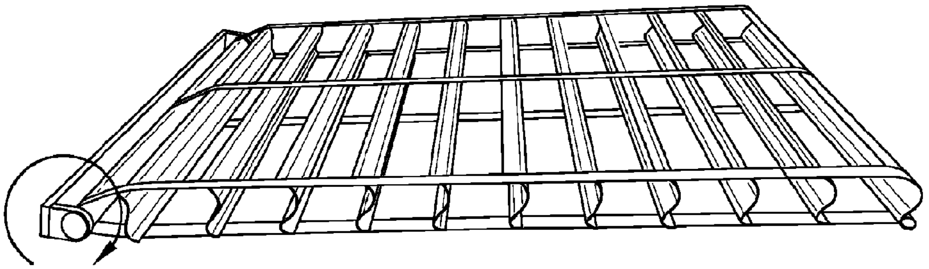
FIGS. 5A-5F depict progressive views of the roll-up covering of FIG. 1 in successive stages of deployment.
Figure 5E:
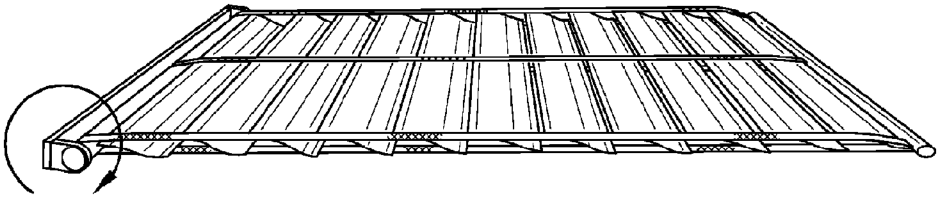
Figure 5D:
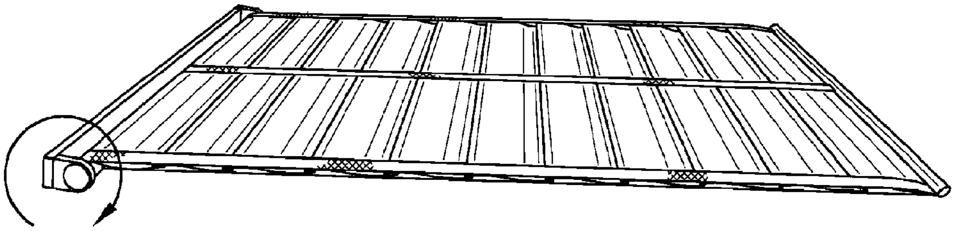
Figure 5C:
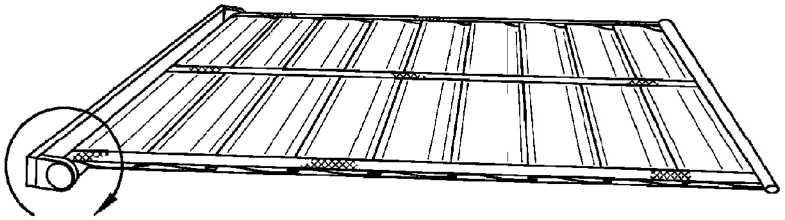
Figure 5B:
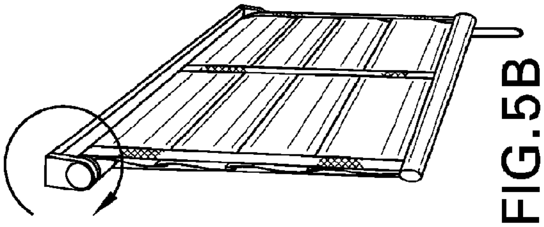
Figure 5A:
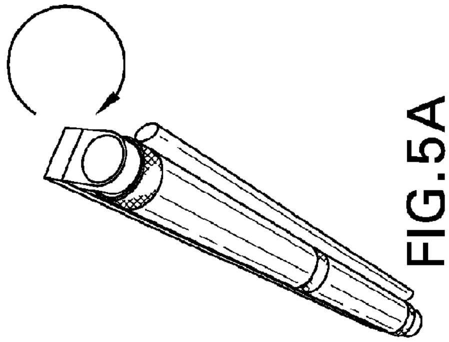

FIGS. 5(A)-5(F) depict progressive views of the roll-up covering of FIG. 1 in successive stages of deployment by rolling up the roll-up covering, such as by rotating the roller in the direction indicated. Closure and wind up of the roll-up covering is simply achieved by rotating the roller 20 in a direction opposite the arrow. As is evident, in the illustrative embodiment, the first outer elongate tape 30 and the first inner elongate tape 40 can be substantially parallel along their length when the subassembly 70 is in the collapsed configuration (FIG. 5D) and the expanded configuration (FIG. 5F). Moreover, the first outer elongate tape 30 and, the first inner elongate tape 40 can be substantially parallel along their lengths while the subassembly is being deployed from the collapsed configuration into the expanded configuration (FIG. 5E). In an alternative embodiment, the tapes 30, 40 can be configured so as to not be parallel during deployment, such as when the spacing between adjacent slats is varied in order to cause the slats to open in a first part of the roll-up covering to open earlier than slats in a second part of the covering. For example, as discussed below, the slats 60 in a lower region of the roll-up covering 10 can be caused to open before slats 60 in an upper region of the covering 10.

Figure 4:
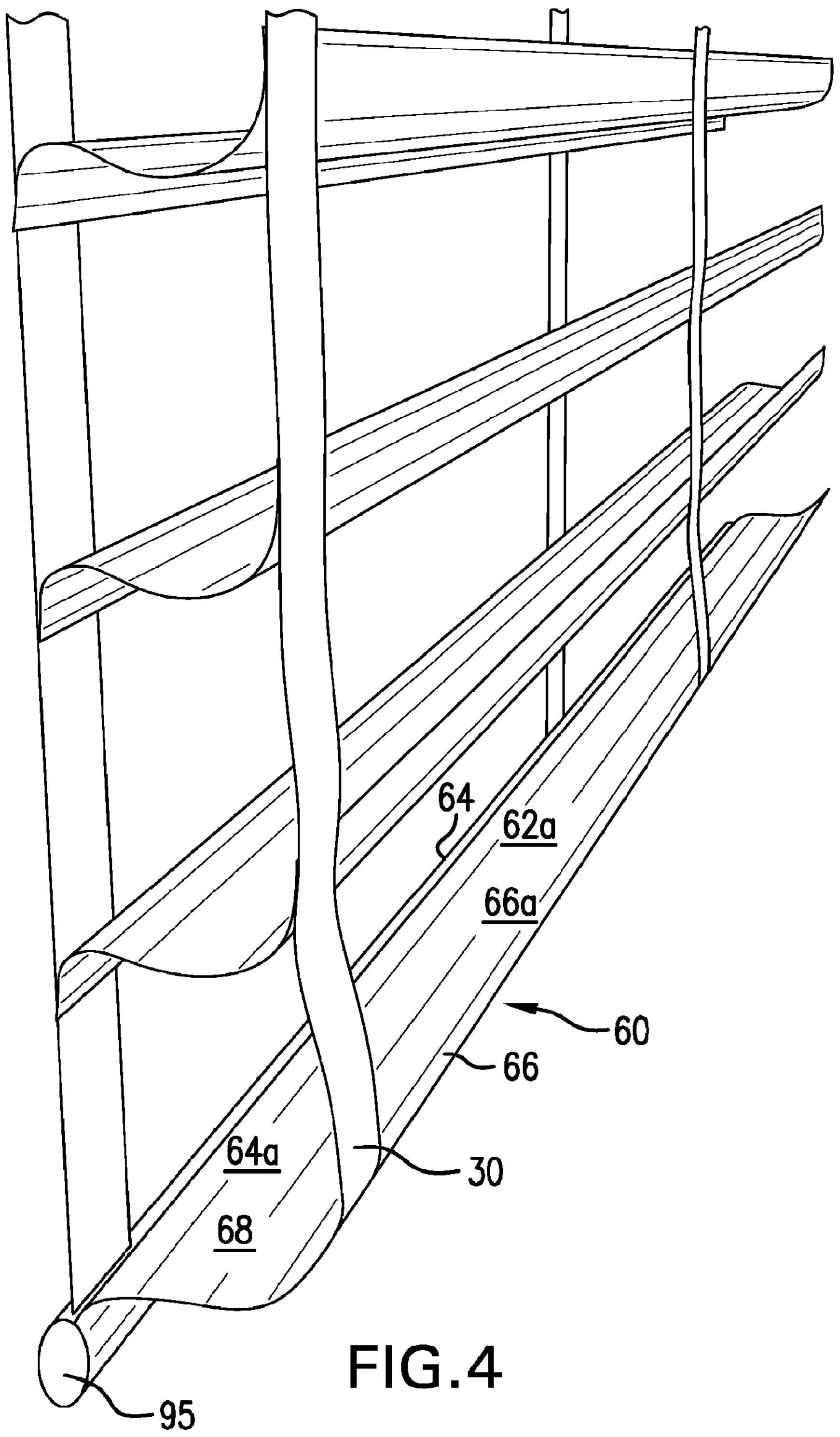
FIG. 4 depicts a close up view of a lower portion of the embodiment of FIG. 1.
Figure 6:
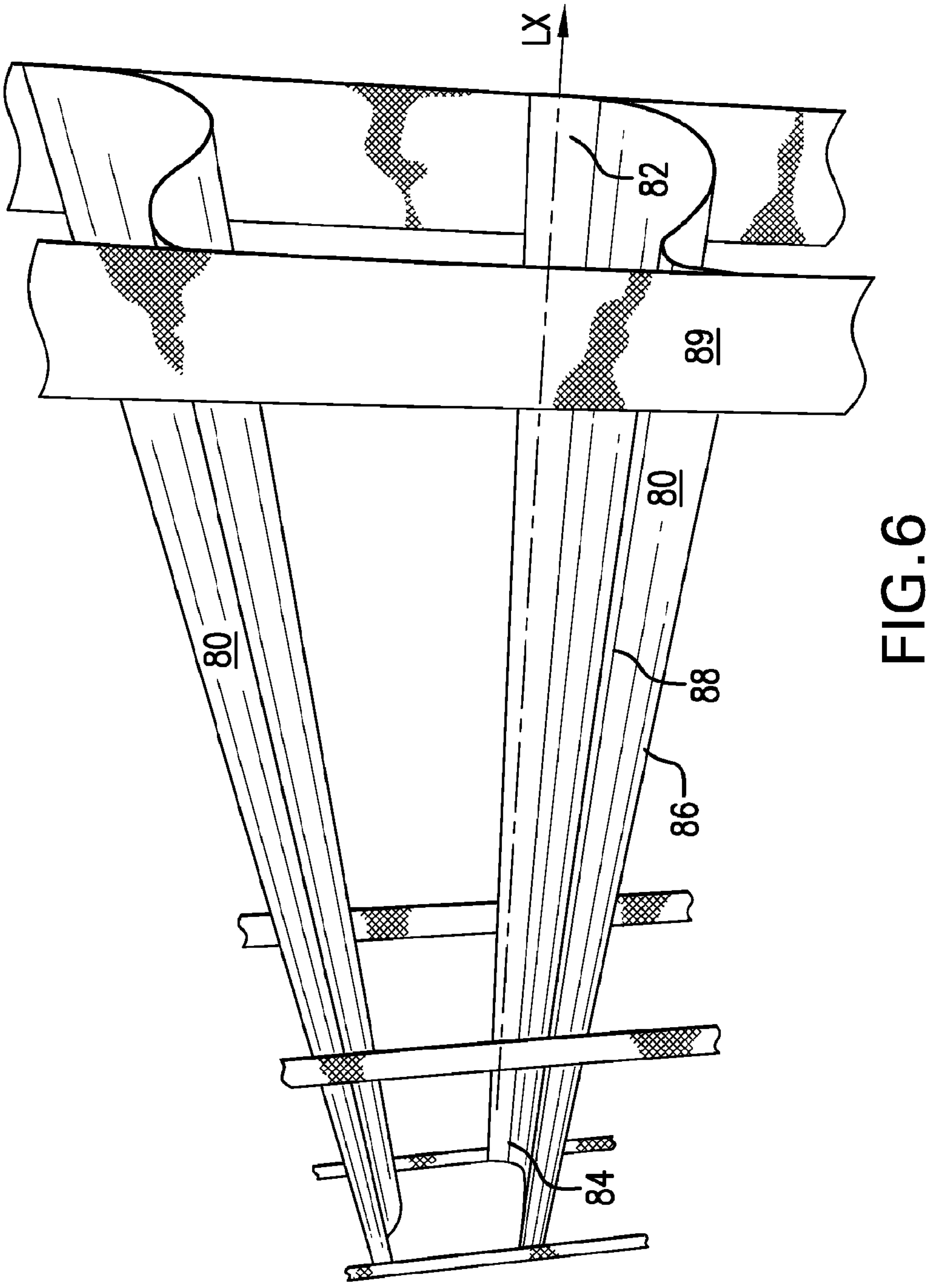
FIG. 6 depicts a close up view of a portion of the embodiment of FIG. 1 illustrating positioning and orientation of the stiffeners in the slats.
Figure 7A:
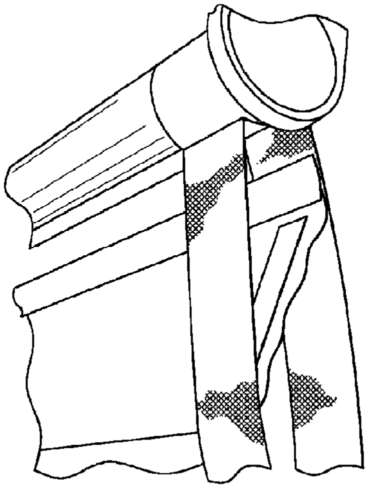
FIGS. 7A-E illustrate an upper portion of the roll-up covering of FIG. 1 detailing the manner of assembly of the tapes to the roller and the alignment of the tapes with the roller, as well as illustrating a transverse stiffener.
Figure 7B:
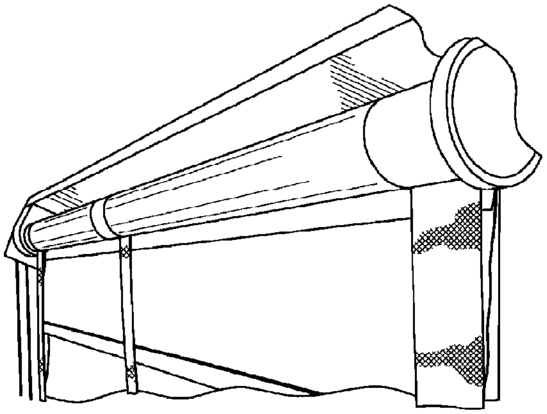
Figure 7C:
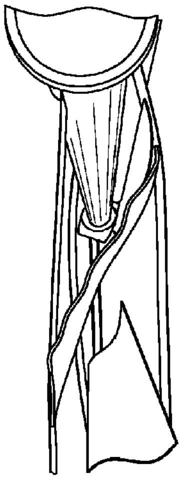
Figure 7D:
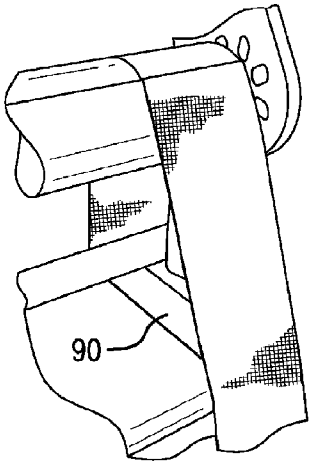
Figure 7E:
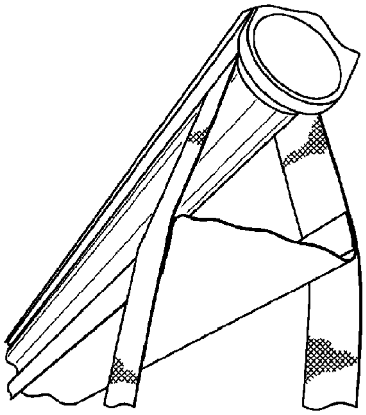
Figure 8A:
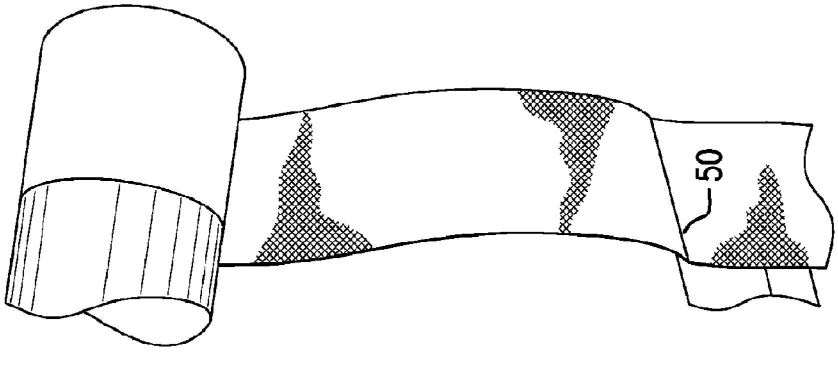
FIGS. 8A-8D depict progressive views of the roll-up covering of FIG. 1 in a process of rolling up, illustrating the manner in which the hinge on the inner tape collapses upon itself.
Figure 8B:
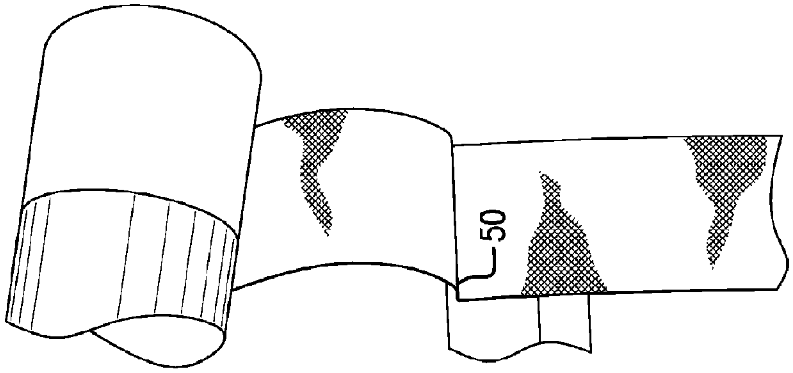
Figure 8C:
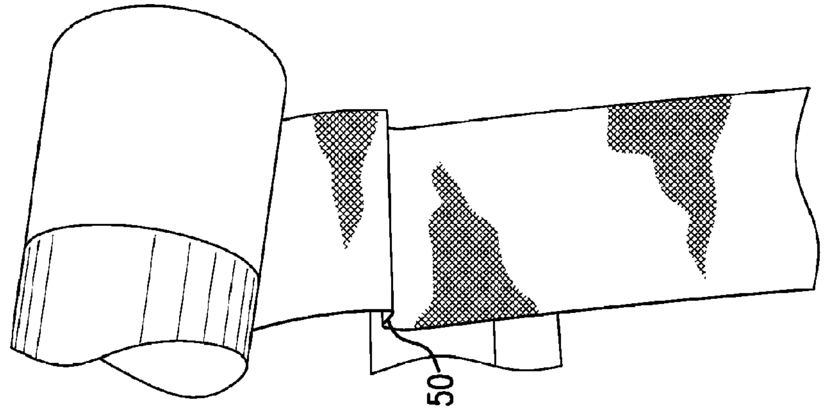
Figure 8D:
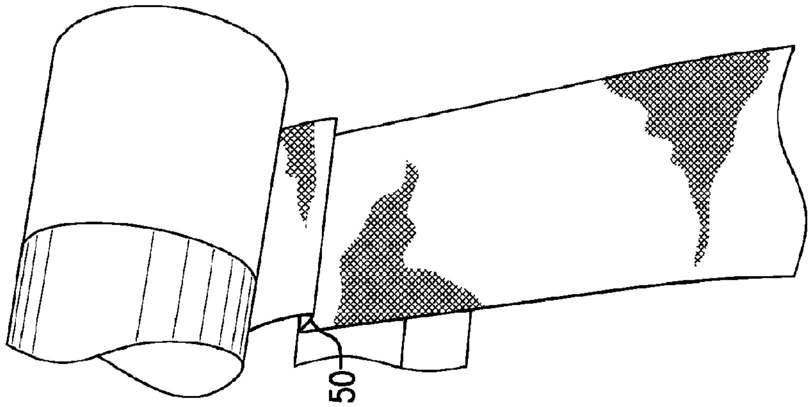

In accordance with a further aspect, as illustrated in FIG. 4, a plurality of the slats 60, and if desired, all of the slats 60 can have an elongate, flexible generally planar body 62 that has an inner longitudinal edge 64 attached to the first inner elongate tape 40, an outer longitudinal edge 66 attached to the first outer elongate tape 30, and side edges 68 joining the inner longitudinal edge and outer longitudinal edge. In some implementations, at least one of an inner edge region 64*a* along the inner longitudinal edge 64 of at least one slat 60 and an outer edge region 66*a* along the outer longitudinal edge 66 of the at least one slat 60 can be stiffer than a region 62*a* (e.g., the central longitudinal region) between the inner edge 64 and outer edge 66 of the at least one slat 60, such that the slat hangs freely when not under tension. As illustrated in the Figures, the slats 60 take on an “S” or “Z”-shaped cross section depending on how much tension they are under. Notably, the slats are configured to freely “flex” between their longitudinal edges to change from a generally flat orientation to the “S” or “Z” cross section. Such flexibility of slats 60 can provide a versatile geometry for the roll-up covering. In some implementations, at least one of the inner edge region 64*a* and the outer edge region 66*a* can include at least one elongate stiffener 80 (FIG. 6) for increasing the stiffness of the at least one slat. The at least one elongate stiffener has a first end 82, a second end 84, a lower edge 86 and an upper edge 88. The stiffener 80, as depicted, defines a length and a central lateral axis “LX” along its length. Thus, the inner edge 64, outer edge 66, or both edges 64, 66 can be provided with one or more such stiffeners 80. The stiffeners in FIG. 6 are embedded within the fabric of the slat 60, cut have a concavity that faces inwardly toward, the roller 20 when the subassembly 70 is rolled up. In other implementations, the concavity of both stiffeners can face in the same direction as illustrated in the exemplary embodiment of FIGS. 13-15 and 19.

Figure 25A:
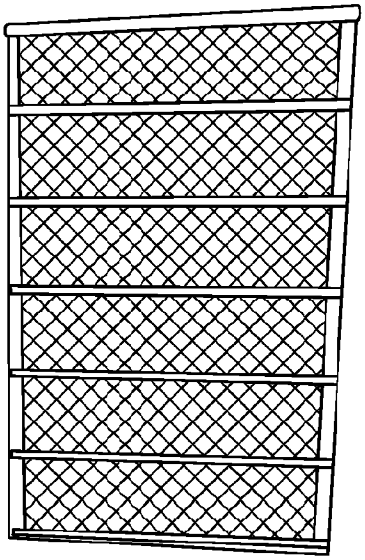
FIGS. 25A-25B are embodiments of roll-up coverings made in accordance with the disclosure made from mesh-like fabric.
Figure 25B:
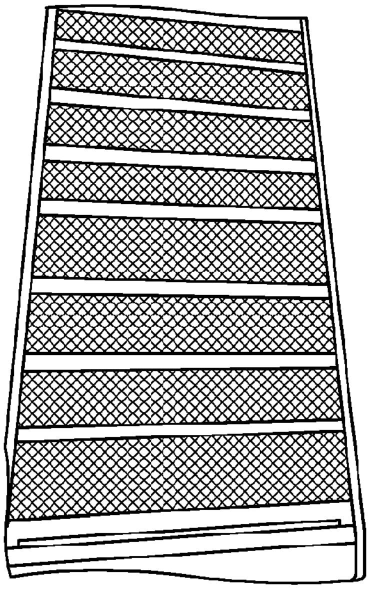
Figure 25C:
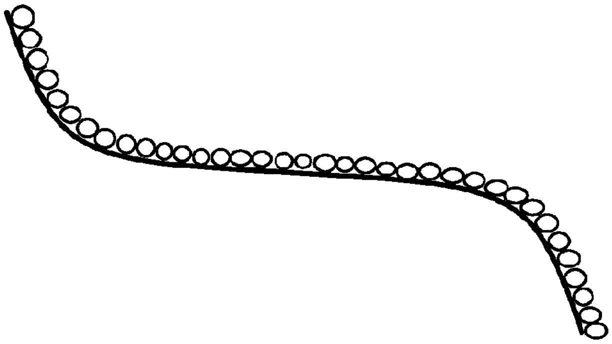
FIG. 25C presents an embodiment of a slat having stiffeners, such as plastic rods or piano wire, along its length across the width of the slat.

While a stiffener 80 is generally depicted herein as including a crowned slat material, the stiffener can be located along some or all of the expanse of the slat. For example, FIG. 25C illustrates an embodiment having stiffening filaments along its entire extent from the first longitudinal edge to the second longitudinal edge. It will be appreciated that such stiffeners need not span the entire area of the slat from edge to edge, but can instead occupy only a portion of the width or depth of the slat 60. FIG. 25C is an end view or cross sectional view of such an embodiment.

As will be appreciated, the cross section of the stiffener 80 is generally vertically oriented, and provides a substantial sectional modulus and rigidity to the slats 60. As illustrated, the stiffeners can be substantially planar (e.g., flat, crowned, creased, and the like) and lay in substantially the same plane as one of the first central longitudinal axis X1 of the first outer elongate tape 30 and the second central longitudinal axis X2 of the first inner elongate tape. The at least one stiffener 80 can further define a width perpendicular to the length, and a thickness perpendicular to the width and the length, as clearly evident from the Figures. The stiffener 80 can have a curved cross section in a plane perpendicular to the central lateral axis (e.g. be “crowned”) such that a first curved planar face of the at least one elongate stiffener can be convex and a second, opposite curved planar face of the at least one elongate stiffener can be concave. The concave face of the at least one stiffener preferably faces the roller 20 when the subassembly 70 is rolled up around the roller. The concave face of the stiffener 80 can have a radius of curvature “r” that substantially matches a radius of curvature of the roller 20. As illustrated, the at least one stiffener 80 has a thickness that is substantially smaller than its width.

As illustrated, each of the slats 60 includes stiffeners along each longitudinal edge, and the concave faces of the stiffeners face the same way and are configured to face and engage with a curved surface defined by the roller 20 when the subassembly 70 is retracted around the roller 20.

Figure 3:
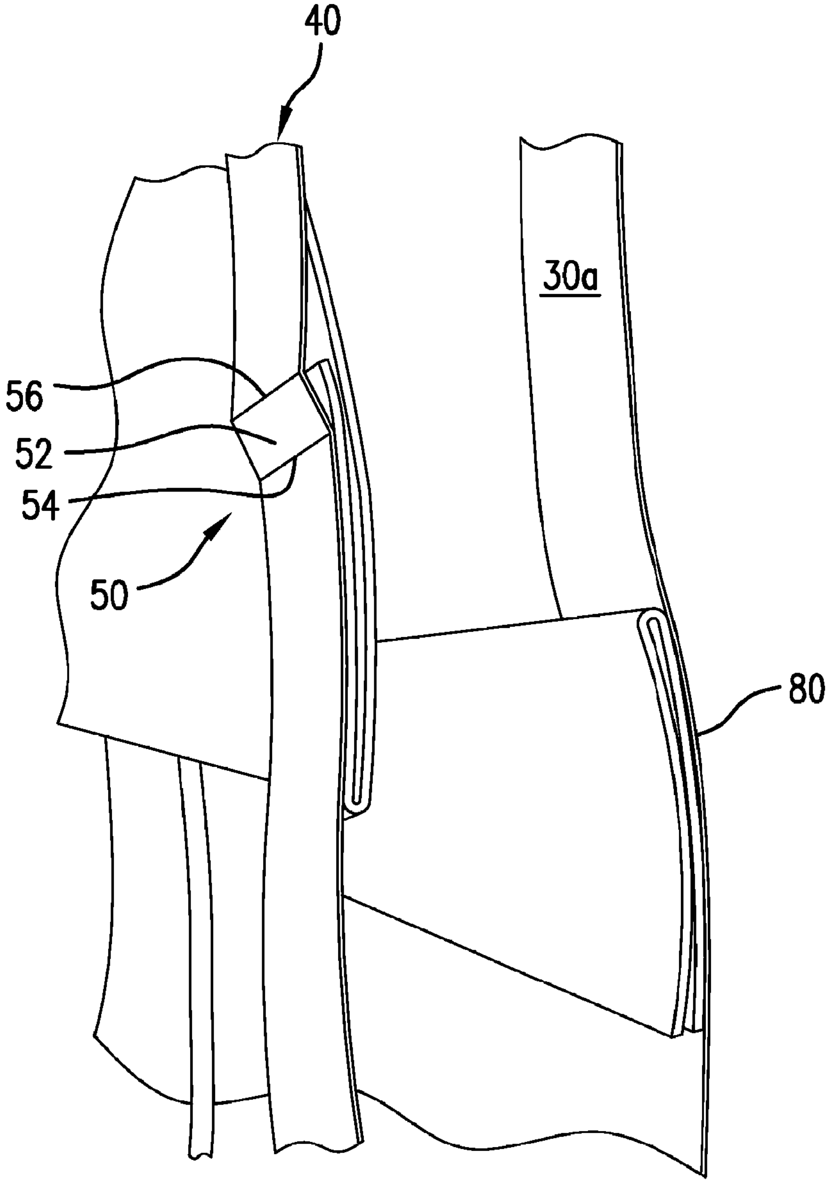
FIG. 3 depicts a close up view of a portion of the embodiment of FIG. 1 illustrating a hinge section of the first inner elongate tape.

As illustrated in FIG. 35 the flexible material of the slats 60 can be disposed between and attached to an outwardly facing face 40*a* of the first inner tape 40 and an inwardly-facing concave face of a first stiffener along the inner edge 64 of the slat 60. If desired, the first stiffener 80 can be disposed in a sleeve as depicted in FIG. 3 (such as by folding over the fabric of the slat 60) that is defined, along an interior portion of the slat 60. The flexible fabric material of the Slat 60 can similarly be disposed between and, attached to an inwardly facing face of the first outer tape and an outwardly-facing convex face of the second stiffener 80 along the outer edge 66 of the second slat 80, among other possible configurations. The flexible fabric material of the slats 60 can be attached to the tapes along a two dimensional contact or bonding area 89 (FIG. 6) that lies within the plane of the tapes. For example, the contact or bonding area 89 can be generally rectangularly-shaped, triangularly shaped, “X”-shaped, “L”-shaped, as desired. The flexible fabric material of the slats 60 can be attached the tapes 30, 40 by one or more of (i) an adhesive, (ii) at least one fastener, (iii) stitching, (iv) three dimensional weaving and (v) ultrasonic welding.

In accordance with, a further aspect, at least one of the slats can include at least one transverse stiffener 90 attached to the at least one slat (FIG. 7) in a region of the slat. 60 disposed between the first outer elongate tape 30 and first inner elongate tape 40. Any desired number of slats 60 can be provided with the stiffener 90 in order to help maintain uniform spacing between the tapes 30, 40 when the subassembly 70 is deployed. In one embodiment, one or more such transverse stiffeners 90 can be provided in, on or under a top slat (FIG. 7) in the subassembly 70 to resist an inwardly compressive force arising from a combination of the weight of the subassembly acting in concert with an angulation of the inner and outer tapes 30, 40 proximate the roller 20. As will be appreciated, in the region of the top slat, the top slat, inner and outer tapes essentially form a triangle with the roller at its apex. As such, a substantial lateral compressive force (front to back) is experienced by the stiffener 90.

As depicted in the figures, the transverse stiffener is further positioned between the longitudinal stiffeners along the side edges of the top slat 60, thus ensuring that the top slat 60 can maintain its shape during and after deployment. When the transverse stiffener 90 is disposed on an upper slat in the subassembly, the at least one transverse stiffener is thus adapted to maintain the upper slat in a generally open condition, and causes the first outer elongate tape 30 to be separated from the first inner elongate tape 40. If desired, and as presented in the Figures, the transverse stiffener 90 can be disposed across the slat 60 between the first outer elongate tape 30 and the first inner elongate tape 40 to act as a strut to separate the tapes 30, 40. Moreover the transverse stiffener 90 can be crowned similar to the stiffeners 80 for enhanced sectional modulus and column strength. Preferably, and as illustrated, the transverse stiffener 90 is a crowned member that can buckle or otherwise collapse and roll-up around the roller when the subassembly is retracted around the roller.

As illustrated in the Figures, the first inner elongate tape and first outer elongate tape are aligned behind each other such that they roll on top of each other when the subassembly 70 is retracted around the roller 20. In an alternative embodiment (not shown) the first inner elongate tape 40 and first outer elongate tape 30 can be laterally displaced from each other along the length of the slats such that they are not behind each other, and do not roll on top of each other when the subassembly is retracted around the roller. In accordance with a further example, the first inner elongate tape and first outer elongate tape can have different lateral widths (not shown), such as from about 5 mm to about 100 mm in increments of 1 mm. Furthermore, a different number of tapes can be provided along the outer edges of the slats as compared to the inner edges. For example, two outer tapes can be provided along the outer edges of the subassembly, and a single inner tape can be provided along the center of the inner edges of the subassembly 70. Alternatively, more tapes can be provided along the inner edges of the subassembly, and fewer tapes can be provided along the outer edges of the subassembly.

Figure 9B:
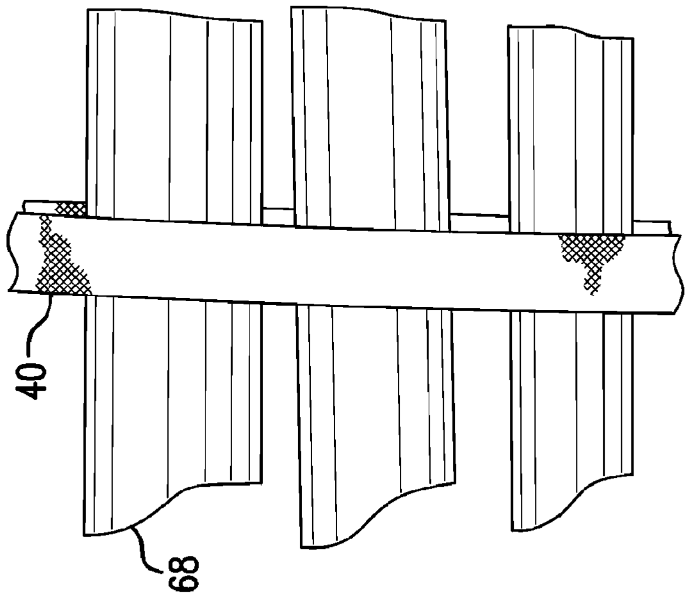
FIGS. 9A-9B illustrate embodiments of a roll-up covering including a single pair of tapes disposed along the middle of the slats.
Figure 9A:
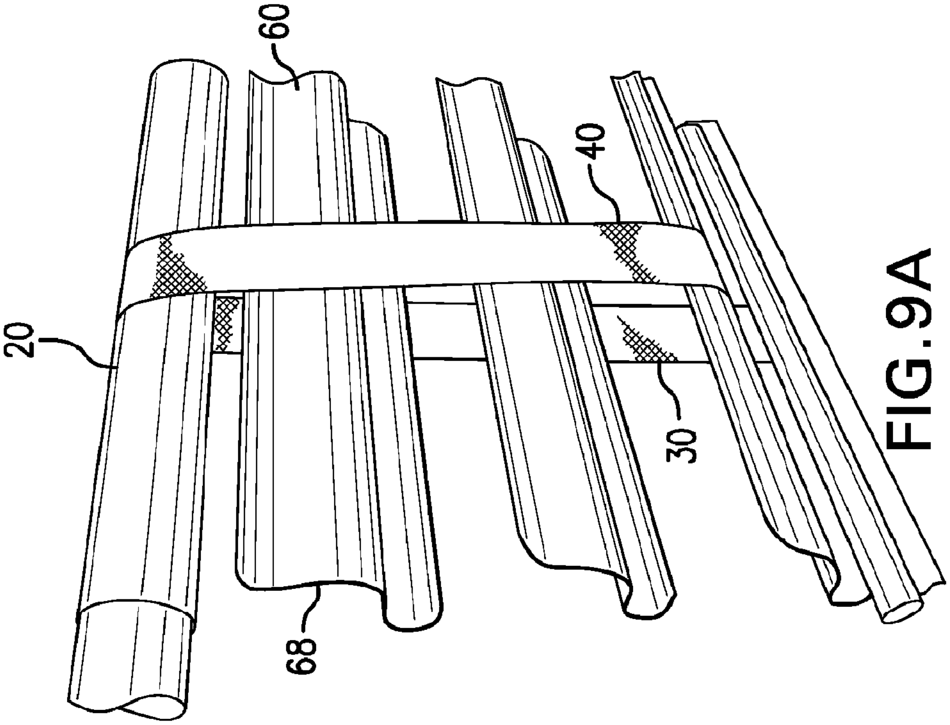

In accordance with one embodiment, and as illustrated in FIGS. 9A-B, the first inner elongate tape 40 and first outer elongate tape 30 can be attached proximate to a center of the roller 20 between the first end 22 and the second end 24 of the roller 20. As illustrated, the ends 68 of the slats 60 of this embodiment are freely floating by virtue of using one or more longitudinal stiffeners 80 along the inner and outer edges 64, 66 of each slat 60 such that the portions of the slats extending beyond the tapes are self-supporting. As is evident, the slats 60 can be plainly colored or can have a pattern printed on them. In one embodiment, the length of the first inner elongate tape 40 between the roller and the first slat is greater than the length of the first outer elongate tape 30 between the roller and that same first slat.

In accordance with another embodiment, and as illustrated in FIGS. 7A-E, the first inner elongate tape 40 and first outer elongate tape 30 are attached to the slats proximate to a first end of the slats. As illustrated, the roll-up covering further includes a second outer elongate tape 130 having a first end 132, a second end 134, and defining a length between the first end and the second end. The second outer elongate tape 130 can further define a lateral width, a thickness and a third central longitudinal axis "X3" between the first end 132 and second end 134 of the second outer elongate tape 130. The first end 132 of the second outer elongate tape 130 can be attached to the roller 20 such that the third central longitudinal axis X3 of the second outer elongate tape 130 can be oriented generally orthogonally with respect to the central rotational axis R of the roller 20, and be displaced laterally along the width of the roller from the first outer elongate tape 30, such as at the second end of the roller 20, or another location. As illustrated, the roll-up covering further includes a second inner elongate tape 140 disposed proximate to the second outer elongate tape 130. The second inner elongate tape 140 can have a first end 142, a second end 144, and define a length between the first end 142 and the second end 144. The second inner elongate tape 140 can further define a lateral width, a thickness and a fourth central longitudinal axis X4 between the first end 142 and second end 144 of the second inner elongate tape 140. The second inner elongate tape 140 can further define a plurality of collapsible hinge segments 150 disposed along the length of the second inner elongate tape 140. The collapsible hinge segments 150 are the same in operation as hinge segments 50. As illustrated, the second inner elongate tape 140 and second outer elongate tape 130 are attached proximate to a second end of the slats 60. It will be appreciated with reference to FIGS. 7A-E that the first inner elongate tape 40, the first outer elongate tape 30, the second inner elongate tape 140, and the second inner elongate tape 130 visually form a frame for the roll-up covering of the illustrated embodiment as a result of being positioned proximate to or at the ends of the slats, rather than spaced inwardly from the ends of the slats.

As further illustrated in FIGS. 1A-1B, the roll-up covering can further include a third outer elongate tape 230 having a first end 232, a second end 234, and defining a length between the first end 232 and the second end 234. The third outer elongate tape 230 can further define a lateral width, a thickness and a fifth central longitudinal axis X5 between the first end 232 and, second end 234 of the third outer elongate tape 230. The first end 232 of the third outer elongate tape 230 can be attached to the roller 20 such that the fifth central longitudinal axis X5 of the third outer elongate tape 230 can be oriented generally orthogonally with respect to the central rotational axis R of the roller 20. As illustrated, the roll-up window covering still further includes a third inner elongate tape 240 disposed proximate to the third outer elongate tape 230. The third inner elongate tape 240 has a first end 242, a second end 244, and defines a length between the first end 242 and the second end 244. The third inner elongate tape 240 can further define a lateral width, a thickness and a sixth central longitudinal axis X6 between the first end 242 and second end 244 of the third inner elongate tape 240. The third inner elongate tape 240 can further define a plurality of collapsible hinge segments 250 disposed along the length of the third inner elongate tape. The collapsible hinge segments 250 are the same in operation as hinge segments 50 and 150. As illustrated, the third inner elongate tape 240 and third outer elongate tape 230 are attached proximate to a central region of the slats 60. If desired, at least one of the third inner elongate tape 240 and the third outer elongate tape 230 can have a smaller width than, the first inner elongate tape 40, the first outer elongate tape 30, the second inner elongate tape 140, and the second inner elongate tape iso, to cause the roll-up covering to have the appearance of a shutter due to having tapes of greater widths proximate to or at the ends of the slats and at least one tape of a smaller width substantially at or near the center of the slats, while still providing the benefit of being able to be rolled into a retracted configuration.

As further illustrated in the Figures, the roll-up covering can further include a weight 95 proximate to the second ends of the first, second, and/or third inner elongate tapes 34, 44, 134, 144, 234, 244. The weight is preferably configured to maintain tension on the first inner elongate tape. The weight can be of any shape, but for purposes of simplicity it can be a weighted bar that spans the width of the roll-up covering.

In accordance with still further aspects, each of the aforementioned plurality of collapsible hinge segments 50, 150, 250 can be disposed proximate to a slat 60 in the subassembly 70. In some implementations, each hinge segment 50, 250, 350 can be defined by a plurality of spaced apart transverse crease lines 54, 56, 154, 156, 254, 256 defined in the applicable tape 40, 140, 240 inner elongate tape. In some implementations, the hinge segment(s) can fold downward onto an exterior face 40*b*, 140*b*, 240*b* of the inner elongate tape(s) When the subassembly 70 is rolled onto the roller. In some embodiments, a lower crease line 54, 154, 254 defining the hinge segment can be disposed proximate to an inner transverse edge 64 of one or more of the slats 60. If desired, the lower crease line(s) can be disposed immediately above a region where the first inner elongate tape is attached to the transverse edge of the slat.

In accordance with a further aspect, the slats are preferably formed from a flexible fabric material. The stiffeners 80, 90 can be formed, for example, from at least one of a rigid plastic material, a metallic material, such as aluminum, titanium, brass or steel, ceramic, rigid foam, or the like. Alternatively, the stiffeners can be formed and shaped like wires.

The tapes 30, 40, 130, 140, 230, 240 are preferably made from a flexible material. If desired, the crease lines 54, 56, 154, 156, 254, 256 can be crush formed into the flexible material. For example, the flexible material can be selected from the group including films and textiles. If desired, the textile can be selected from the group consisting of knits, wovens and non-wovens. The flexible material used for the tapes 30, 40, 130, 140, 230, 240 preferably have a thickness between about 1-30 mils, 1.5-25 mils, 2-25 mils, 3-20 mils, 4-18 mils, 6-16 mils, 8-14 mils, and about 10-12 mils. It will be appreciated however that crush formation is not required, and the material of the tapes can be sufficiently flexible to permit the hinge segments to be formed each time the covering is rolled up. Specifically, the inner elongate tape will collapse upon itself as the edge of the slat including the stiffening member 80 approaches the roller, by virtue of the fact that the hinge is being "squeezed" into shape as illustrated, for example, in FIGS. 8A-8D.

Hinge formation during roll up can be facilitated by making the inner elongate tape (e.g., 40) between subsequent slats slightly longer than the outer elongate tape (e.g., 30) between the same subsequent slats. Specifically, having a comparatively longer inner tape segment makes that tape segment longer than the outer tape, providing additional material to encourage the hinge to form and collapse during roll-up of the roll-up covering 10. For example, the inner tape segment between adjacent slats can be about 0.5%, about 1.0%, about 1.5%, about 2.0%, about 2.5%, about 3.0%, about 3.5%, about 4.0%, about 4.5%, about 5.0%, about 5.5%, about 6.0%, about 6.5%, about 7.0%, about 7.5%, about 8.0%, about 8.5%, about 9.0%, about 9.5%, or about 10.0% longer (or greater than 10% in any desired increment of about 0.5% up to about 25%) than its corresponding outer tape segment. It win be further appreciated that the distance between a first pair of slats along the inner and outer tapes can be different than the distance between a second pair of slats along the inner and outer tapes. For example, the length of the inner tape(s) can be a first percentage longer than the outer tape(s) between a first pair of slats, and the length of the inner tape(s) can be a second percentage longer than the outer tape(s) between a second pair of slats. Moreover, the length of the inner tape(s) can be a third percentage longer than the outer tape(s) between a third pair of slats. Accordingly, completely custom spacing of the slats along the inner and outer tapes can be achieved, as well as custom widths to fit a desired opening.

In some embodiments, the tapes 30, 40, 130, 140, 230, 240 and slats 60 can be made from a woven material such as a Roc-Lon® blackout drapery liner material, manufactured by Rockland Industries, Inc. (1601 Edison Hwy, Baltimore, MD 21213, (410) 522-2505). In some implementations, the stiffeners 80, 90 can be polymeric or aluminum crowned blind slats that are about 0.008 inches thick and 16 mm wide. In alternative embodiments, the width of the stiffeners 80, 90 can vary from about 3⁄16 of an inch to about 5⁄8 inch or up to about one inch. A larger stiffener width can be appropriate, particularly for slats of larger depth (e.g., 4, 4.5, 5, 5.5 or 6 inches).

In accordance with further aspects of the disclosure, subsequent slats 60 can be separated by a substantially uniform distance along the first outer elongate tape 30 and the first inner elongate tape 40. If desired, such a distance can be a standard distance (e.g., 60 mm, 72 mm), or the spacing can be customized to any desired length, as subsequent slats can be overlapped to any desired extent, such as about 5%, 10%, 15%, 20%, 25%, 30%, 35%, 40%, 45%, 50% or any increment therebetween of 1%. Thus, a custom roll-up covering 10 may be provided wherein the spacing between adjacent slats is determined by taking the dimensions of the architectural opening or structure the covering is intended to be installed within or on (e.g., the total height of the sub assembly) and dividing such total custom height of the subassembly by a number of desired slats. Thus, it is possible to provide a custom subassembly of custom height with a custom, uniform distance between the slats, such that the subassembly has a slat or other feature (e.g., a weighted bar, a bottom rail, a bottom weight) at the second end of the elongate tapes and such bottom-most slat or other feature (e.g., a weighted bar, a bottom rail, a bottom weight) is separated from the next adjacent slat by the same distance separating other adjacent slats. In other words, a roll-up covering may be formed with slats that are uniformly spaced across the total length (also referred to herein as height) of the roll-up covering or subassembly, in contrast with other types of window coverings with horizontal elements that are spaced apart at predetermined distances and therefore cannot always be sized so that the horizontal element is spaced the same distance as the slat above it as the distance and spacing of other adjacent slats. In other types of window coverings the spacing between adjacent slats is uniform, predetermined, and fixed (such as because spacing is dependent on other elements of the covering, such as support elements for the slats), and the height is selected without changing the spacing of the horizontal elements, rather than as in embodiments of the present covering and subassembly where the height is selected first and the spacing of the horizontal elements is changed based on the total height of the covering or subassembly. And, in contrast with other types of slatted shades which have predetermined spacings between the slats (e.g., venetian blinds with the spacing of adjacent slats dictated by the rungs of the ladder tapes supporting the slats), the slats 60 of the disclosed roll-up coverings may be coupled to the first outer elongate 30 and the first inner elongate tape 40 at any desired location along their length such that the spacing between the slat 60 is fay customizable, and may be varied according to the desired custom height of the roll-up covering. It will be appreciated that the length of a customizable roll-up covering formed in accordance with the above may be set by the lengths of the inner elongate tape and the outer elongate tape (or any other support element to be used to support the slats), and coupling the slats to such support element or elements. The spacing of the slats along the support elements may be determined such as by the width of the slats (the dimension substantially transverse to the width of the roll-up covering and the length of the slats along the width of the roll-up covering), and/or the desired spacing between slats such, as when the roll-up covering is in a closed configuration so that the slats are close enough to one another to shade against light passing through the architectural opening to be covered by the roll-up covering. The overall spacing between the slats may be uniform or non-uniform, as desired, but, is customizable, such as based on the overall final custom length of the roll-up covering. The number of slats preferably is selected to provide sufficient slats along the length of the roll-up shade (determined, e.g., by the length of the support elements) so that the slats will provide the desired shading effect (e.g., light blockage) when the roll-up covering is in the closed configuration.

Figure 10A:
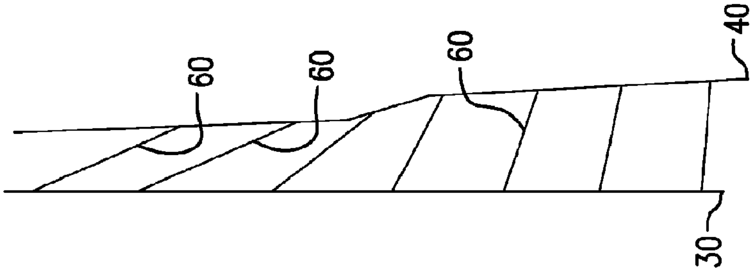
FIGS. 10A-B represent a schematic illustrating non-uniform placement of slats.
Figure 10B:
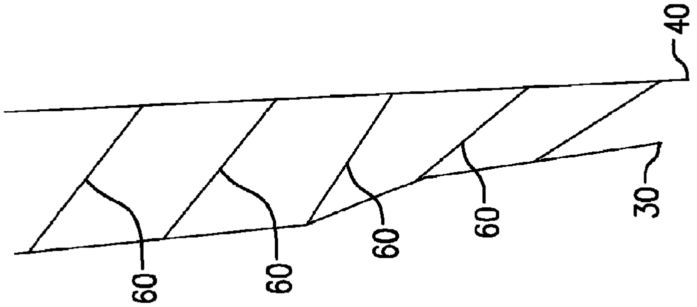
Figure 11A:
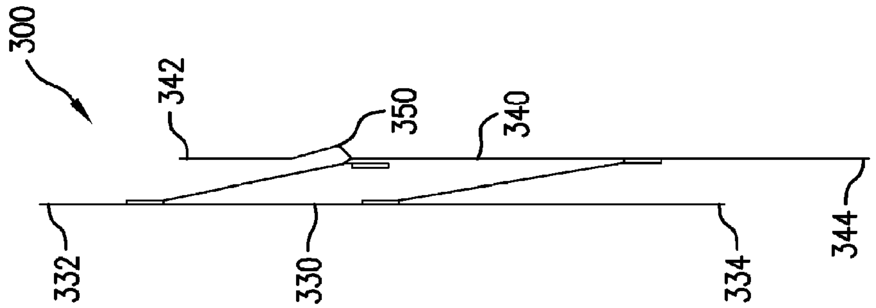
FIGS. 11A-11C represent a schematic of an exemplary ladder tape.
Figure 11B:
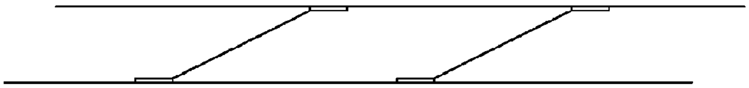
Figure 11C:
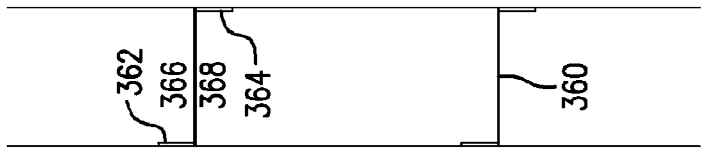

In accordance with a further aspect, and as illustrated in FIGS. 10A-10B, at least one pair of consecutive slats 60 can be separated by a distance along one of the first outer elongate tape or the first inner elongate tape different from the distance between other consecutive slats along the one of the first outer elongate tape or the first inner elongate tape. As a result, the slats closer to the second end of the tapes (i.e., below the pair of consecutive slats) will be at a different operating angle than the slats closer to the first end of the length of the tapes (i.e., closer to the top of the covering or subassembly), as illustrated in FIGS. 10A-10B. By doing so, the spacing between subsequent slats along one of the first outer elongate tape or the first inner elongate tape can be selected to cause the slats to open at different rates, or cause one set of slats to open before a second set of slats, for example, such that light will be permitted to pass through a first portion of the roll-up covering before passing through a second portion of the roll-up covering. For example, the spacing can be adjusted so that upper slats open first while the lower slats stay substantially closed, or the opposite. Further in accordance with the disclosure, and as illustrated in FIGS. 11A-11C, an exemplary ladder tape 300 is provided. Such a ladder tape 300 can be configured to be biased to close, and to roll up onto itself. For example, such a ladder tape 300 can include a first elongate tape 330 having a first end 332, a second end 334, and defining a length between the first end and the second end, the first elongate tape further defining a lateral width, a thickness and a first central longitudinal axis between the first end 332 and second end 334 of the first outer elongate tape 330, the first end 332 of the first elongate tape 330 being configured to be attached to a roller (e.g., 20). The ladder tape 300 can further include a second elongate tape 340 disposed parallel to the first elongate tape 330. The second elongate tape 340 has a first end 342, a second end 344, and defines a length between the first end 342 and the second end 344. The second elongate tape 340 further defines a lateral width, a thickness and a second central longitudinal axis between the first end 342 and second end 344 of the second elongate tape 300. The second elongate tape 300 further defines a plurality of collapsible hinge segments 350 disposed along the length of the second elongate tape 340. The collapsible hinge segments 350 are the same in operation as hinge segments 50, 150, 250. The ladder tape 300 can further include a plurality of connective features 360 disposed between and coupled to the first elongate tape 330 and the second elongate tape 340 along the length of the tapes 330, 340, the tapes 330, 340 and connective features 360 cooperating to form a ladder tape 300 suitable for receiving slats (not shown as rectangles) to make a blind. If desired, at least one of the connective features 360 can include a flexible fabric body having a first, end 362, a second end 364, a first planar face 366 and a second planar face 368. The first planar face 366 can be attached to an inwardly facing face of the first elongate tape 330 proximate to or at the first end 362 of the connective feature, and the second planar face 368 can be attached to an inwardly facing face of the second elongate tape 340 proximate to or at the second end 364 of the connective feature. The ladder tape 300 can thus be biased to fold into a planar configuration. If desired, the connectors can assume a “Z” or “S” shape when the ladder tape is deployed.

Figure 12:
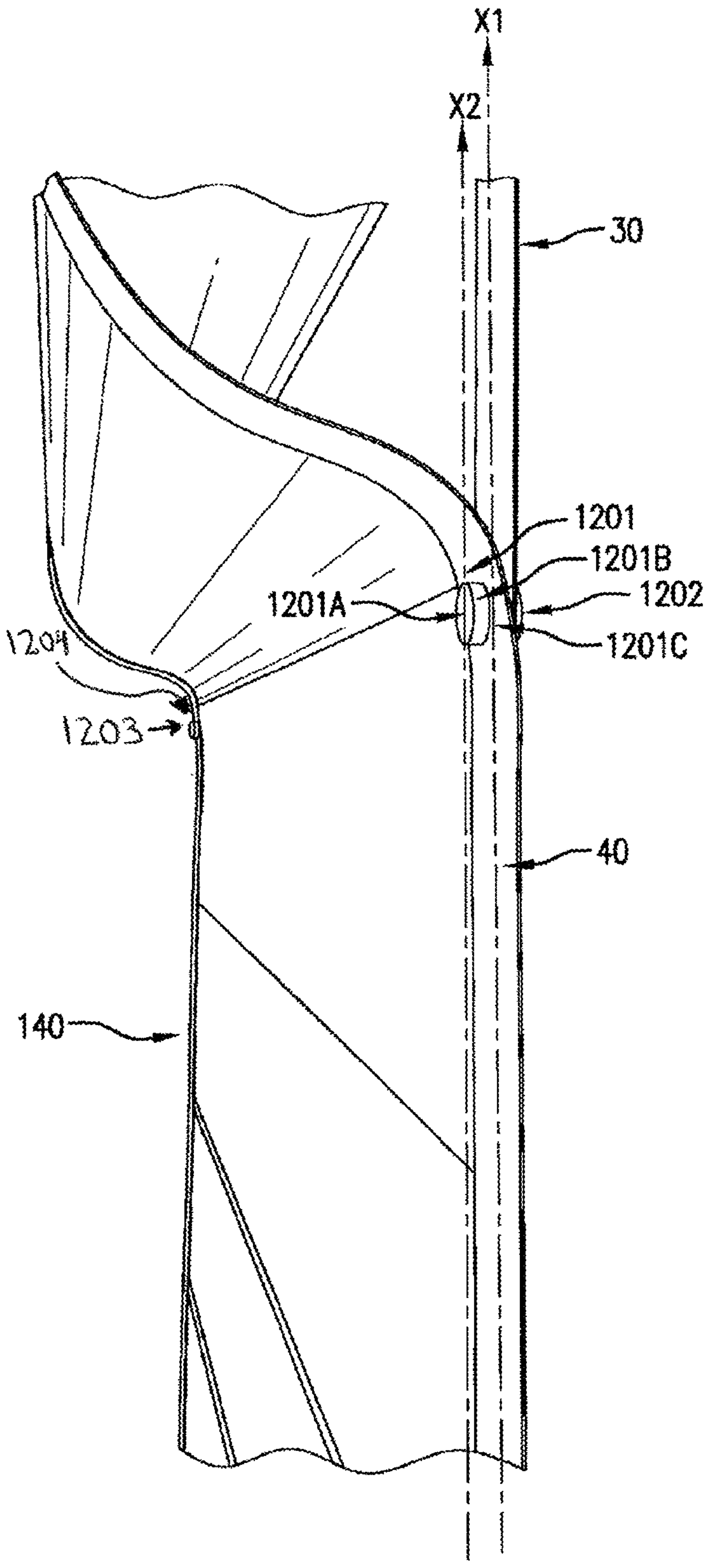
FIG. 12 illustrates an embodiment of a pair of magnetic connectors that can be disposed on opposing outward faces of the elongate tapes to selectively close the plurality of slats.

FIG. 12 illustrates a further exemplary embodiment of a roll-up covering in, accordance with the present disclosure in which a pair (first and second) of magnetic connectors are disposed opposite of one another such that a first connector 1201 of the pair of magnetic connectors 1201 and 1202 can be disposed and movable on an outer face of the first inner elongate tape 40 and a second connector 1202 of the pair of magnetic connectors 1201 and 1202 can be disposed and movable on an outer face of the first outer elongate tape 30 in response to and coordinated with the movement of the first connector 1201. In an exemplary embodiment of the present disclosure, the first connector 1201 and the second connector 1202 are magnetic discs of the same diameter, each with a circular surface, e.g., 1201A, corresponding to another circular surface, e.g., 1201C, connected by a circumferential surface 1201B. In a preferred embodiment of the present disclosure, circular surfaces 1201A and 1201C of the first connector 1201 and second connector 1202 can be of the same radius dimension, e.g., 1201R.

In another embodiment of the present disclosure, the first connector 1201 has at least one metallic or magnetic contact surface, i.e., 1201A or 1201C, which is attracted to at least one metallic or magnetic contact surface of the second connector 1202. In the preferred embodiment of the present disclosure, the magnetic attraction between the at least one metallic or magnetic contact surface, i.e., 1201A or 1201C, of the first connector 1201 and the at least one metallic or magnetic contact surface of the second connector 1202 maintains the first inner elongate tape 40 and the first outer elongate tape 30 collapsed together. In another embodiment of the present disclosure, the first and second connectors 1201 and 1202 have sufficient magnetic forces attracting one and another such that moving one of the pair of magnetic connectors 1201 and 1202 can cause coordinated move of the other one of the pair of magnetic connectors 1201 and 1202. It will be appreciated that the illustrated magnets are permanent magnets. Any suitable permanent magnets can be used, such as those including rare earth elements and the like. If desired, one of the magnets can be replaced with a piece of steel, preferably one that has been plated or lightly coated with a corrosion resistant layer.

In accordance with an exemplary embodiment, the coordinated upward movement of the first and second connectors 1201 and 1202 can cause the side edges 68 of the plurality of slats 60 to collapse against the first inner elongate tape 40 and first outer elongate tape 30, thus causing the plurality of slats 60 to be in a closed position. The downward movement of the first and second connectors 1201 and 1202 can cause the side edges 68 of the plurality of slats 60 to separate from the first inner elongate tape 40 and first outer elongate tape 30, thus causing the plurality of slats 60 to be in an open position. In the illustrated embodiment, the first connector 1201 can be movable along the second central longitudinal axis X2, and second connector 1202 can be movable along the first central longitudinal axis X1. In another embodiment of the present disclosure, the pair of magnetic connectors 1201 and 1202 can be removable from the first outer elongate tape 30 and the first inner elongate tape 40. Selective placement of the magnets can provide for any desired combination of privacy (below the magnets) and shading (above the magnets). It will be further appreciated that any of the disclosed roll-up coverings can have slats that extend outwardly beyond the tapes that have freely floating ends. For example, the embodiments of FIG. 9 illustrate an embodiment with freely floating ends.

It will be further appreciated that some or all of the pairs of elongate tapes can be provided with pairs of magnets to selectively hold the tapes together. Thus, a roll-up covering with two pairs of tapes would have four magnets, a covering with three pairs of tapes would have six magnets, and so on. It will be further appreciated that a clip or other suitable sliding fastener can be positioned over the tapes rather than magnets (or a magnet and opposing steel disc) if the tapes are at the edge of the roll-up covering.

In accordance with a further embodiment of the present disclosure, for purposes of illustration, a second pair of magnetic connectors can be disposed opposite of one another such that a third connector 1203 of the second pair of magnetic connectors 1203 and 1204 can be disposed and movable on an outer face of the second inner elongate tape 140 and a second connector 1204 (not seen in FIG. 12) of the second pair of magnetic connectors 1203 and 1204 can be disposed and movable on an outer face of the second outer elongate tape 130 in response to and coordinated with the movement of the third connector 1203. In an exemplary embodiment of the present disclosure, the third connector 1203 and the fourth connector 1204 are magnetic discs of the same dimension, each with a circular surface, e.g., 1203A, corresponding to another circular surface, e.g., 1203C, connected by a transverse circular rim surface 1203B. In a preferred embodiment of the present disclosure, circular surfaces 1203A and 1203C of the third connector 1203 and fourth connector 1204 can be of the same radius dimension, e.g., 1203R. In another embodiment of the present disclosure, the third connector 1203 has at least one metallic or magnetic contact surface, i.e., 1203A or 1203C, which is attracted to at least one metallic or magnetic contact surface of the fourth connector 1204. In the preferred embodiment of the present disclosure, the magnetic attraction between the at least one metallic or magnetic contact surface, i.e., 1203A or 1203C, of the third connector 1203 and the at least one metallic or magnetic contact surface of the fourth connector 1204 maintains the third connector 1203 and the fourth connector 1204 collapsed together. In another embodiment of the present disclosure, the third and fourth connectors 1203 and 1204 have sufficient magnetic forces attracting one and another such that moving one of the pair of magnetic connectors 1203 and 1204 can cause coordinated move of the other one of the pair of magnetic connectors 1203 and 1204.

In accordance with an exemplary embodiment, the coordinated upward movement of the third and fourth connectors 1203 and 1204 can cause the side edges 68 of the plurality of slats 60 to collapse against the second inner elongate tape 140 and, second outer elongate tape 130, thus causing the plurality of slats 60 to be in a closed position. The downward movement of the third and fourth connectors 1203 and 1204 can cause the side edges 68 of the plurality of slats 60 to separate from the second inner elongate tape 140 and second outer elongate tape iso, thus causing the plurality of slats 60 to be in an open position. In the illustrated embodiment, the third connector 1203 can be movable along the fourth central longitudinal axis X4, and fourth connector 1204 can be movable along the third central longitudinal axis X3. In another embodiment of the present disclosure, the pair of magnetic connectors 1203 and 1204 can be removable from the second outer elongate tape 130 and the second inner elongate tape 140.

Figure 13A:
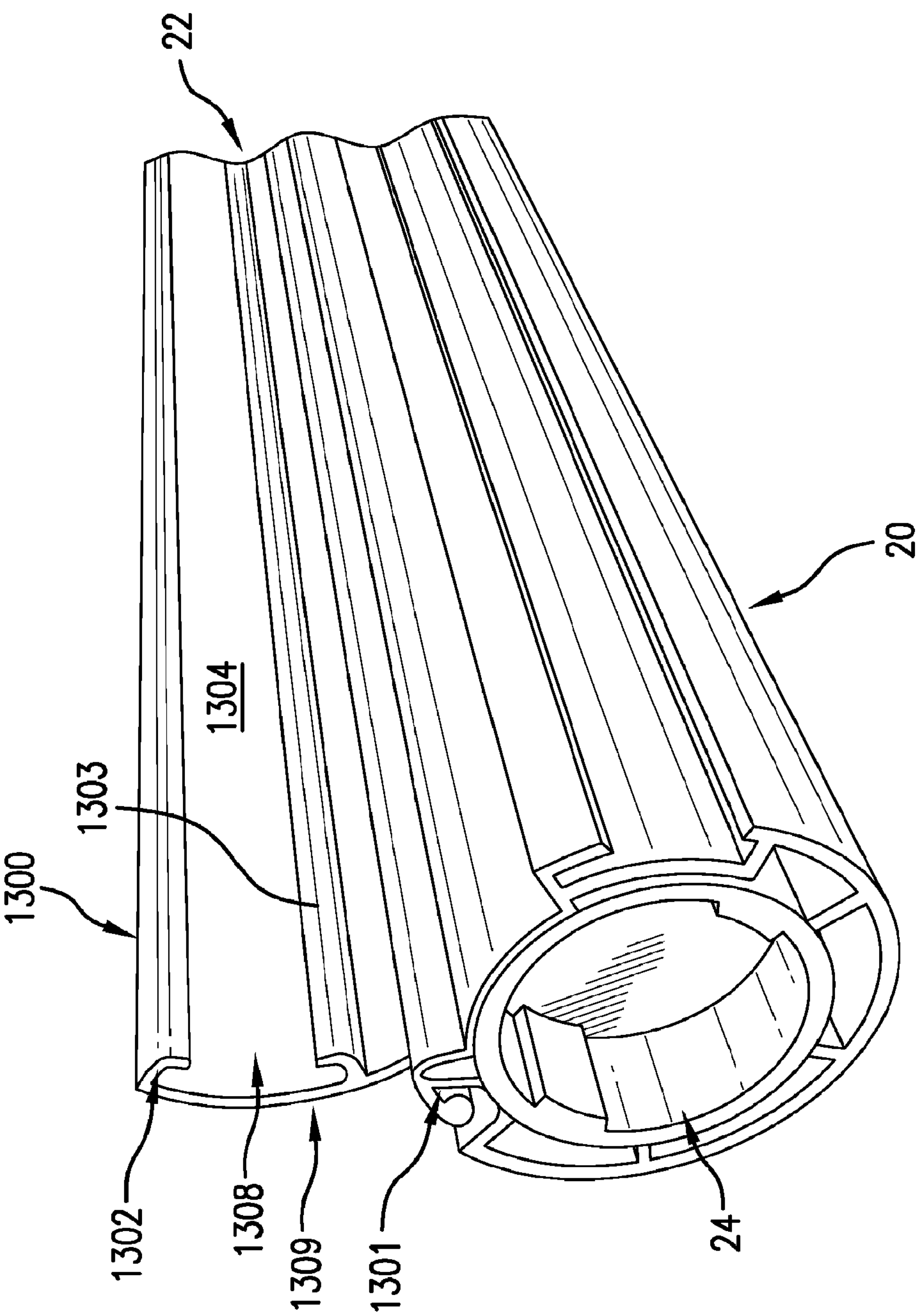
FIGS. 13A-13C illustrate an exemplary embodiment of a door provided on the body of the roller wherein a stiffener covered with a portion of a flexible slat (e.g., fabric overlay) can be disposed on a track provided in the door and a further stiffener covered with another portion of the slat (e.g., fabric) can be disposed on a receiving track formed into the body of the roller.
Figure 13B:
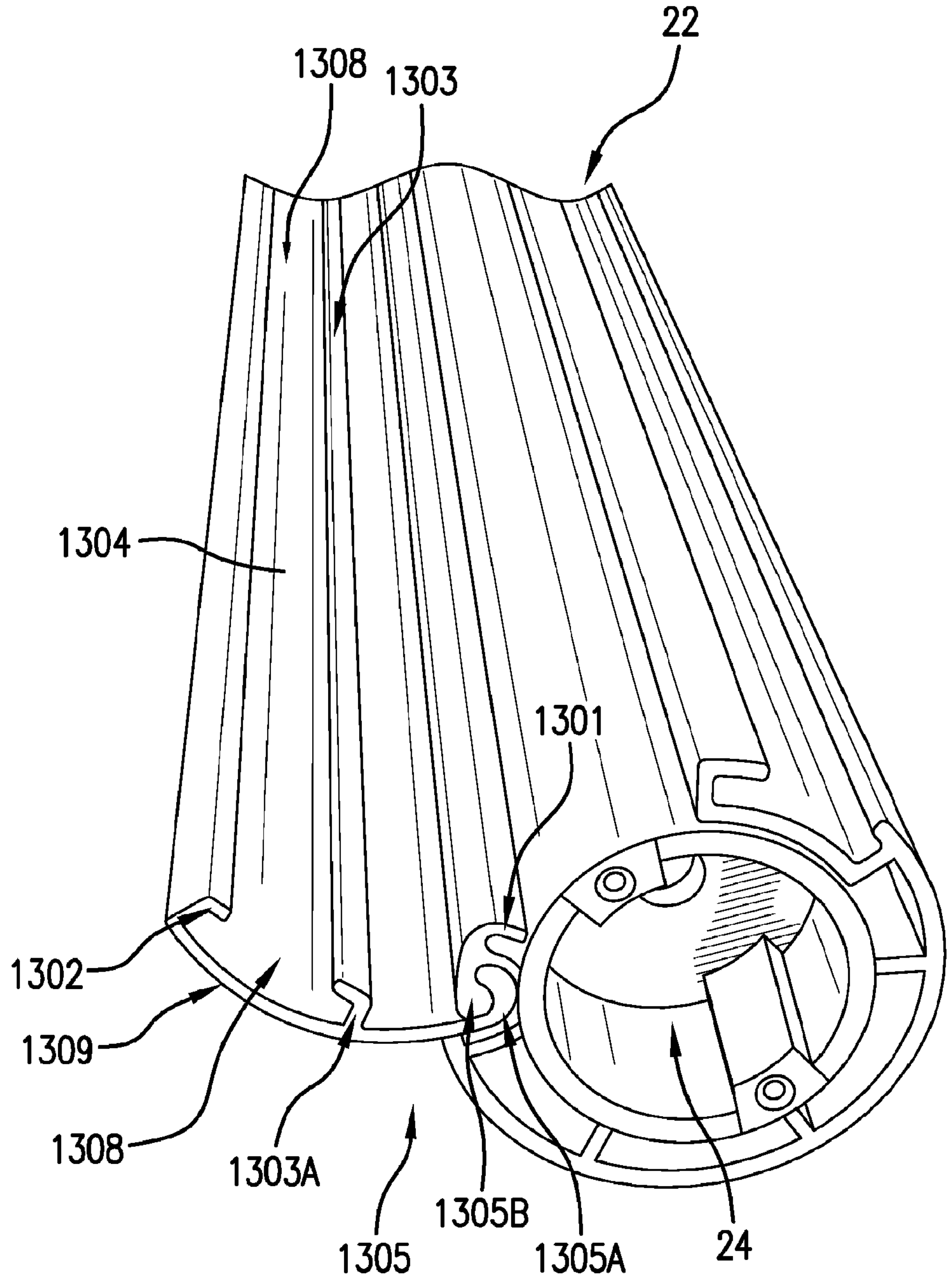
Figure 13C:
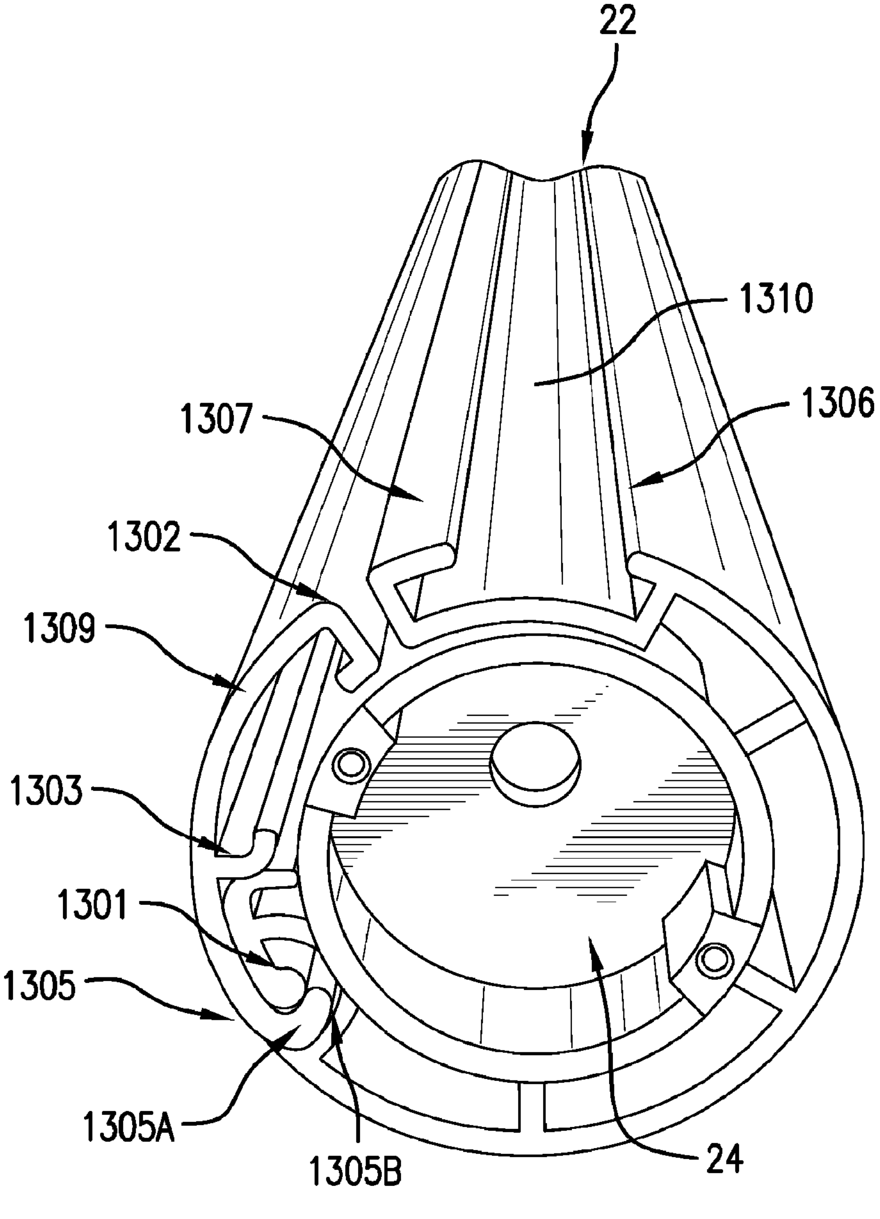

FIGS. 13A-13C illustrate an embodiment of the present disclosure whereby a door 1300 can be provided on the body of the roller 20 such that at least one stiffener 80 covered with a portion of a slat (e.g., fabric overlay) can be disposed on track 1304 provided in the door 1300. In accordance with a preferred embodiment as illustrated in the figures, door 1300 has a width defined by the first end 22 and second end 24 of roller 20, a radial curvature that substantially matches that of roller 20, an inner end 1301, an outer end 1302, a thickness, and a length that is defined between the inner end 1301 and outer end 1302 of the door 1300. It can be further provided that the radial curvature of the door 1300 forms a concave inner face 1308 and a convex outer face 1309 on the door 1300. As illustrated in the exemplary embodiment in FIG. 13B, door 1300 can be attached to roller 20 via a latch element 1305 at the inner end 1301, wherein latch element 1305 can be a concavely curved inner end 1305A of door 1300 on the concave inner face 1308 hooked into a receiving cavity 1305B of the roller 20 for the width of the roller 20.

In accordance with another embodiment, door 1300 can be operable to be opened by detaching or separating from the roller 20 on the outer end 1302 along the width of door 1300 and remain attached to the roller at the inner end 1301 via latch element 1305. The door 1300 can be further operable to be closed by collapsing and rolling the outer end 1302 of the door 1300 toward and around the roller 20 along the width of the door 1300.

In a further embodiment of the present disclosure, as shown in FIG. 13B, a raised ridge 1303 can be integrally provided on the concave inner face 1308 of the door 1300 along the width of the door 1300 whereby ridge 1303 and outer end 1302 of the door 1300 form a "C"-shaped track 1304 for the width of the door 1300 and ridge 1303 can have a concaved raised edge 1303A for the width of the door. In a preferred embodiment, the radial curvature of ridge 1303A can substantially match that of the outer end 1302.

In accordance with another embodiment of the present disclosure, as illustrated in FIG. 13C, a "C"-shaped receiving track 1310 can be integrally provided on (e.g., formed into) the body of roller 20 wherein the receiving track 1310 has a width defined by the first end 22 and second end 24 of roller 20, a radial curvature that substantially matches the curvature of roller 20, a first end 1306, a second end 1307, a thickness, and a length defined between the first end 1306 and second end 1307 of the receiving track 1310.

Figure 14A:
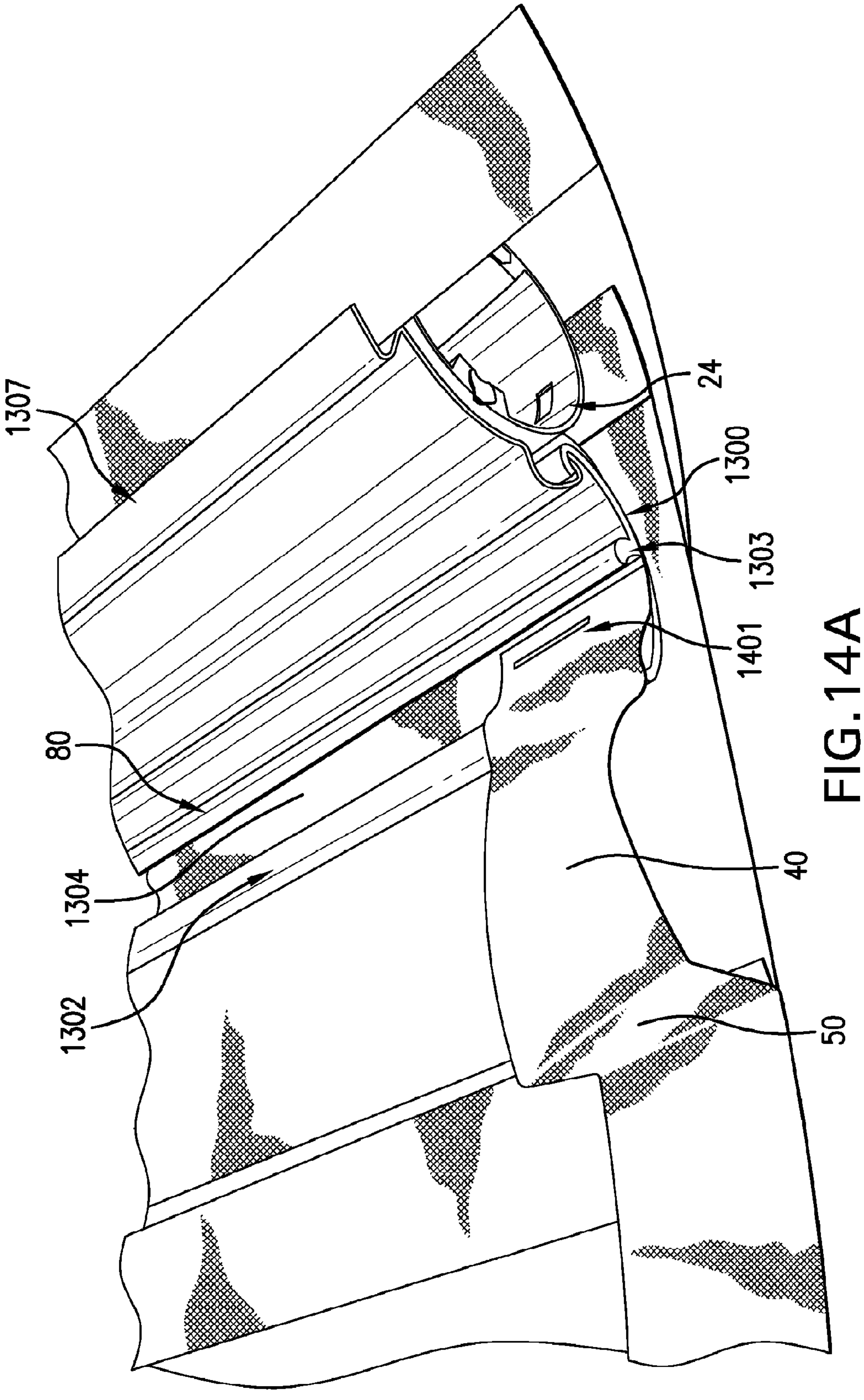
FIGS. 14A and 14B are detailed illustrations of the exemplary embodiment of FIGS. 13A-13C.

As illustrated in details in FIG. 14A at second end 24 of roller 20, in accordance with one embodiment, track 1304 on door 1300 can accommodate at least one elongate stiffener 80 whereby stiffener 80 is covered by a flexible fabric overlay such that the stiffener 80 covered with the overlay can be disposed in track 1304 for the width of the track and the flexible fabric overlay of the stiffener 80 can be attached to an inwardly facing face of the first inner elongate tape 40 by, for example, staple 1401.

Figure 14B:
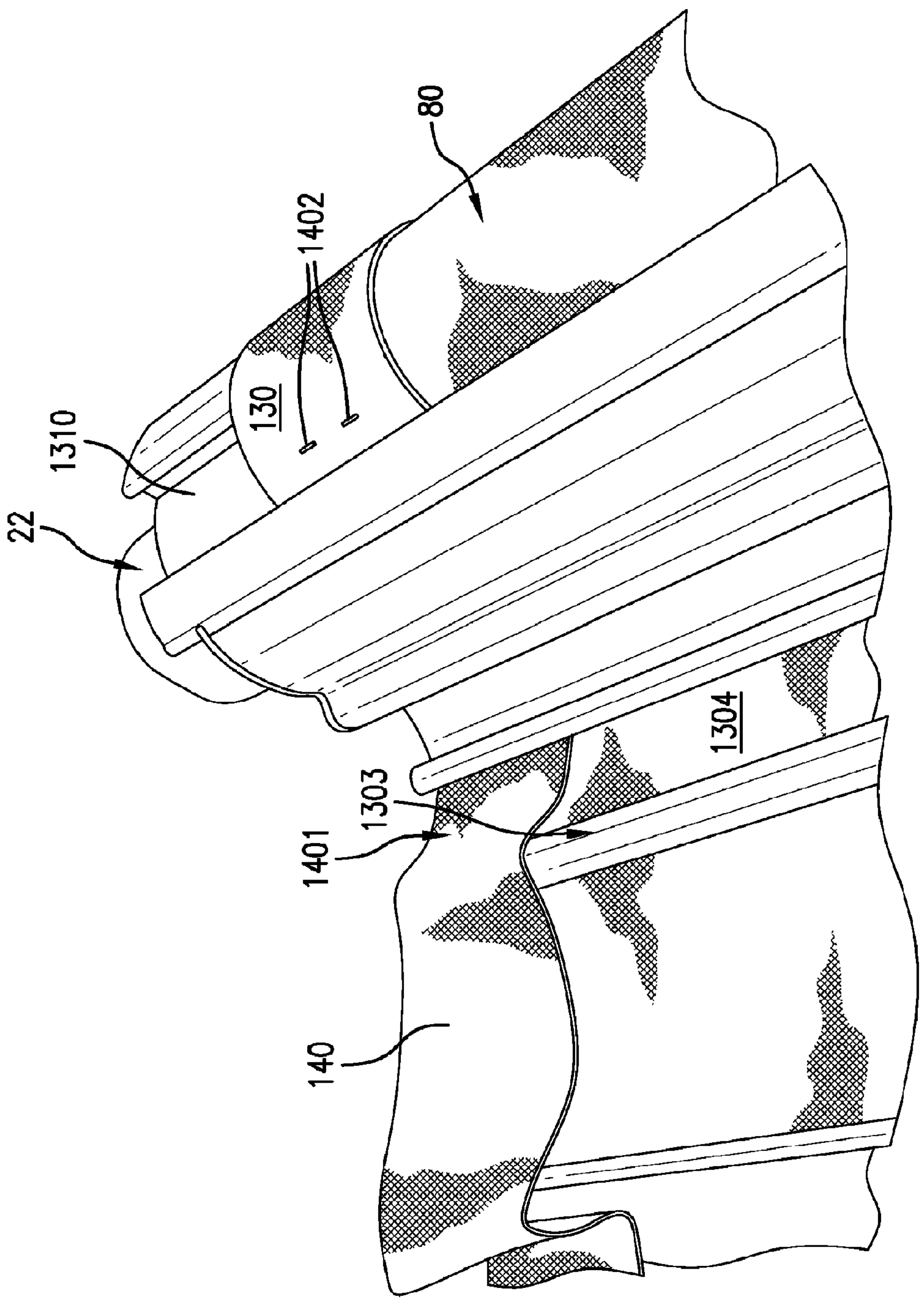

In a further embodiment, as illustrated in FIG. 14B at first end 22 of roller 20, receiving track 1310 on roller 20 can accommodate at least one elongate stiffener 80 whereby stiffener 80 is covered by a portion of a slat (e.g., flexible fabric overlay) such that the stiffener covered with the overlay can be disposed in receiving track 1310 for the width of the receiving track and the flexible fabric overlay of the at least one stiffener 80 is attached to an inwardly facing face of the second outer elongate tape 130 by, for example, staple 1402.

FIGS. 15A-15E depict progressive views of a roll-up covering of the present disclosure that includes a door illustrated in FIGS. 13A-13C in a process of opening from a collapsed position. In accordance with the illustrated embodiment, when door 1300 on roller 20 is in a closed or collapsed position against roller 20, track 1304 and receiving track 1310 are radially aligned next to one another. As illustrated in a collapsed position in FIG. 15A, the roll-up covering 10 has at least one stiffener 80 covered with fabric overlay that is disposed in track 1304 and at least one stiffener 80 covered with fabric overlay that is disposed in track 1310. As further illustrated in FIG. 15B, the flexible fabric overlay covering the at least one stiffener 80 disposed in track 1304 is attached to the first inner elongate tape 40, and the flexible fabric overlay covering the at least one stiffener 80 disposed in track 1310 is attached to the first outer elongate tape 30.

Figures 15A, 15B, 15C, 15D, 15E:
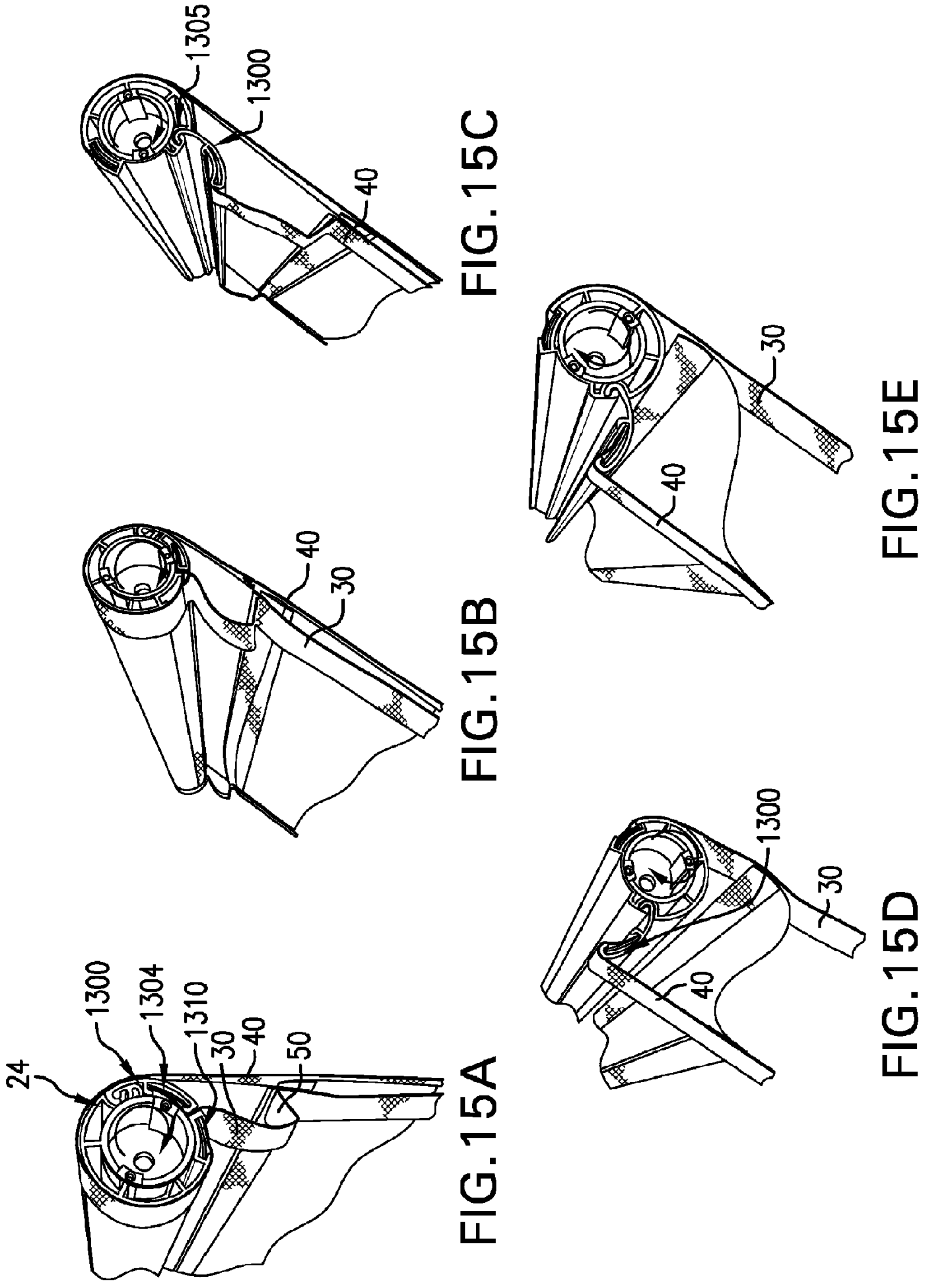
FIGS. 15A-15E depict progressive views of a roll-up covering of the present disclosure that includes a door illustrated in FIGS. 13A-13C in a process of opening from a collapsed position.

As further illustrated in FIG. 15C, as roller 20 unwinds, door 30 opens such that outer end 1302 becomes detached or separated from the body of roller 20 for the width of the door 1300, and latch element 1305 remains attached or hooked, to receiving cavity 1305B via concavely curved inner end 1305A. As also shown in FIG. 15C, when door 30 is in an open position as illustrated, slack from the first inner elongate tape 40 hangs from its attachment to a fabric overlay covering a stiffener 80 that is disposed in track 1304 and the collapsible hinge segment 50 becomes substantially perpendicular to first inner elongate tape 40.

In an illustrated embodiment of the present disclosure, shown in FIG. 15D, as roller 20 further unwinds and door 30 opens to a position where it is substantially perpendicular to the first inner elongate tape 40 and the first outer elongate tape 30, the upper slat of roll-up covering 10 separates from the first inner elongate tape 10 and the first outer elongate tape 30 such that the upper slat becomes substantially parallel to door 1300, and the remaining plurality of slats 60 are in an open position.

In a further illustrated embodiment of the present disclosure, as show in FIG. 15E, when roller 20 unwinds to a position Where door 1300 is in a parallel plane as that of the upper slat of roll-up covering 10, the door 1300 maintains the upper slat and roll-up covering 10 in a generally open condition such that the first outer elongate tape 30 is separated from and parallel to the first inner elongate tape 40. It will be appreciated that use of a door within the roller can help facilitate spacing between the inner and outer tapes, due to the door increasing the effective diameter of the roller, thereby allowing for use of slats between the first outer elongate tape 30 and the first inner elongate tape 40 that are wider than the diameter of the roller 20.

In further embodiments, it will be appreciated that the disclosed coverings can be oriented in any desired manner with respect to the architectural opening that it is covering. For example, in some implementations, it can be desirable for the outer face of the inner elongate tape(s) to face the architectural opening when the covering is unrolled from the roller (e.g., window or door). In other implementations, the outer face of the outer elongate tape(s) can face the architectural opening.

Figure 16A:
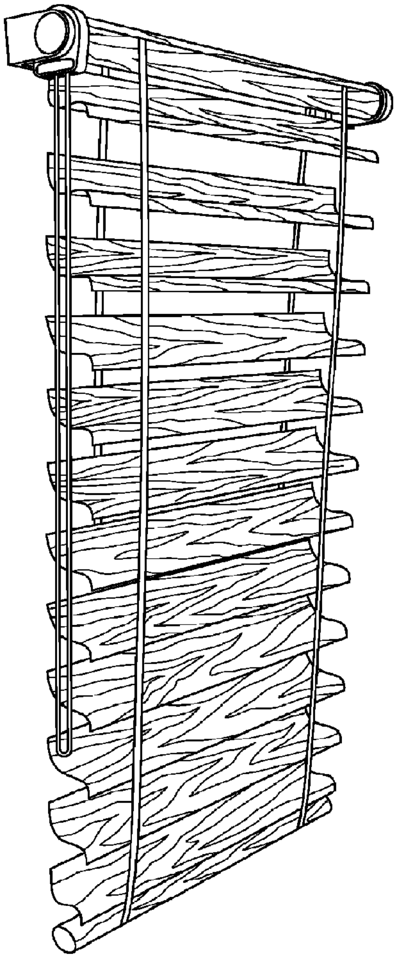
FIGS. 16A-16B illustrate a further embodiment of the disclosure having covering fabric on upper and lower faces of the slats.
Figure 16B:
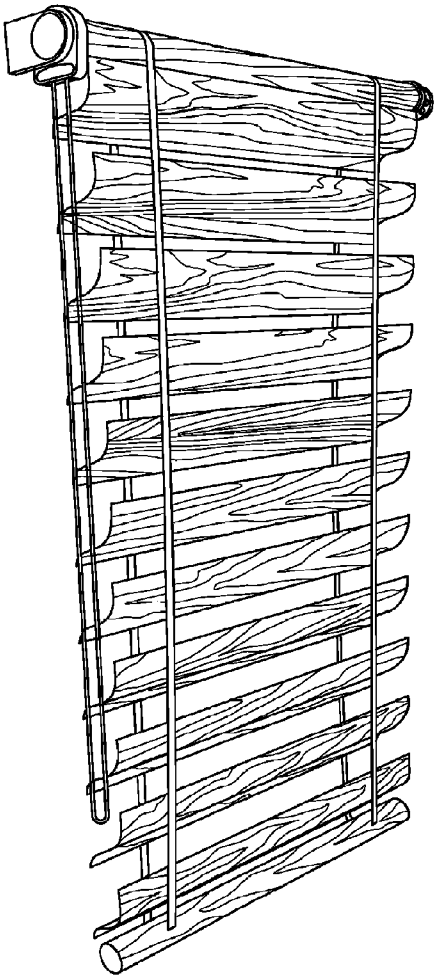
Figure 18:
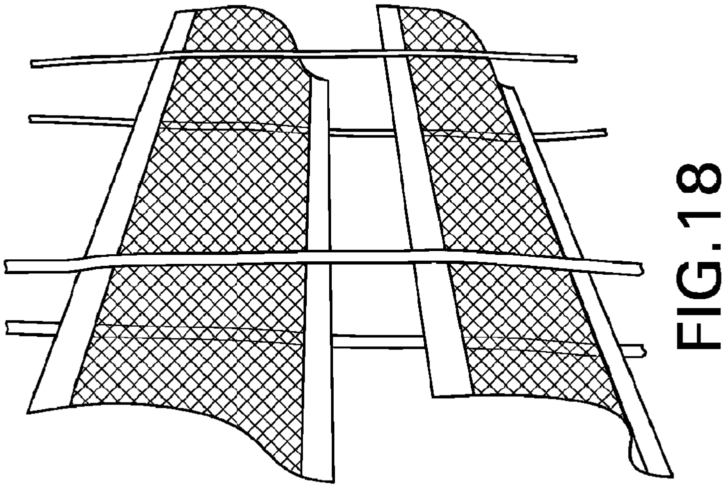
FIG. 18 illustrates an embodiment of a roll-up covering with slats made from a "see-through" material.
Figure 17:
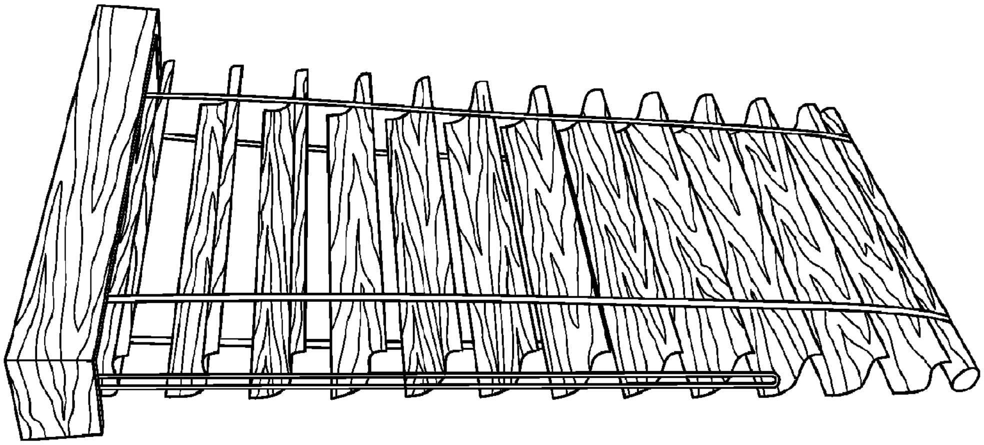
FIG. 17 illustrates the embodiment of FIG. 16A with an optional valance.
Figure 19C:
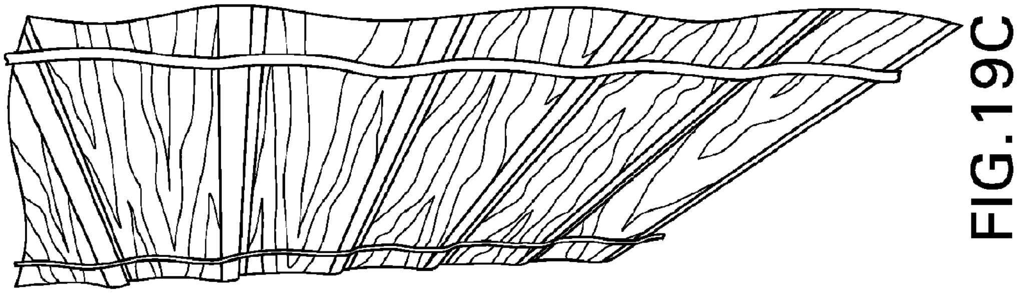
FIGS. 19A-19C show an embodiment of a roll-up covering in various positions wherein the elongate slat stiffening members are visible along the edges of the slats.
Figure 19B:
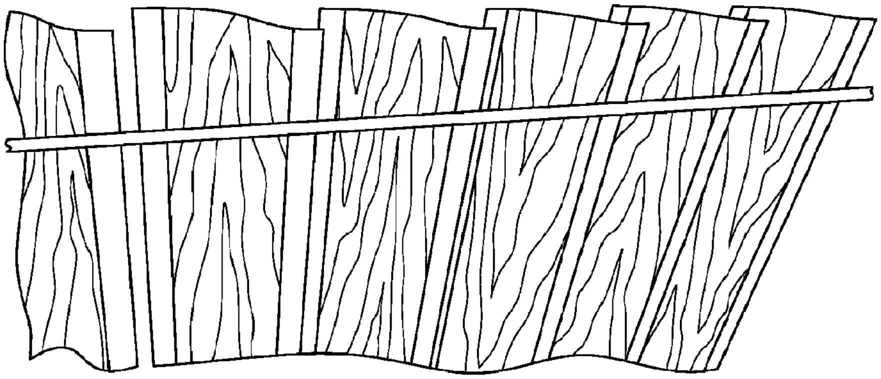
Figure 19A:
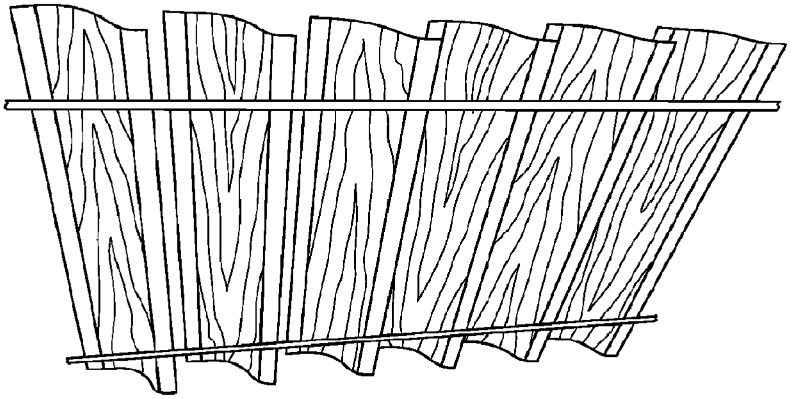

For purposes of illustration, and not limitation, FIGS. 16A-16B illustrate an example of a roll-up window covering that can be oriented in either direction with respect to the architectural opening (e.g., window). Both sides of each slat are provided with the same appearance (e.g., woodgrain) so that the covering is reversible. Moreover, the top roller and the bottom weight are also covered in the fabric to achieve an aesthetic appearance. FIG. 17 illustrates such a window covering with a valance at the top of the window covering, shielding the roller from view. FIG. 18 illustrates an embodiment of a window covering with slats made from a "see through" material, such as BATISTE®, ENLINEA® fabrics sold by Hunter Douglas, or a rollscreen fabric. FIGS. 19A-19C illustrate a further embodiment of a window covering having stiffeners in the slats having a concavity facing in the same direction (e.g., toward the architectural opening). When closed, the subassembly has a very aesthetic appearance as the convexity of the slats and the stiffeners all face away from the architectural opening. FIGS. 25A-25B are embodiments of roll-up coverings made in accordance with the disclosure made from mesh-like fabric.

The disclosure further provides a roll-up covering material configured to be rolled up around a roller of a roll-up covering for an architectural opening, as it will be appreciated that the subassembly that may attach to the roller of the embodiment of FIG. 1, for example, can be made in any desired length, and can even be rolled up and shipped and cut to fit at a second location, such as a location where the installation is occurring. Such material can advantageously be made at high speed in an automated manner using the embodiment of FIG. 26, which is discussed in further detail below. The subassembly can be made using one or more inner and outer elongate tapes (e.g., 40, 30), as desired, and indeed, a different number of inner elongate tapes can be provided than outer elongate tapes. As with other embodiments herein, the subassembly can be provided with a plurality of transversely stiffened slats 60 that can include one or more stiffened longitudinal edges connected by a flexible body portion. The subassembly/roll-up covering material can be used to make a custom length roll-up covering 10 for an architectural opening as described herein. The inner elongate tape(s) (e.g., 40, 140, 240 . . . ) are preferably located radially inwardly with respect to the first outer elongate tape when the subassembly is rolled up around the roller. As such, the first inner elongate tape(s) (e.g., 40, 140, 240 . . . ) can be configured to collapse upon itself as the roll-up covering is rolled around, the roller. In various embodiments, the first inner elongate tape can be configured, to collapse upon itself as an edge of one of the Plurality of slats approaches the roller while the roll-up covering is rolled around the roller. The first inner elongate tape(s) (e.g., 40, 140, 240 . . . ) can define a plurality of collapsible hinge segments disposed along the length of the first inner elongate tape. If desired, preformed hinges can be formed by selecting a material that creases when the roll-up covering is rolled up for the first time. As discussed elsewhere herein, the first inner elongate tape can be longer than the first outer elongate tape between at least one pair of adjacent slats.

Figure 20A:
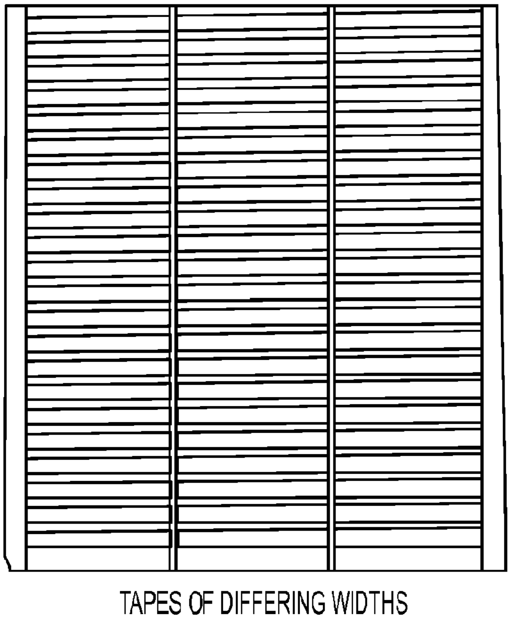
FIG. 20A illustrates an embodiment of a roll-up covering having elongate tapes of different widths.
Figure 20B:
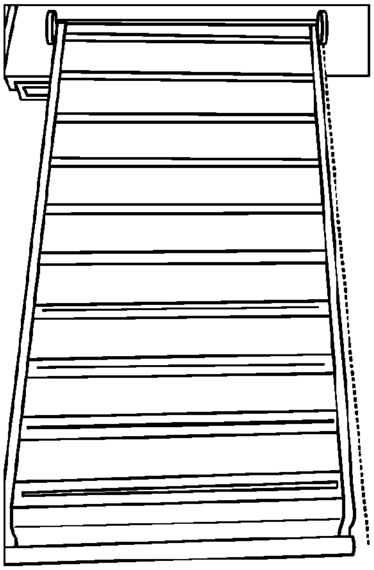
FIG. 20B illustrates a further embodiment of a roll-up covering wherein the elongate slat stiffening members are visible along the edges of the slats.

In any implementation, if desired, the roll-up covering material can be provided in a form wherein the at least two of the tapes are of different widths. For example, as illustrated in the embodiment of FIG. 20A, the two inner tapes are narrower than the two outer tapes located at the edge of the subassembly.

The disclosure also provides a flexible slat material for forming a roll-up covering for an architectural opening. The slat material includes an elongate flexible planar body having a first end, and a second end joined by a plurality of longitudinal edges, wherein, at least one of the longitudinal edges is a stiffened edge that is stiffened, along the length of the Slat material along a first direction orthogonal to the stiffened edge, and further wherein the stiffened edge is substantially less stiff along a second direction orthogonal to the stiffened edge.

Figure 21:
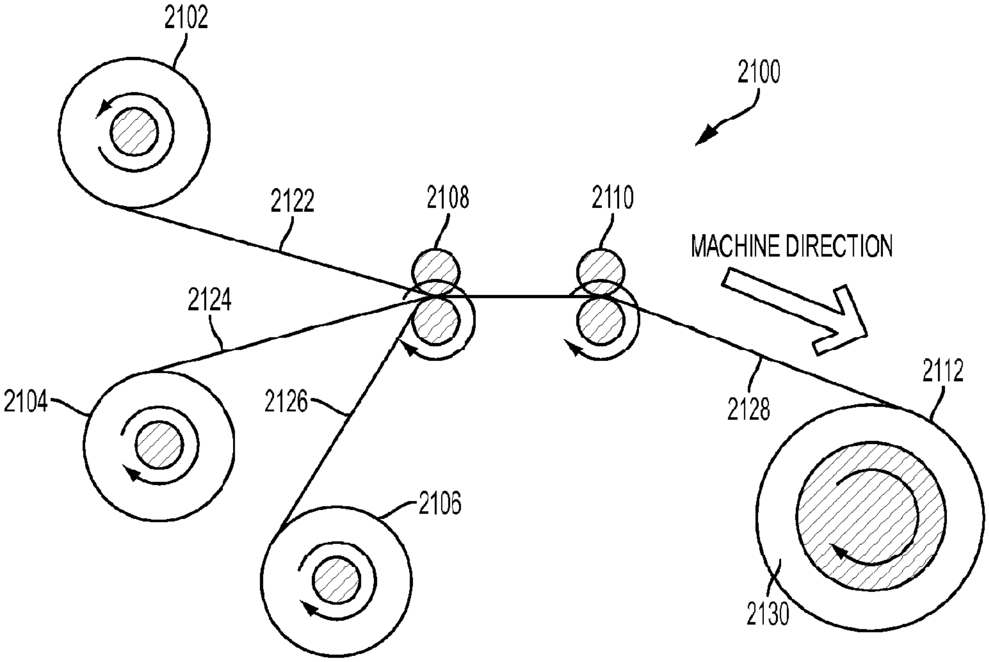
FIG. 21 is a schematic representation of a method and system for making flexible slats including stiffening members in accordance with the disclosure.
Figure 22:
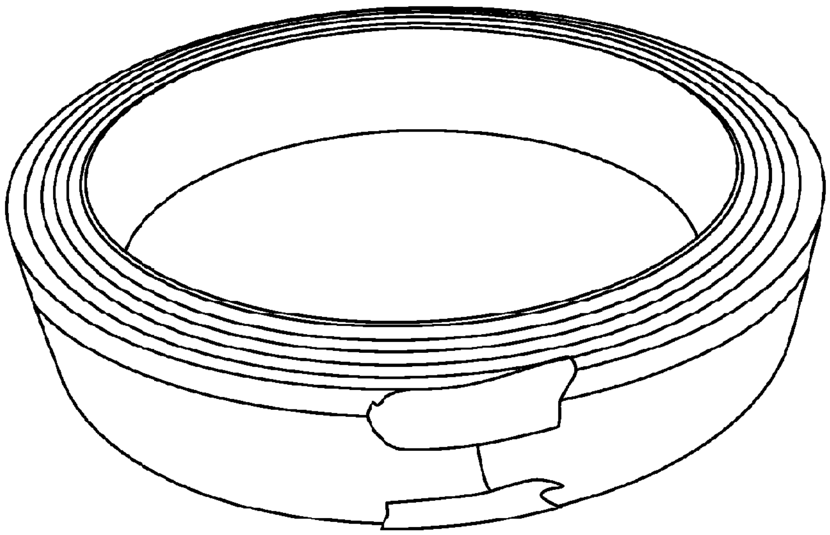
FIG. 22 is an illustration of a roll of material comprised of flexible slat material including stiffening members attached thereto using the method and system illustrated in FIG. 21.

For purposes of illustration, and not limitation, a simplified schematic of a method and system for making rolls of slat material is presented in FIG. 21 and designated by reference number 2100. As illustrated, a roll of flexible fabric material 2102 can be provided, as well as one or more rolls 2104, 2016 of stiffening material, such as plastic or aluminum strips of material as discussed herein, or one or more stiffening wires. The stiffening material or the roll of fabric material can be provided with adhesive, or separate rolls of adhesive tape or adhesive applicators (not shown) can be provided to facilitate continuously adhering the stiffening material to the fabric by combining the webs 2122, 2124, 2126 of material by drawing them through one or more pairs of nip rollers 2108, 2110, wherein at least one of the pairs of nip rollers is powered, to draw the material and press it together. Once pressed together, the stiffening strip(s) 2124, 2126 are attached proximate edges of the fabric material 2122 to form the continuous slat material 2128, and a roll of preformed fabric material 2130 is formed. An illustration of the preformed slat material made according to this method is illustrated in FIG. 22. The material of FIG. 22 includes aluminum strips of stiffener material or stiffeners, and it is thus wound around a large diameter core to prevent unnecessarily bending the slat material. It will be appreciated that this technique can be used to form slat material with exposed stiffeners, as in the embodiment of FIG. 19, for example. If desired, the stiffeners can be laminated inboard of the edges of the fabric, and the fabric can be folded over and adhered to itself or the stiffeners to cover the stiffeners, to provide the slat material as in the illustrative embodiment of FIG. 1. Other manners of forming slat material with stiffeners which are not exposed, or not readily visible (particularly in the finished covering) are within the scope of the disclosure. Furthermore, it will be appreciated that the formation of a roll of continuous slat material may be provided without a stiffener coupled to the slat material, the stiffener being coupled to the slat material at a later stage of assembly of the covering, such as when the slat material is cut into the desired slats e.g., coupling the stiffener to the slat material and, then feeding both to a cutting device to cut the slat material and stiffener to the desired slat length).

In some implementations, the stiffeners or stiffening strips 2124, 2126 can be continuously attached to the elongate flexible planar body 2122 substantially along its entire length. In other implementations, the stiffener material 2124, 2126 can be continuously attached to the elongate flexible planar body 2122 along its entire length. In some implementations, the stiffener material 2124, 2126 can be intermittently attached to the elongate flexible planar body 2122 substantially along its entire length. In still other implementations, the stiffener material 2124, 2126 can be intermittently attached to the elongate flexible planar body 2122 along its entire length.

In some implementations, the generally planar stiffener(s) can include a crown along its length, such as by using aluminum or plastic slat material, as described herein. The crowns of each of the generally planar stiffeners can be oriented in the same (or opposite directions) when the elongate flexible planar body is laid flat on a flat surface, as illustrated in FIGS. 23E-23L (illustrating same direction orientation), discussed in further detail below. FIGS. 24A-24D are illustrations of a roll-up window covering in accordance with the disclosure that resembles the embodiment of FIGS. 19A-19C, with the crowning of the stiffening members all oriented in the same direction on each slat, resulting in the crowned portions of the stiffening members facing away from each ether after being attached to the elongate tapes.

The disclosure still further provides a roll-up covering material for an, architectural opening including a plurality of slats made from the flexible slat materials disclosed herein, overlapped and joined along longitudinal edges of the slats.

Figure 23A:
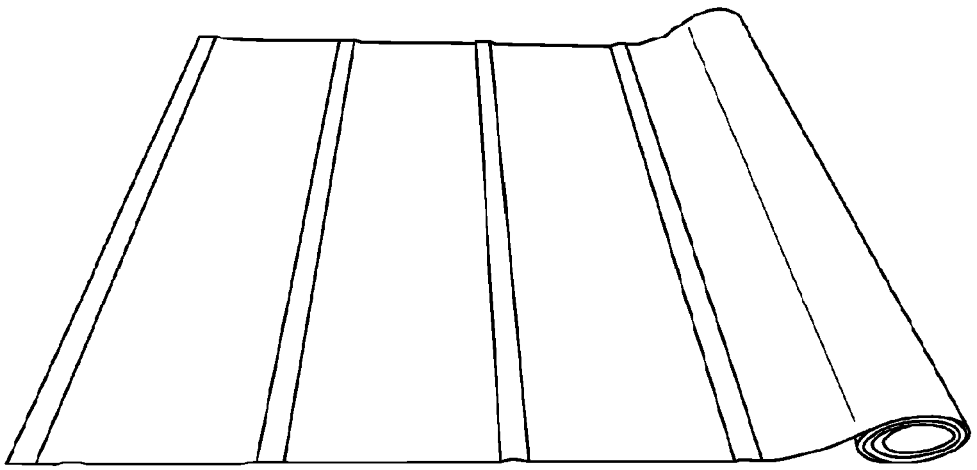
FIGS. 23A-23L are illustrations of a further embodiment of a roll-up covering (e.g., for an architectural opening) in accordance with the disclosure made using slat material, for example, illustrated in FIG. 22 repeatedly stacked upon itself. In the illustrated embodiment, the orientation of the crowning of the stiffening members can be oriented in the same or different directions or be placed along only one edge of the slat material.
Figure 23B:
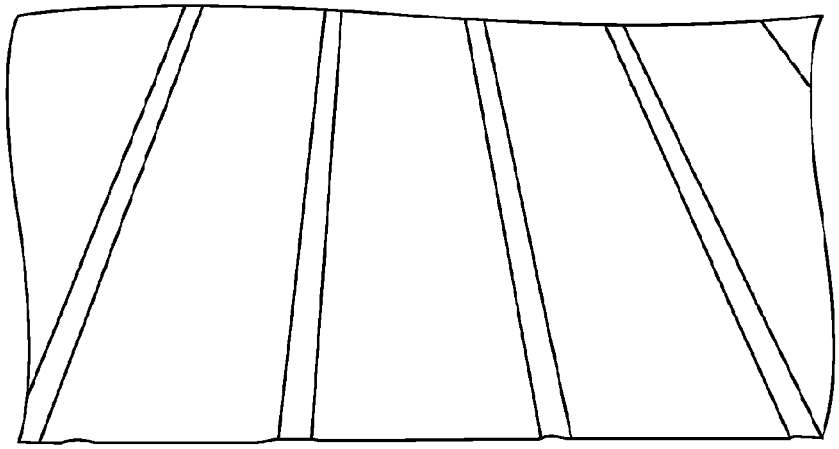
Figure 23C:
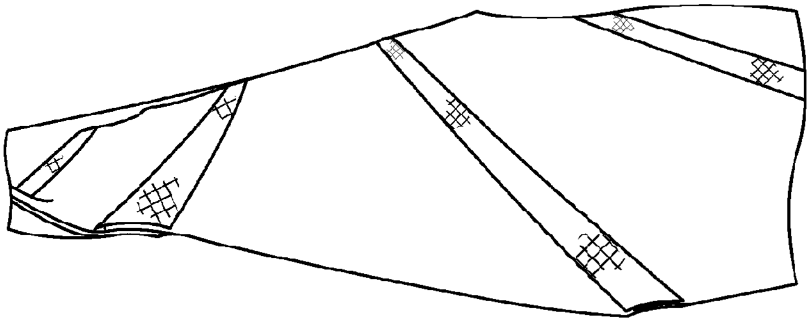
Figure 23D:
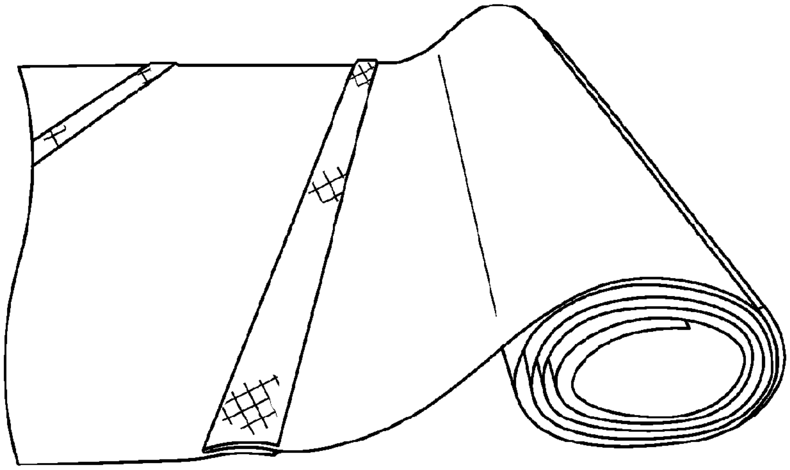
Figure 23E:
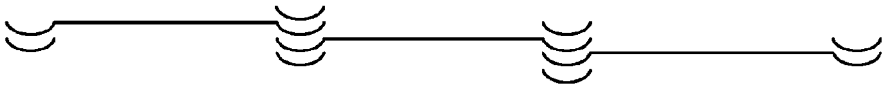
Figure 23F:
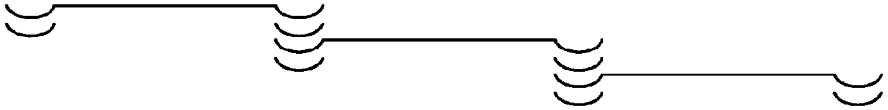
Figure 23G:
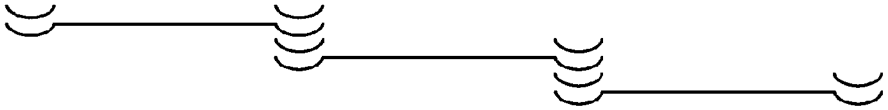
Figure 23H:
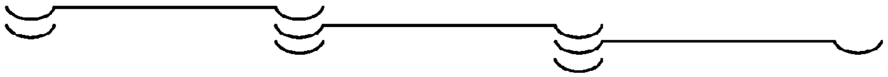
Figure 23I:
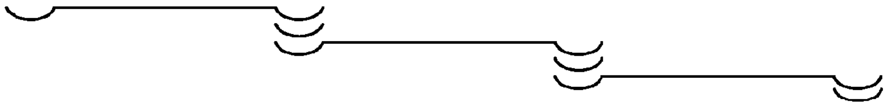
Figure 23J:
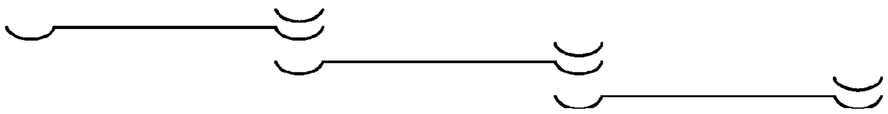
Figures 23K, 23L:
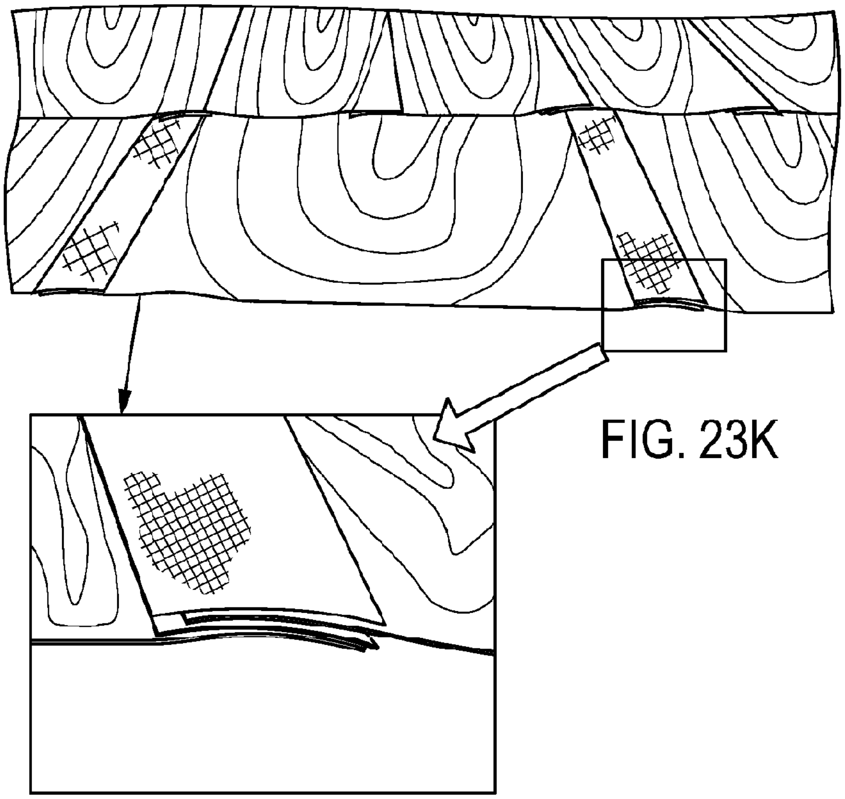
Figure 24A:
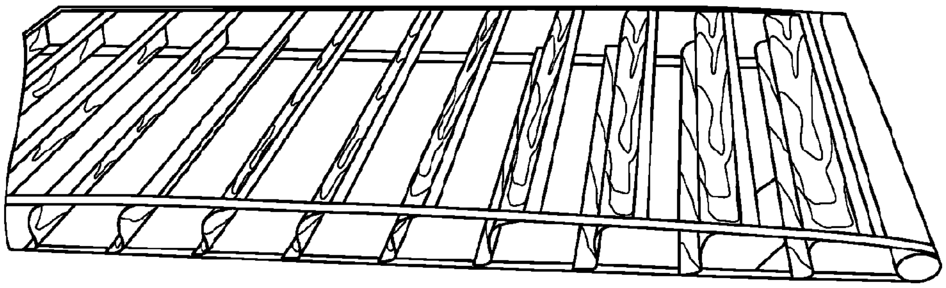
FIGS. 24A-24D are illustrations of a roll-up window covering in accordance with the disclosure that resembles the embodiment of FIGS. 19A-19C, with the crowning of the stiffening members all oriented in the same direction on each slat, resulting in the crowned portions of the stiffening members facing away from each other after being attached to the elongate tapes.
Figure 24B:
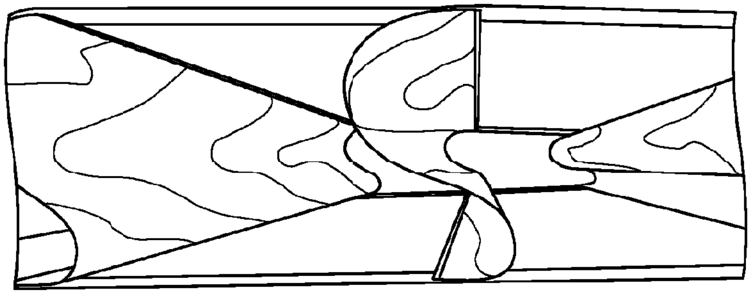
Figure 24C:
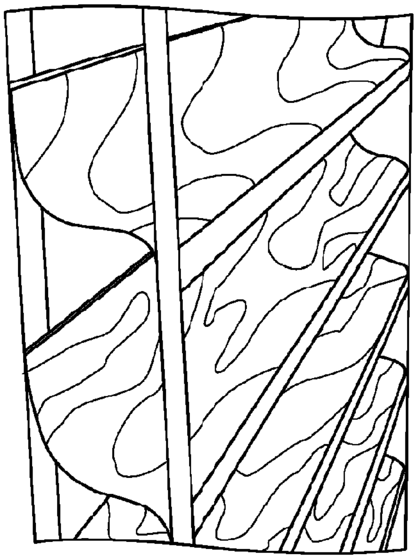
Figure 24D:
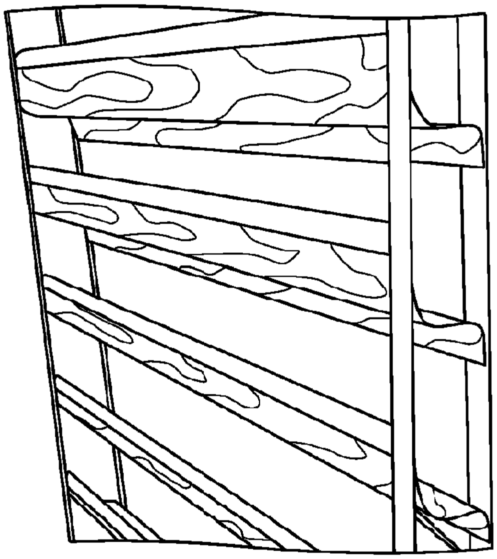

For purposes of illustration, and not limitation, as embodied herein, an exemplary roll-up covering made by stacking slat material is presented in FIGS. 23A-23L. Such an approach permits construction of a roll-up covering of a custom width, as the slat material is continuous and can be cut to a custom length corresponding to the width of the covering when the slats are assembled into a covering. In some embodiments, the plurality of slats can be joined to each other along their longitudinal edges at a plurality of discrete locations (e.g., every four inches), such that an inner longitudinal edge of a first slat is joined to an outer longitudinal edge of a second slat. This can be advantageous as it can prevent the material of the stiffeners from yielding unnecessarily, particular if aluminum stiffeners are used. If desired, the roll-up covering material can be rolled up into a roll (FIG. 23D), wherein the longitudinal edges of the flexible slat material are parallel to a central axis defined by the roll. This can facilitate making roll-up coverings of any desired custom length. As illustrated in FIG. 23L, maintaining a consistent orientation of the crown of the slat material facilitates the stacking of adjacent slat panel portions during the assembly process. As will be appreciated, the covering material of FIG. 23 can be provided in roll form and cut to custom length to cover a custom size opening. The material can thus be provided in roll form in standard or custom widths and/or lengths. In a further embodiment, multiple individual slats can be overlapped and joined to create a single slat of a greater length. For example, the inner longitudinal edge of a first slat may be overlapped and joined to the inner longitudinal edge of a second slat, and the outer longitudinal edge of the first slat may be overlapped and joined to the outer longitudinal edge of the second slat. Doing so can create a single slat having a length greater than the length of the first slat and greater than the length of the second slat.

If desired, adjacent slat panel portions of the embodiment of FIG. 23 can include elongate flexible planar bodies formed from different materials, such as opaque and translucent materials, materials of different colors, and/or materials of different patterns. If desired, the roll-up covering material can be provided with registration markings and printed with discrete segments of an image or design, wherein the design is formed when the roll-up covering material is assembled by attaching subsequent slat segments. Displaying such an image can be facilitated by covering the stiffeners with, the slat fabric, as discussed herein. Moreover, the image can be printed on the slat material with registration markings during the manufacturing process to provide custom roll-up window coverings. In addition to the foregoing, if desired, at least one pair of adjacent slat panels can additionally be of different lengths by varying the stock material during the assembly process. For example, two, three or more of the slats making up the roll-up covering material can be of different lengths.

FIGS. 23E-23J illustrate schematic assembly layouts for different roll-up shades having different placement of crowned stiffeners, wherein the crescent shapes "(" represent the crowned stiffener (e.g. aluminum or plastic slat material), and lines having crescents at the ends represent fabric slat material with a curvature along the edges resulting from being bonded to the stiffeners. For example, FIG. 23E illustrates an arrangement where the stiffeners are placed on the outer edges of the subassembly sandwiching fabric therebetween. FIG. 23F illustrates an arrangement wherein the stiffeners are only visible along one side of the covering wherein their convex surfaces are illustrated, and further wherein the other side of the covering only shows fabric. FIG. 23G illustrates an embodiment wherein the stiffeners are only visible along one side of the covering wherein their concave surfaces are illustrated, and further wherein the other side of the covering only shows fabric. FIG. 23H illustrates an embodiment wherein the slat material includes a stiffener along only one edge, wherein adjacent pieces of slat material are bonded along their longitudinal edges, leaving the convex face of the stiffener exposed. FIG. 23I is similar with the difference that the stiffeners are disposed between the faces of the slat material, thus providing fabric along the faces of the stiffeners. FIG. 23J provides a further alternative wherein the concave faces of the stiffeners are exposed.

The disclosure still further provides a method of forming a roll-up covering material configured to be rolled up around a roller of a roll-up covering for an architectural opening. In accordance with at least one aspect of the method, at least one of and preferably both the length and width of the covering are readily customizable. The length of the covering preferably is readily controllable or customizable by selecting the desired number of slats used to form the covering. The width of the covering preferably is readily controllable or customizable by selecting the desired slat length to match the desired shade width. For instance, the slat may be cut from a continuous roll of slat material to any desired length which is to extend along the width of the covering. The shade length is further customizable because the slat spacing preferably may be selected as desired and need not be predetermined (such as by ladders or any other pre-existing shade elements). For instance, the slats may be placed at any desired locations along the tapes (or other support elements) to achieve the desired shade length and slat spacing.

The disclosure additionally provides a method for assembling a custom-length and optionally a custom width covering for an architectural opening. The method includes the step of selecting a desired custom length (also referred to as height) of the covering. The method may also include the step of providing a first outer elongate tape having a first end and a second end opposite the first end, a length along a first central longitudinal axis extending between the first end and the second end that is selected to correspond to the selected custom length of the covering, a lateral width substantially perpendicular to the length of the first outer elongate tape, and a thickness substantially perpendicular to the length and width of the first outer elongate tape. The method may further include providing a first inner elongate tape having a first end and a second end opposite the first end, a length along a second central longitudinal axis extending between the first end and the second end that is selected to correspond to the selected custom length of the covering, a lateral width substantially perpendicular to the length of the first inner elongate tape, and a thickness substantially perpendicular to the length and width of the first inner elongate tape. The method of assembly may further include the step of selecting a desired custom width for the covering which may include the step of providing a plurality of flexible slats having a first end and a second end, an inner longitudinal edge and an outer longitudinal edge between the first end and the second end and defining a length of the slat corresponding to and preferably substantially the same size as the custom width of the covering. The method of assembly may further include the step of providing a slat having a depth between its inner longitudinal edge and, the outer longitudinal edge. The method may include the step of coupling the slats between and preferably transverse to the first outer elongate tape and the first inner elongate tape, the slats preferably having an upper face coupled, to the first inner elongate tape and a lower face coupled to the first outer elongate tape. The slats may be coupled to the elongate tapes by bonding and may be fed into a machine to bond the slats at any desired custom position along the length of the elongate tapes.

The method of assembly preferably results in the first outer elongate tape, the first inner elongate tape, and the slats joined and assembled to define a subassembly configured to be rolled up, where the slats are coupled to the first outer elongate tape and the first inner elongate tape at any desired location along the lengths of the first outer elongate tape and the first inner elongate tape such that the plurality of flexible slats are spaced apart to achieve a desired spacing of the slats along the elongate inner and outer tapes, thereby providing a custom subassembly of custom length, and/or custom width such that the custom subassembly is configured to fit any desired architectural opening and preferably provide a desired shading effect. The method can also include the step of spacing the slats a custom uniform distance apart from adjacent slats along the length of the first outer and first inner elongate tapes. Preferably the custom uniform distance is determined by at least one of the width of the slats, a desired number of slats, and a desired spacing between the slats. The method may also include selecting a desired custom width of the covering, wherein the length of the slats is determined by the selected custom width of the covering. Alternatively, instead of including the step of uniformly spacing the slats, the method may include the step of spacing at least one slat a custom non-uniform distance apart from at least one adjacent slat.

Figure 26:
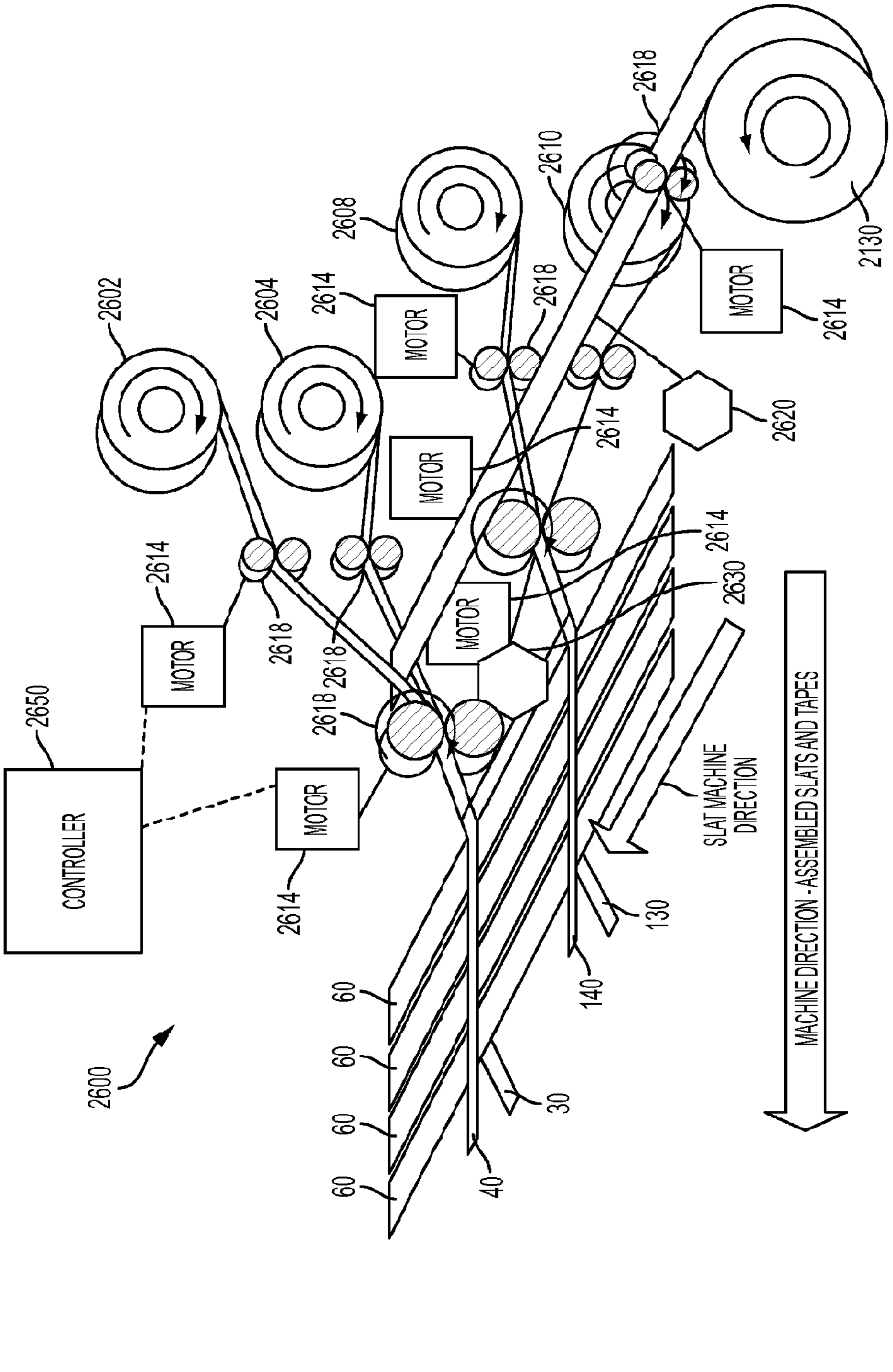
FIG. 26 is a schematic diagram illustrating a representative embodiment of a method and device for automatically manufacturing embodiments of the disclosure.

For purposes of illustration, and not limitation, as embodied herein, FIG. 26 depicts a schematic example of a method and system for assembling roll-up coverings as disclosed herein. While the process of assembly can be done manually, preferably with the appropriate manufacturing jigs to maintain alignment, automated assembly is preferred.

The frame and other supporting structure of the machine 2600 are not specifically illustrated to provide more clarity as to the interrelation of the components to describe how the system works. As will be appreciated, a plurality of rolls of starting materials, including continuous rolls of elongate tape material 2602, 2604, 2608, 2610 are provided, wherein rolls 2602, and 2608 provide outer elongate tapes 40, 140 respectively, while rolls 2604, and 2610 provide inner elongate tapes 30, 130 respectively. Flexible slat material with stiffener(s) along the edge(s) is provided from roll 2130, which in turn is preferably made using a machine and method as described with reference to FIG. 21.

Motor(s) 2614 are operatively connected to one or more controllers 2650, which can include a central computer system and one or more programmable logic controllers (not shown) for sequentially advancing tape material and slat material. The inner and outer elongate tapes are kept sufficiently separated to permit slat material to be advanced between them by the system. After the slat material is inserted and cut to length by the cutting station 2620, it is advanced by a push plate (not shown) in synchronization with the elongate tapes through nip rollers to compress the components of the subassembly with adhesive to form an integral unit. FIG. 26 shows a first roll-up covering having four slats being made and a new covering being made upstream from it. As such, a plurality of pre-programmed roll-up coverings can be made of custom width and spacing between slats which can be separated from each other during manufacture by cutting the tapes. Separation can also be accomplished later.

Gluing and cutting station 2620 is provided to deposit predetermined amounts of adhesive onto the top and bottom of the slat material as it is being advanced between the inner and outer tapes. As soon as the slat material has been metered out to the correct length, it is cut by station 2620, and the inner and outer elongate tapes are attached to the slat material by the adhesive, typically a hot melt adhesive. The outer elongate tape(s) are preferably each attached to each slat at one location near the stiffener at an edge of the slat. As each slat is installed, the elongate tapes 30, 130, 40, 140 are advanced to accept the next length of slat, which is adhered and pressed into adhesion with the elongate tapes. Once the subassembly has been formed, the elongate tapes are advanced and cut at cutting station 2630 to remove the subassembly from the machine. At this point, the elongate tapes can optionally be attached to a roller, and the roll-up covering can be completed. It will be appreciated that the embodiment 2600 and the order of the process can be modified in many ways to achieve the same or slightly different functionality.

It will be appreciated that the controller 2650 can be programmed, to utilize slat material of any desired length or width, and to provide any desired placement of the slats along the elongate tapes 30, 130, 40, 140 to provide for a roll-up covering of any desired slat length, or slat spacing. It will be further appreciated that the inner elongate tapes 30, 130 can be made longer than the outer elongate tapes on the subassembly between at least one pair of adjacent slats by advancing more tape material using the motorized feed rollers drawing material from rolls 2604, 2610 than from rolls 2602, 2608. Spacing between subsequent slats can be varied along the subassembly, and can be configured to make some slats open before others, as discussed elsewhere herein. It will be further appreciated that system 2600 can be provided with feed rolls of slat material of different widths and material types.

Moreover, using the system of FIG. 26, or manual assembly, it is convenient to make roll-up coverings of any desired custom width. For example, the system can be programmed to make a roll-up covering that is between about 10 and about 144 inches in width, in any increment, for example of one hundredth of an inch. In particular, if first and second inner and outer elongate tapes are used, the spacing between the first elongate tapes and the second elongate tapes may be set at any desired distance, and, the length of the slats may be set at any desired distance to form a covering of any desired width. Preferably the distance between at least one first inner or outer elongate tape and a corresponding second inner or outer elongate tape is greater than 6 inches. More preferably the distance between at least one first elongate inner or outer tape and a corresponding adjacent second elongate inner or outer tape is greater than 9 inches. Most preferably the distance between at least one first inner or outer elongate tape and a corresponding adjacent second inner or outer elongate tape is greater than 12 inches, preferably greater than eighteen inches, and may be 24 inches. The distance between tapes that may be selected to form a covering will be affected by the rigidity of the material of the flexible slats and the stiffness of any slat stiffeners.

Similarly, such a roll-up covering can be made any desired custom height, such as a height between one foot and fifty feet, in any increment, for example of about one tenth of an inch. Moreover, the placement of the elongate tapes can be any desired suitable location along the front or back of the slats 60, as the case may be. For instance, the total height of the covering may be selected based on the dimensions of the architectural opening to be covered by the window covering, and the spacing of the slats may be calculated, to permit the desired spacing between the slats to achieve the desired appearance, such as by assuring that the bottom-most slat or feature of the subassembly (e.g., a weighted bar, a bottom rail, a bottom bar) is at the bottom of the covering and spaced a distance from the slat above that is substantially the same distance that spaces apart other adjacent slats. In contrast with other window coverings that have preset spacings of their horizontal elements such that selection of that window covering and sizing it to a total height based on the architectural opening to be covered does not always result in the horizontal element being at the bottom of the window covering and spaced the same distance from its adjacent slat as the distance separating other adjacent horizontal slats (e.g., elements) in that window covering. The front and back elongate tapes can be aligned, or be out of mutual alignment. The spacing between tapes across the length of the slats can be programmed into the system 2600, and the lateral location of rolls of elongate tape material can be adjusted to custom spacing. Moreover, it will be appreciated that system 2600 can produce custom width roll-up coverings with minimal scrap material.

The devices and methods of the present disclosure, as described, above and shown in the drawings, provide for roll-up window coverings and ladder tapes with superior attributes vis-à-vis the prior art. It will be apparent to those skilled in the art that various modifications and variations can be made in the devices and methods of the present disclosure without departing from the spirit or scope of the disclosure. Thus, it is intended that the present disclosure include modifications and variations that are within the scope of the subject disclosure and equivalents.

The invention claimed is:

1. A covering for an architectural opening, the covering comprising:

a first fabric material including an inner surface, an outer surface, a top end, a bottom end, a first side edge, and a second side edge, the bottom end of the first fabric material being folded over to define a first folded piece of fabric of said first fabric material;

a second fabric material including an inner surface, an outer surface, a top end, a bottom end, a first side edge, and a second side edge; and a stiffener including an inner surface and an outer surface, said stiffener positioned between said first folded piece of fabric and said outer surface of said second fabric material along said top end of said second fabric material, said inner surface of said stiffener being adhered to said outer surface of said second fabric material and said outer surface of said stiffener being adhered to said first folded piece of fabric.

2. The covering according to claim 1, wherein the stiffener functions as a stiffening member to increase rigidity.

3. The covering according to claim 1, wherein the stiffener has a length from a first side edge to a second side edge, the stiffener having a crown along its length.

4. The covering according to claim 1, wherein the first folded piece of fabric covers the stiffener.

5. The covering according to claim 1, wherein the first folded piece of fabric forms a first portion of the first fabric material that extends from the bottom end of the first fabric material to a fold line and a second portion of the first fabric material extends from the fold line to the top end of the first fabric material, wherein the second portion of the first fabric material is larger than the first portion of the first fabric material.

6. The covering according to claim 1, wherein the stiffener is made of at least one of a material group consisting of: aluminum, plastic, and combinations thereof.

7. The covering according to claim 1, wherein a second stiffener is adhered adjacent to the top end of the first fabric material.

8. The covering according to claim 1, wherein the first folded piece of fabric has a first contact surface, the first contact surface having a first contact surface width that extends from the bottom end of said first fabric material to a first fold line that defines the first folded of fabric, and the stiffener has a stiffener width that extends from a bottom edge of said stiffener to a top edge of said stiffener, wherein the first contact surface width is larger than the stiffener width.

9. The covering according to claim 8, wherein the stiffener is arranged and adhered within the first contact surface.

10. The covering according to claim 1, wherein the top end of the first fabric material is folded over to define a second folded piece of fabric of said first fabric material.

11. The covering according to claim 10, wherein a second stiffener is adhered to the second folded piece of fabric of said first fabric material.

12. The covering according to claim 1, wherein the bottom end of the second fabric material is folded over to define a first folded piece of fabric of said second fabric material.

13. The covering according to claim 12, wherein the first folded piece of fabric of said second fabric material covers a second stiffener.

14. The covering according to claim 1, wherein said stiffener is adhesively attached directly to at least one of said outer surface of said second fabric material and said first folded piece of fabric.

15. The covering according to claim 14, wherein said inner surface of said stiffener is adhesively attached directly to said outer surface of said second fabric material and said outer surface of said stiffener is adhesively attached directly to said first folded piece of fabric.

16. A fabric panel for a roll-up window covering, the fabric panel comprising:

a plurality of assembled strips of material joined together, each assembled strip of fabric material including:

a fabric material including an inner surface, an outer surface, a top end, a bottom end, a first side edge, a second side edge, the outer surface defining a first contact surface adjacent to the top end of the fabric material, the bottom end of the fabric material being folded over to define a first folded piece of fabric of said fabric material defining a second contact surface; and a stiffener including an inner surface and an outer surface, wherein the inner surface of said stiffener is adhered to the first contact surface of a first assembled strip of fabric material and said outer surface of said stiffener is adhered to the second contact surface of an adjoining second assembled strip of fabric material such that said stiffener is positioned directly between the first contact surface of the first assembled strip of fabric material and the second contact surface of the adjoining second assembled strip of fabric material.

17. The fabric panel according to claim 16, wherein the stiffener has a length from a first side edge to a second side edge, the stiffener having a crown along its length.

18. The fabric panel according to claim 16, wherein the first folded piece of fabric covers the stiffener.

19. The fabric panel according to claim 16, wherein a second stiffener is adhered adjacent to the top end of the fabric material.

20. The fabric panel according to claim 16, wherein the stiffener is made from a different material than the fabric material.

21. The fabric panel according to claim 20, wherein the stiffener is made of at least one of a material group consisting of: aluminum, plastic, and combinations thereof.

22. The fabric panel according to claim 16, wherein the top end of said fabric material is folded over to define a second folded piece of fabric of said fabric material.

23. The fabric panel according to claim 22, wherein a second stiffener is adhered to the second folded piece of fabric of said fabric material.

24. The fabric panel according to claim 23, wherein the second folded piece of fabric of said fabric material covers a second stiffener.

25. The covering according to claim 16, wherein said stiffener is adhesively attached directly to at least one of the first contact surface of the first assembled strip of fabric material and the second contact surface of the adjoining second assembled strip of fabric material.

26. The covering according to claim 25, wherein the inner surface of said stiffener is adhesively attached to the first contact surface of the first assembled strip of fabric material and said outer surface of said stiffener is adhesively attached to the second contact surface of the adjoining second assembled strip of fabric material.

* * * * *